United States Patent
Kusukame et al.

(10) Patent No.: US 11,204,282 B2
(45) Date of Patent: Dec. 21, 2021

(54) INFRARED DETECTION APPARATUS

(71) Applicant: PANASONIC INTELLECTUAL PROPERTY MANAGEMENT CO., LTD., Osaka (JP)

(72) Inventors: Koichi Kusukame, Nara (JP); Aki Yoneda, Hyogo (JP); Nawatt Silawan, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 202 days.

(21) Appl. No.: 16/596,208

(22) Filed: Oct. 8, 2019

(65) Prior Publication Data

US 2020/0041348 A1   Feb. 6, 2020

Related U.S. Application Data

(63) Continuation of application No. 15/624,663, filed on Jun. 15, 2017, now Pat. No. 10,495,518.

(30) Foreign Application Priority Data

Jun. 23, 2016 (JP) .................... 2016-124901
Dec. 20, 2016 (JP) .................... 2016-247126

(51) Int. Cl.
*G01J 5/08* (2006.01)
*G01J 5/28* (2006.01)

(52) U.S. Cl.
CPC ............. *G01J 5/0806* (2013.01); *G01J 5/089* (2013.01); *G01J 5/28* (2013.01)

(58) Field of Classification Search
CPC ...... G01J 5/0806; G01J 5/28; G01J 2005/283; G01J 2005/286
See application file for complete search history.

(56) References Cited

U.S. PATENT DOCUMENTS 3,604,932 A    9/1971 Beach
3,889,117 A *  6/1975 Shaw, Jr. ................ H04N 5/33
                                                       250/332

(Continued)

FOREIGN PATENT DOCUMENTS

JP    2010-216688        9/2010
JP    2011-174762        9/2011
JP    2016-105067 A      6/2016

OTHER PUBLICATIONS

English Translation of Chinese Search Report dated Jun. 2, 2020 for the related Chinese Patent Application No. 201710227714.X.

*Primary Examiner* — Nathaniel T Woodward
*Assistant Examiner* — Philip L Cotey
(74) *Attorney, Agent, or Firm* — Greenblum & Bernstein, P.L.C.

(57) ABSTRACT

A lens allows infrared light to pass therethrough. An infrared sensor includes infrared detection elements arranged in two or more columns. The infrared sensor is rotated around a scan rotation axis that passes through part of the lens to scan a detection range, and outputs an output signal indicating a thermal image of the detection range. At least two infrared detection elements in the infrared sensor are located at positions displaced from each other with respect to the scan rotation axis. Among the infrared detection elements, the number of first infrared detection elements having a smaller half-width of a point spread function in a scan direction than that in the direction of the scan rotation axis is larger than the number of second infrared detection elements having a larger half-width of a point spread function in the scan direction than that in the direction of the scan rotation axis.

12 Claims, 58 Drawing Sheets

(56) References Cited

U.S. PATENT DOCUMENTS

| | | | |
|---|---|---|---|
| 5,444,236 A | 8/1995 | Ludington et al. | |
| 5,877,688 A * | 3/1999 | Morinaka | G08B 13/191 340/584 |
| 6,084,227 A | 7/2000 | Rhoads | |
| 6,211,787 B1 * | 4/2001 | Yoshiike | G01S 17/04 340/573.1 |
| 6,252,506 B1 * | 6/2001 | Hsieh | G08B 13/1645 250/338.3 |
| 8,115,645 B2 * | 2/2012 | Lu | G01J 5/02 340/584 |
| 9,562,849 B2 | 2/2017 | Kester et al. | |
| 2002/0079425 A1 | 6/2002 | Rhoads | |
| 2005/0197809 A1 | 9/2005 | Dowski, Jr. et al. | |
| 2006/0038679 A1 | 2/2006 | Eskildsen et al. | |
| 2006/0289768 A1 | 12/2006 | Vallese et al. | |
| 2009/0190238 A1 * | 7/2009 | Alon | H04N 5/217 359/738 |
| 2009/0321637 A1 | 12/2009 | Wood | |
| 2010/0004887 A1 | 1/2010 | Mooney | |
| 2010/0213389 A1 * | 8/2010 | Larkin | G01N 21/6458 250/459.1 |
| 2010/0214150 A1 * | 8/2010 | Lovberg | H01Q 3/06 342/22 |
| 2011/0037860 A1 | 2/2011 | Broekaert et al. | |
| 2011/0073704 A1 | 3/2011 | Jenkins et al. | |
| 2011/0285995 A1 | 11/2011 | Tkaczyk et al. | |
| 2013/0043396 A1 | 2/2013 | Shpater | |
| 2014/0138543 A1 | 5/2014 | LaVeigne | |
| 2014/0293062 A1 | 10/2014 | Hoye et al. | |
| 2014/0345845 A1 | 11/2014 | Fadell et al. | |
| 2014/0354833 A1 | 12/2014 | Takizawa | |
| 2015/0018644 A1 | 1/2015 | Gulati et al. | |
| 2015/0097993 A1 | 4/2015 | Oniki et al. | |
| 2015/0293018 A1 | 10/2015 | Stork et al. | |
| 2015/0312489 A1 | 10/2015 | Hoelter et al. | |
| 2016/0146665 A1 | 5/2016 | Silawan et al. | |
| 2016/0327432 A1 | 11/2016 | Dufresne De Virel et al. | |
| 2017/0205342 A1 * | 7/2017 | Krishnan | G01J 3/0224 |
| 2018/0106674 A1 * | 4/2018 | Sandsten | G01B 9/02089 |

* cited by examiner

FIG. 16

| ROW NUMBER | HORIZONTAL WIDTH | FIRST PROPOSAL FOR VERTICAL WIDTH | SECOND PROPOSAL FOR VERTICAL WIDTH |
|---|---|---|---|
| 1 | 1.00 | 1.00 | 0.75 |
| 2 | 0.99 | 1.00 | 0.75 |
| 3 | 0.98 | 1.00 | 0.75 |
| 4 | 0.97 | 1.00 | 0.75 |
| 5 | 0.95 | 1.00 | 0.75 |
| 6 | 0.92 | 1.00 | 0.75 |
| 7 | 0.90 | 1.00 | 0.75 |
| 8 | 0.87 | 1.00 | 0.75 |
| 9 | 0.83 | 1.00 | 0.75 |
| 10 | 0.79 | 1.00 | 0.75 |
| 11 | 0.75 | 1.00 | 0.75 |
| 12 | 0.71 | 1.00 | 0.75 |
| 13 | 0.66 | 1.00 | 0.75 |
| 14 | 0.61 | 1.00 | 0.75 |
| 15 | 0.56 | 1.00 | 0.75 |
| 16 | 0.50 | 1.00 | 0.75 |

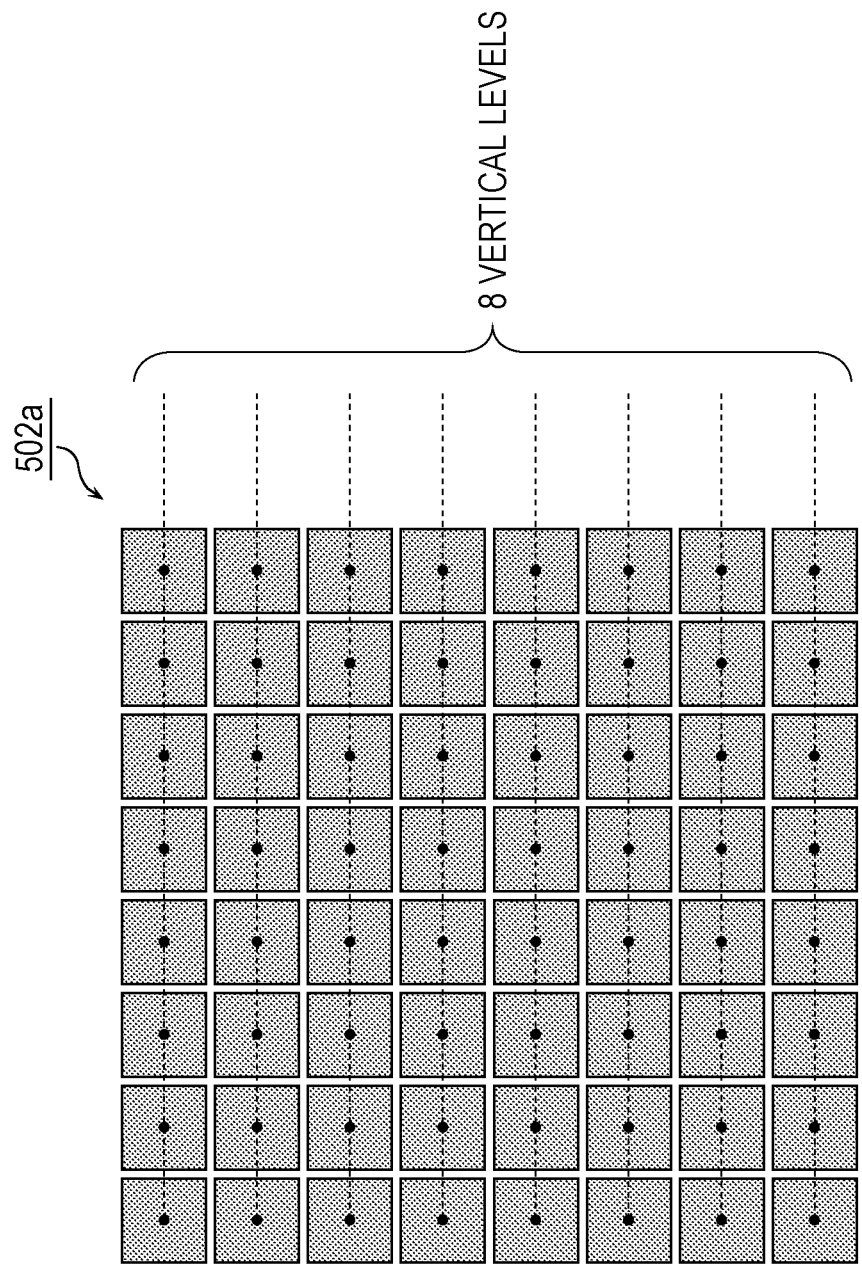

INFRARED DETECTION APPARATUS

CROSS-REFERENCE TO RELATED APPLICATIONS

The present application is a continuation application of U.S. patent application Ser. No. 15/624,663, filed Jun. 15, 2017, which claims the benefit of Japanese Patent Application Nos. 2016-247126 filed Dec. 20, 2016 and 2016-124901 filed Jun. 23, 2016. The disclosure of each of the above-identified applications, including the specification, drawings, and claims, is incorporated herein by reference in its entirety.

1. Technical Field

The present disclosure relates to an infrared detection apparatus capable of detecting infrared radiation.

2. Description of the Related Art

Techniques for air conditioning have been proposed in which an infrared sensor is mounted on an air conditioning unit such as a room air conditioner and two-dimensional thermal image data acquired by the infrared sensor is used to perform air conditioning (for example, Japanese Patent No. 5111417).

Japanese Patent No. 5111417 discloses a technique in which air conditioning equipment installed in a room at a height of 1800 mm from the floor is provided with an infrared sensor including light-receiving elements arranged vertically in a line.

SUMMARY

In one general aspect, the techniques disclosed here feature an infrared detection apparatus including a lens that allows infrared light to pass therethrough and an infrared sensor that includes infrared detection elements arranged in two or more columns, the infrared sensor being rotated around a scan rotation axis that passes through part of the lens to scan a detection range and outputting an output signal indicating a thermal image of the detection range. At least two of the infrared detection elements in the infrared sensor are located at positions displaced from each other, as viewed in a direction perpendicular to the scan rotation axis. The number of first infrared detection elements that are included in the infrared detection elements arranged in the two or more columns and that have a smaller half-width of a point spread function in a scan direction than a half-width of a point spread function in the direction of the scan rotation axis is larger than the number of second infrared detection elements that are included in the infrared detection elements arranged in the two or more columns and that have a larger half-width of a point spread function in the scan direction than a half-width of a point spread function in the direction of the scan rotation axis.

According to an aspect of the present disclosure, it may be possible to provide an infrared detection apparatus with an increased detection range in a lower area near the position at which the infrared detection apparatus is installed. According to another aspect of the present disclosure, it may be possible to provide an infrared detection apparatus in which the influence of image distortion caused by an optical system can be suppressed or reduced.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 16 is a table depicting an example of the sizes of a plurality of infrared detection elements constituting the infrared sensor according to the fifth modification of the second embodiment;

FIG. 22A is a diagram depicting an advantage of an infrared detection apparatus that includes an infrared sensor according to a comparative example;

DETAILED DESCRIPTION

Underlying Knowledge Forming Basis of the Present Disclosure

In the technique disclosed in Japanese Patent No. 5111417, the infrared sensor is located at a position higher than the position of an object being measured such as a person or a heat source, resulting in a problem that a lower area near the infrared sensor is not included in a detection range of the infrared sensor.

Another problem is that when a thermal image is acquired by the infrared sensor, a thermal image containing image distortion caused by an optical system may result in the generation of image noise such as streaks or jagged lines in an image obtained by a super-resolution technique.

One non-limiting and exemplary embodiment provides an infrared detection apparatus with an increased detection range in a lower area near the position at which the infrared detection apparatus is installed. Another non-limiting and exemplary embodiment provides an infrared detection apparatus in which the influence of image distortion caused by an optical system can be suppressed or reduced.

An infrared detection apparatus and so on according to aspects of the present disclosure will be described specifically with reference to the drawings. The following embodiments show specific examples of the present disclosure. Elements given in the following embodiments, such as numerical values, shapes, materials, constituent elements, and the arrangement positions of the constituent elements, are merely examples and are not intended to limit the present disclosure. Among the constituent elements in the following embodiments, constituent elements not recited in an independent claim that defines the present disclosure in its broadest concept are described as optional.

First Embodiment

Configuration of Infrared Detection Apparatus

An infrared detection apparatus according to a first embodiment will be described hereinafter with reference to the drawings.

Figure 1:
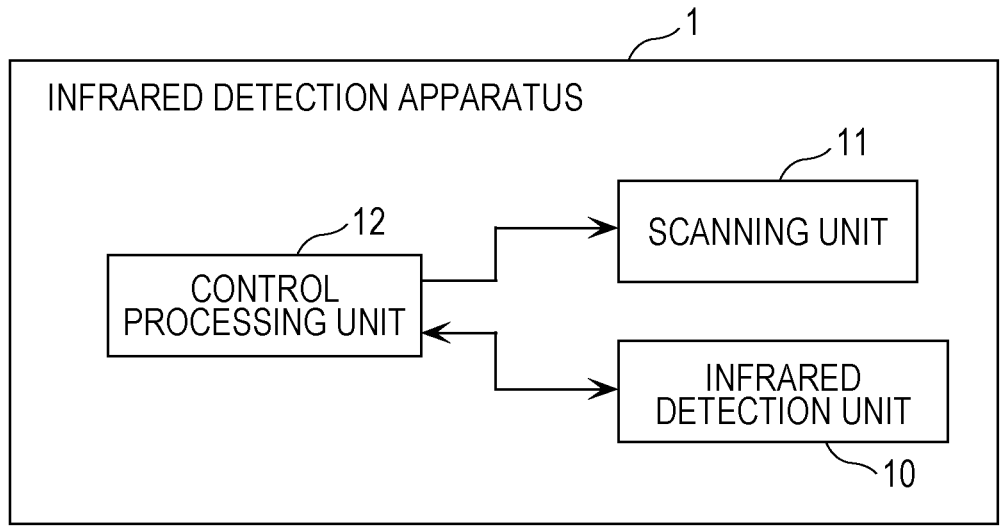
FIG. 1 is a diagram illustrating an example configuration of an infrared detection apparatus according to a first embodiment.
Figure 2:
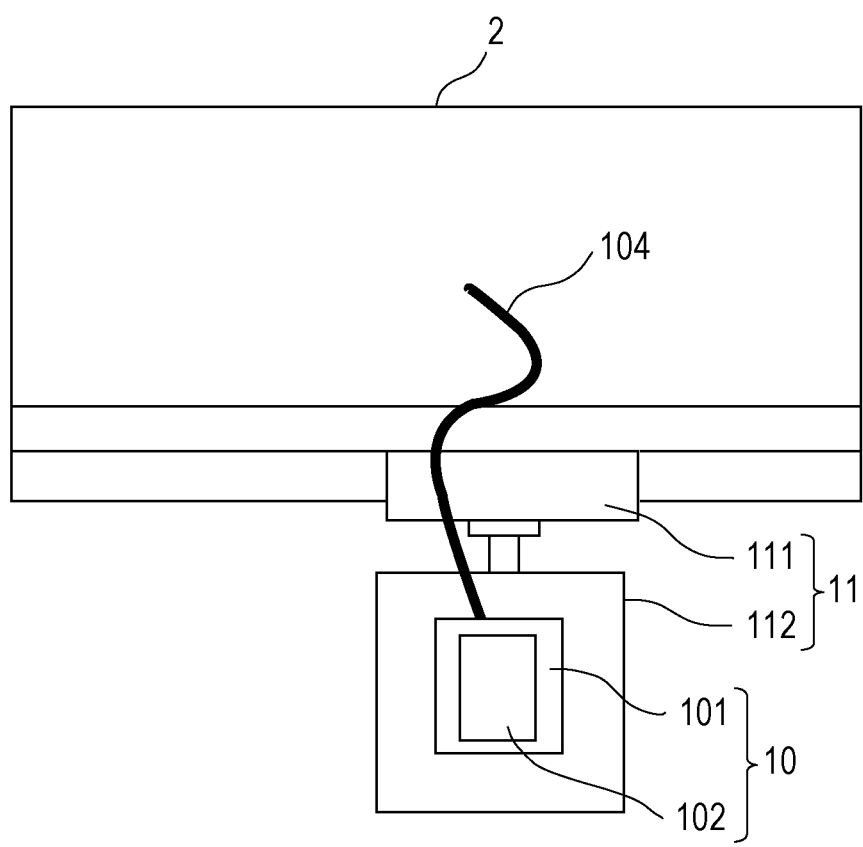
FIG. 2 is a schematic view of a physical configuration in which the infrared detection apparatus according to the first embodiment is mounted on a housing.
Figure 3:
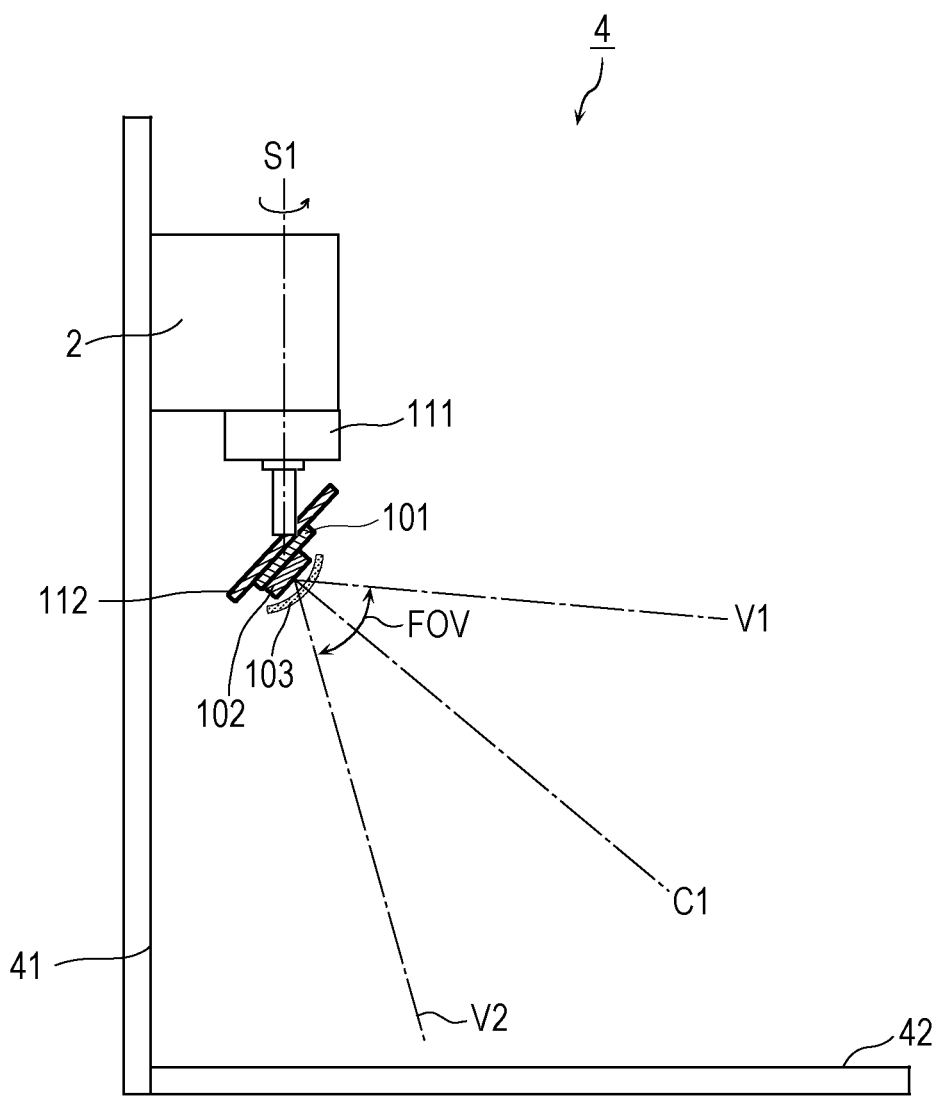
FIG. 3 is a diagram illustrating the installation of the housing on which the infrared detection apparatus according to the first embodiment is mounted.
Figure 4:
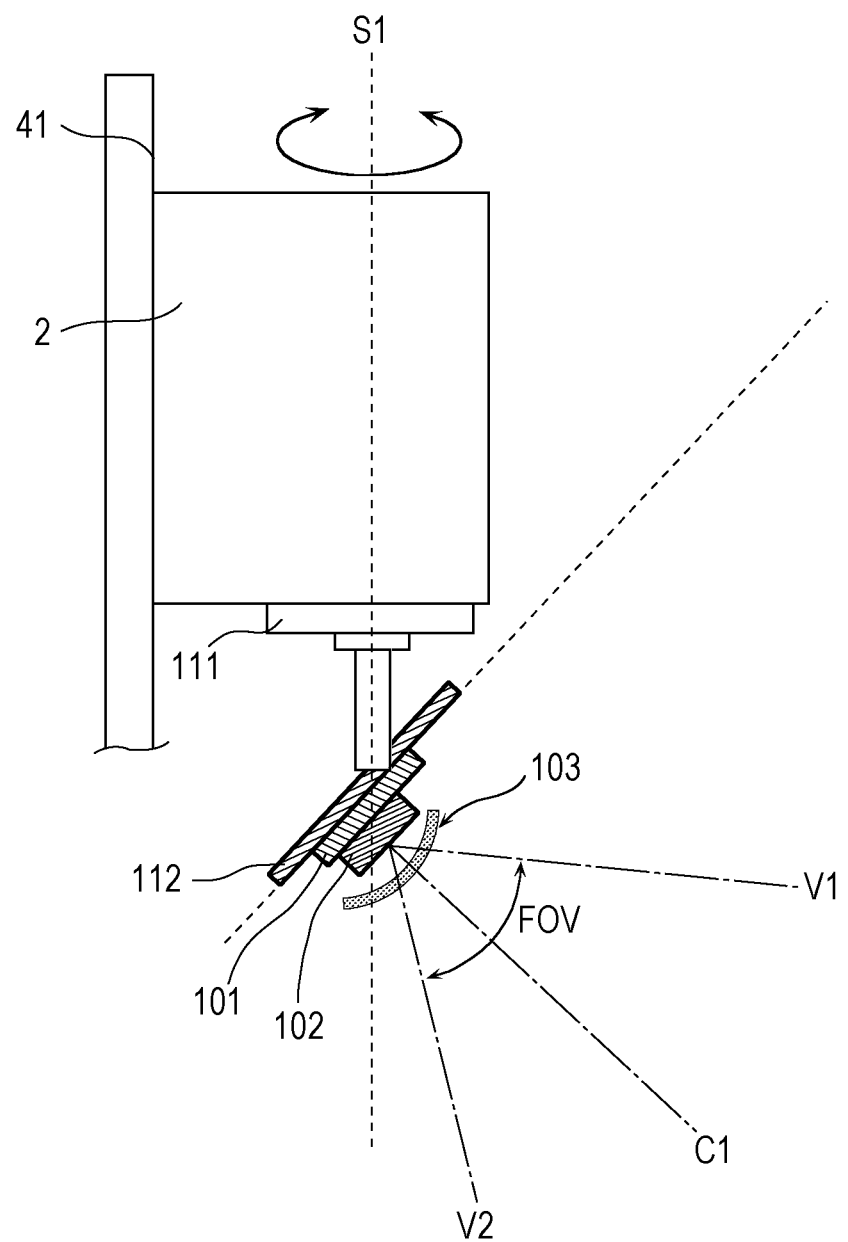
FIG. 4 is a diagram illustrating a physical configuration of the infrared detection apparatus according to the first embodiment.

FIG. 1 is a diagram illustrating an example configuration of the infrared detection apparatus according to the first embodiment. FIG. 2 is a schematic view of a physical configuration in which the infrared detection apparatus according to this embodiment is mounted on a housing. FIG. 3 is a diagram illustrating the installation of the housing on which the infrared detection apparatus according to this embodiment is mounted. FIG. 4 is a diagram illustrating a physical configuration of the infrared detection apparatus according to this embodiment.

An infrared detection apparatus 1 according to the first embodiment is attached to a housing 2 installed on, as illustrated in FIG. 3, an installation surface 41, which is substantially perpendicular to a bottom surface 42 of a space 4 and which is at a predetermined height from the bottom surface 42, and acquires a thermal image of a detection range. The thermal image is an image composed of a plurality of pixels representing a distribution of temperatures within a temperature detection range. The predetermined height is a height higher than the position of an object whose temperature is being detected (an object being measured), such a person or a heat source, and is, for example, greater than or equal to 1800 mm. The housing 2 is the housing of air conditioning equipment such as an air conditioner, for example. Such equipment having the housing 2 analyzes room conditions, such as a person's location, the position of a heat source, and hot or cold sensation, by using the thermal image acquired by the infrared detection apparatus 1 and controls any of the direction and volume of blowing air, temperature, and humidity on the basis of the analyzed room conditions. The space 4 is a room, for example. The bottom surface 42 is a surface of the floor of the room, for example. The installation surface 41 is a surface of the wall of the room, for example.

As illustrated in FIG. 1, the infrared detection apparatus 1 includes an infrared detection unit 10, a scanning unit 11, and a control processing unit 12.

The scanning unit 11 has a scan rotation axis S1 and rotates an infrared sensor 102 about the scan rotation axis S1 to thereby cause the infrared sensor 102 to scan the space 4. The scan rotation axis S1 is substantially parallel to the installation surface 41. In this embodiment, as illustrated in FIG. 2 to FIG. 4, the scanning unit 11 includes a motor 111 and a mounting base 112.

The motor 111 is controlled by the control processing unit 12 to rotate the mounting base 112 about the scan rotation axis S1 to thereby cause the infrared sensor 102 to rotate about the scan rotation axis S1. The motor 111 is, for example, a stepping motor, a servo motor, or the like.

A sensor module 101, described below, is mounted on the mounting base 112. The mounting base 112 is disposed at an inclination with respect to the scan rotation axis S1. The inclination may be, for example, about 30 degrees.

The infrared detection unit 10 is rotated about the scan rotation axis S1 by the scanning unit 11 to scan a temperature detection range in the space 4. In this embodiment, as illustrated in FIG. 2 to FIG. 4, the infrared detection unit 10 includes the sensor module 101 and a cover 103, and the sensor module 101 has mounted thereon the infrared sensor 102.

The sensor module 101 has mounted thereon the infrared sensor 102 and a lens (not illustrated) and is electrically connected to the housing 2 via wiring 104. The sensor module 101 is placed on the mounting base 112 of the scanning unit 11.

The lens (not illustrated) is formed of a material with high infrared transmittance, such as silicon or ZnS. The lens is designed such that infrared radiation (infrared light) incident on the lens from individual directions enters each of one or more infrared detection elements constituting the infrared sensor 102.

As illustrated in FIG. 4, the infrared sensor 102 is rotated about the scan rotation axis S1 to scan the temperature detection range in the space 4 and outputs a thermal image (an infrared image) of the scanned temperature detection range to the control processing unit 12. Specifically, the infrared sensor 102 includes one or more infrared detection elements arranged in one or more columns on a surface thereof (hereinafter referred to as the "arrangement surface"), and detects infrared radiation in the temperature detection range in the space 4 scanned by the one or more infrared detection elements.

The arrangement surface on which the one or more infrared detection elements are arranged is inclined with respect to the installation surface 41. In other words, the arrangement surface is inclined from the scan rotation axis S1. The arrangement surface has in the center thereof (lens center) a rotation center which is the rotation center of the infrared sensor 102 when the infrared sensor 102 is rotated about the scan rotation axis S1 and through which the scan rotation axis S1 passes. In addition, the arrangement surface crosses the scan rotation axis S1. Thus, for example, as illustrated in FIG. 3, the central axis C1 of the field of view of the infrared sensor 102 is directed toward the bottom surface 42 with respect to the direction vertical to the installation surface 41, that is, is directed downward.

A comparative example will now be described.

Figure 5A:
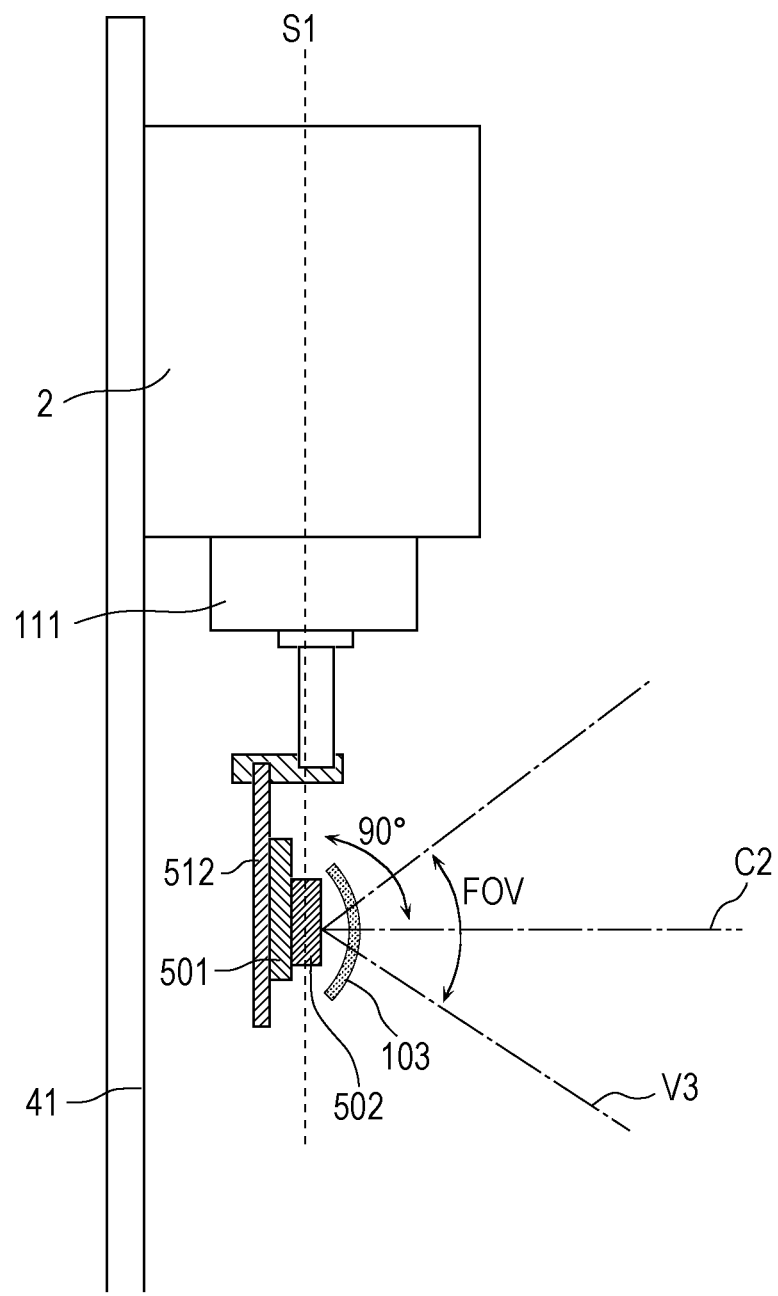
FIG. 5A is a schematic view of a physical configuration in which an infrared detection apparatus according to a comparative example is mounted on a housing.
Figure 5B:
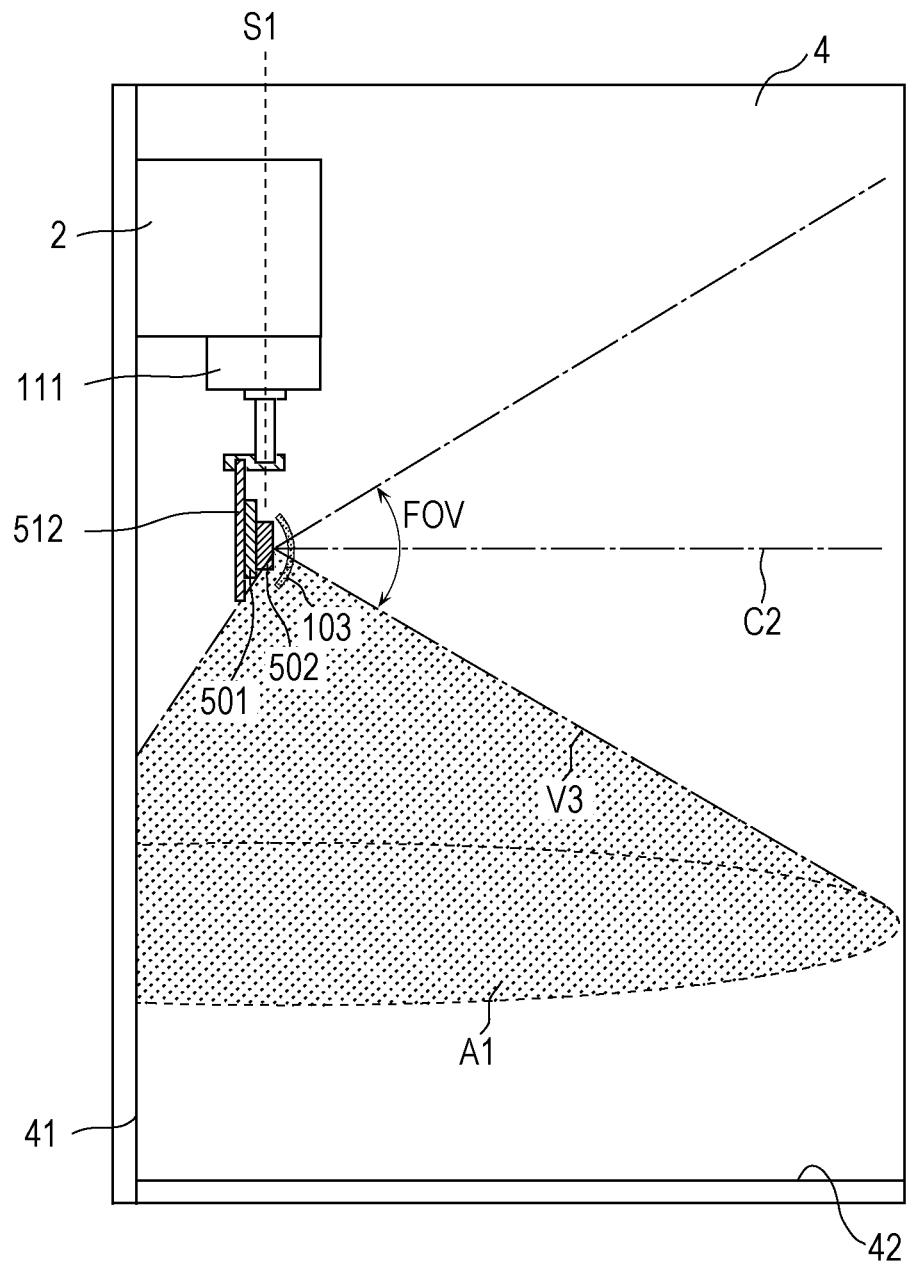
FIG. 5B is a diagram depicting a blind area of the infrared detection apparatus according to the comparative example illustrated in FIG. 5A.

FIG. 5A is a schematic view of a physical configuration in which an infrared detection apparatus according to a comparative example is mounted on a housing. FIG. 5B is a diagram depicting a blind area of the infrared detection apparatus according to the comparative example illustrated in FIG. 5A. Elements similar to those in FIG. 3 are assigned the same numerals and symbols and are not described in detail herein.

The infrared detection apparatus according to the comparative example illustrated in FIG. 5A and FIG. 5B is different from the infrared detection apparatus 1 according to this embodiment in that a mounting base 512, a sensor module 501 placed on the mounting base 512, and an infrared sensor 502 mounted on the sensor module 501 are arranged along (parallel to) the scan rotation axis S1. The configuration of the mounting base 512, the sensor module 501, and the infrared sensor 502 according to the comparative example is the same as that of the mounting base 112, the sensor module 101, and the infrared sensor 102 according to this embodiment, respectively, except for the arrangement thereof described above, and thus is not described in detail herein.

As illustrated in FIG. 5B, the central axis C2 of the field of view of the infrared sensor 502 is parallel to the direction vertical to the installation surface 41 (i.e., is parallel to the bottom surface 42). As illustrated in FIG. 5A and FIG. 5B, the scan rotation axis S1 passes along the arrangement surface of the infrared sensor 502, and the infrared sensor 502 is rotated about the scan rotation axis S1 that passes along the arrangement surface. Thus, an area A1 below a lowermost chief ray V3, which is a chief ray at the lowermost boundary, closest to the bottom surface 42, of the effective viewing angle (angle of view) of the infrared sensor 502, is in the blind angle region, that is, is out of the detection range.

In contrast, as illustrated in FIG. 3 and FIG. 4, the infrared sensor 102 according to this embodiment is disposed to be inclined with respect to the scan rotation axis S1, and the scan rotation axis S1 passes through the center of the infrared sensor 102. In addition, the scan rotation axis S1 and the infrared sensor 102 cross each other. Thus, the central axis C1 of the field of view of the infrared sensor 102 is inclined downward. That is, the central axis C1 of the field of view of the infrared sensor 102 is inclined more downward than the central axis C2 of the field of view of the infrared sensor 502. This allows the infrared sensor 102 to rotate about the scan rotation axis S1 with the central axis C1 of the field of view being kept at the same angle with respect to the bottom surface 42.

This allows a lower area near the position at which the infrared sensor 102 is installed to be included in the effective viewing angle (angle of view). In other words, an area that is in the blind angle region and that is located below the lowermost chief ray V2, which is a chief ray at the lowermost boundary, closest to the bottom surface 42, of the effective viewing angle (angle of view) of the infrared sensor 102, is smaller than that in the infrared sensor 502 according to the comparative example. In the infrared sensor 102 according to this embodiment, therefore, the detection range in the lower area can be increased.

The cover 103, which covers the infrared sensor 102 (the lens), is formed of an infrared transmitting material such as polyethylene or silicon.

The control processing unit 12 controls the scanning unit 11, processes a thermal image (an input image) acquired by the infrared detection unit 10, and outputs a resulting image to a computation device included in the housing 2. The control processing unit 12 may be included in the computation device in the housing 2.

The control processing unit 12 performs distortion correction on the thermal image acquired by the infrared detection unit 10 and then performs a process for acquiring thermal image data indicating a person's location or the position or temperature of a heat source, such as the temperature of a user's hand or face or the temperature of a wall, within the temperature detection range on the basis of a thermal image obtained as a result of the distortion correction. This is because the thermal image output from the infrared sensor 102 contains distortion since an upper end and lower end of the infrared sensor 102, as viewed from the bottom surface 42, rotate at different speeds (or pitches) when the infrared sensor 102 is rotated about the scan rotation axis S1.

The control processing unit 12 may generate a high-definition thermal image (an output image) by performing a super-resolution process on a thermal image (an input image) acquired by the infrared detection unit 10 and reconstructing the thermal image (input image). In this case, the control processing unit 12 can output the generated high-definition thermal image, that is, a thermal image subjected to the super-resolution process. The super-resolution process is one of the resolution-enhancement processes that enable the generation of high-resolution information (an output image) that is not included in the input image. Examples of the super-resolution process include a processing method for obtaining a single high-resolution image from a plurality of images and a processing method that uses learning data. In this embodiment, the infrared detection unit 10 is caused to scan by the scanning unit 11 to thereby be able to acquire a thermal image of the temperature detection range, which is a thermal image with sub-pixel-level displacement, that is, thermal image data at different sample points.

Advantages etc. of First Embodiment

As described above, the infrared detection apparatus according to this embodiment includes an infrared sensor whose central axis of the field of view is inclined with respect to the scan rotation axis S1. This can increase the detection range in a lower area near the position at which the infrared detection apparatus according to this embodiment is installed.

Second Embodiment

While in the first embodiment, reference has been made to the case where the control processing unit 12 performs a distortion correction process on distortion in a thermal image output from the infrared sensor 102, the present disclosure is not limited thereto. One or more infrared detection elements constituting the infrared sensor 102 may be configured taking into account an inclination with respect to the scan rotation axis S1 to thereby eliminate the need for the control processing unit 12 to perform a distortion correction process. This case will be described hereinbelow.

Figure 6:
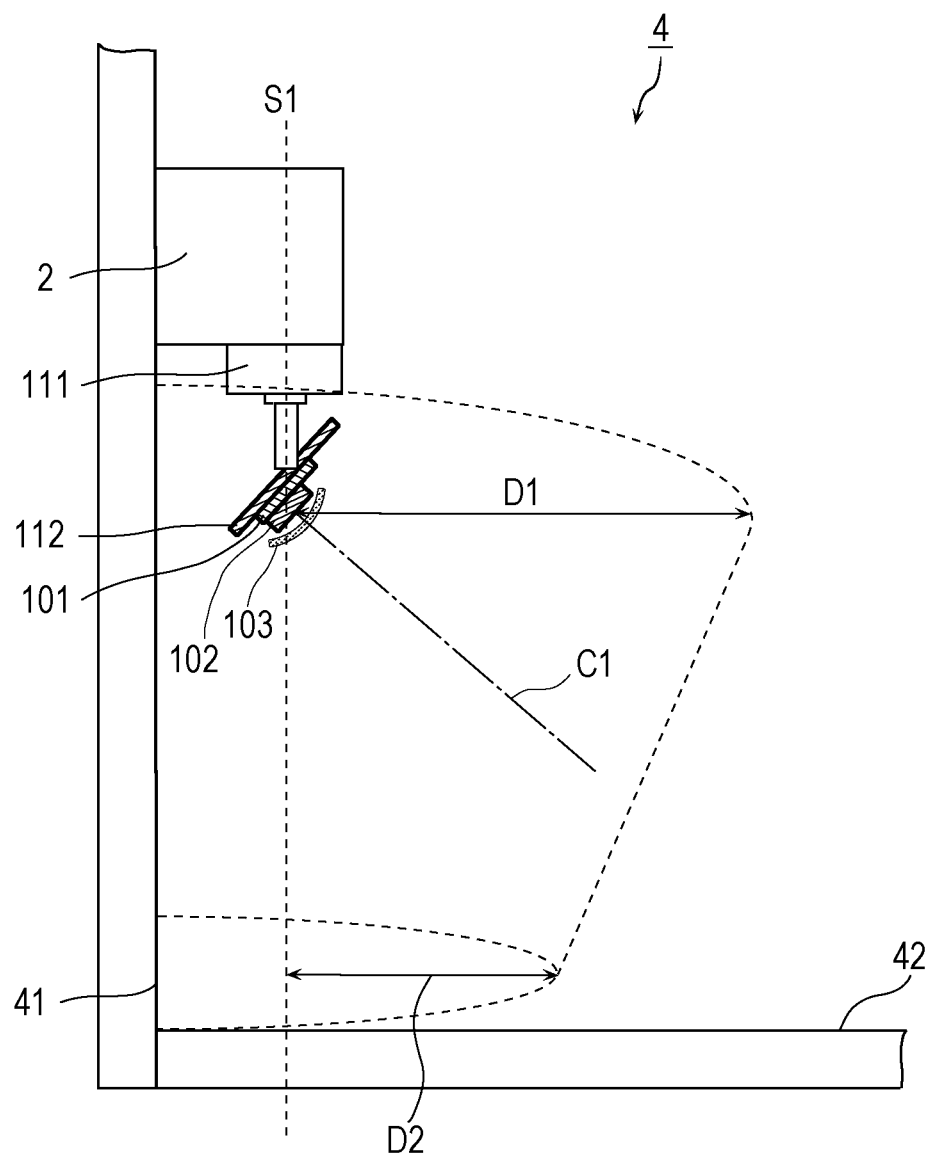
FIG. 6 is a diagram depicting the occurrence of distortion in a thermal image acquired by scanning with an infrared sensor according to the first embodiment.

FIG. 6 is a diagram depicting the occurrence of distortion in a thermal image acquired by scanning with the infrared sensor 102 according to the first embodiment.

When the infrared sensor 102 is rotated about the scan rotation axis S1, an upper end and a lower end of the infrared sensor 102, as viewed from the bottom surface 42, rotate at different speeds (or pitches). For example, it is assumed that the infrared sensor 102 is constituted by a plurality of infrared detection elements arranged in a matrix and the plurality of infrared detection elements have an equal size. In this case, since the plurality of infrared detection elements in the row at the upper end rotate at a speed higher than the plurality of infrared detection elements in the row at the lower end, the scan density (resolution) at the upper end (indicated by D1 in FIG. 6) is lower than that at the lower end (indicated by D2 in FIG. 6). That is, the scan area covered by one infrared detection element located at the upper end (indicated by D1 in FIG. 6) is larger than that covered by one infrared detection element located at the lower end (indicated by D2 in FIG. 6). In this case, the control processing unit 12 corrects (performs distortion correction on) the difference between the scan densities (resolutions) of the infrared detection elements at the upper end and the lower end to attain uniform resolution of a thermal image to be acquired.

In this embodiment, the horizontal widths of a plurality of infrared detection elements (pixels) constituting an infrared sensor are changed so as to eliminate the need for the control processing unit 12 to perform distortion correction. A specific description will be made hereinbelow.

Configuration of Infrared Sensor

Figure 7:
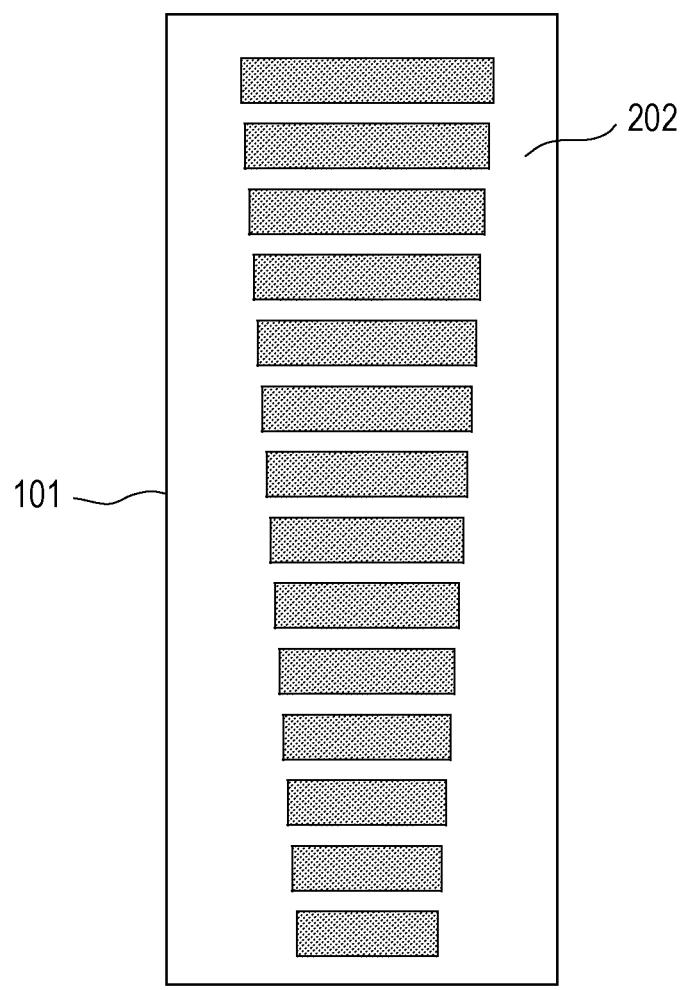
FIG. 7 is a diagram illustrating an example configuration of an infrared sensor according to a second embodiment.

FIG. 7 is a diagram illustrating an example configuration of an infrared sensor according to the second embodiment.

An infrared sensor 202 according to this embodiment includes a plurality of infrared detection elements arranged in one or more columns and is configured such that each of the infrared detection elements in each column has horizontal edges substantially parallel to the bottom surface 42 and having a length that decreases as the distance to the bottom surface 42 decreases. In FIG. 7, an example of the infrared sensor 202, which includes a plurality of infrared detection elements arranged in one column and which is configured such that each of the plurality of infrared detection elements has horizontal edges substantially parallel to the bottom surface 42 and having a length that decreases as the distance to the bottom surface 42 decreases, is illustrated.

A relationship between the lengths of the horizontal edges of adjacent infrared detection elements will now be described.

Figure 8A:
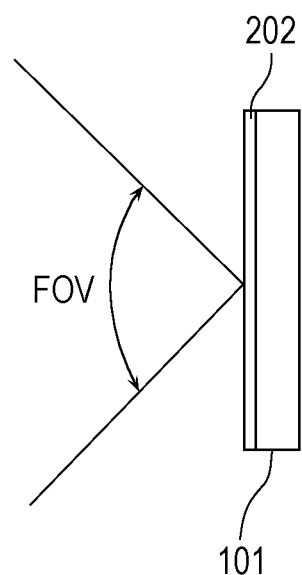
FIG. 8A is a diagram depicting a relationship between the lengths of horizontal edges of adjacent infrared detection elements in the second embodiment.
Figure 8B:
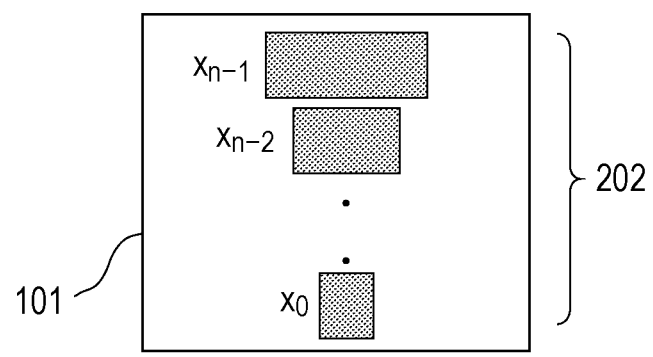
FIG. 8B is a diagram depicting a relationship between the lengths of horizontal edges of adjacent infrared detection elements in the second embodiment.

FIG. 8A to FIG. 8D are diagrams depicting a relationship between the lengths of the horizontal edges of adjacent infrared detection elements in the second embodiment. Elements similar to those in FIG. 2 and FIG. 3 are assigned the same numerals and symbols and are not described in detail herein. FIG. 8A conceptually illustrates the field of view (FOV), or effective viewing angle (angle of view), of the infrared sensor 202. FIG. 8B conceptually illustrates an example in which n infrared detection elements constituting the infrared sensor 202 are arranged in one column.

Figure 8C:
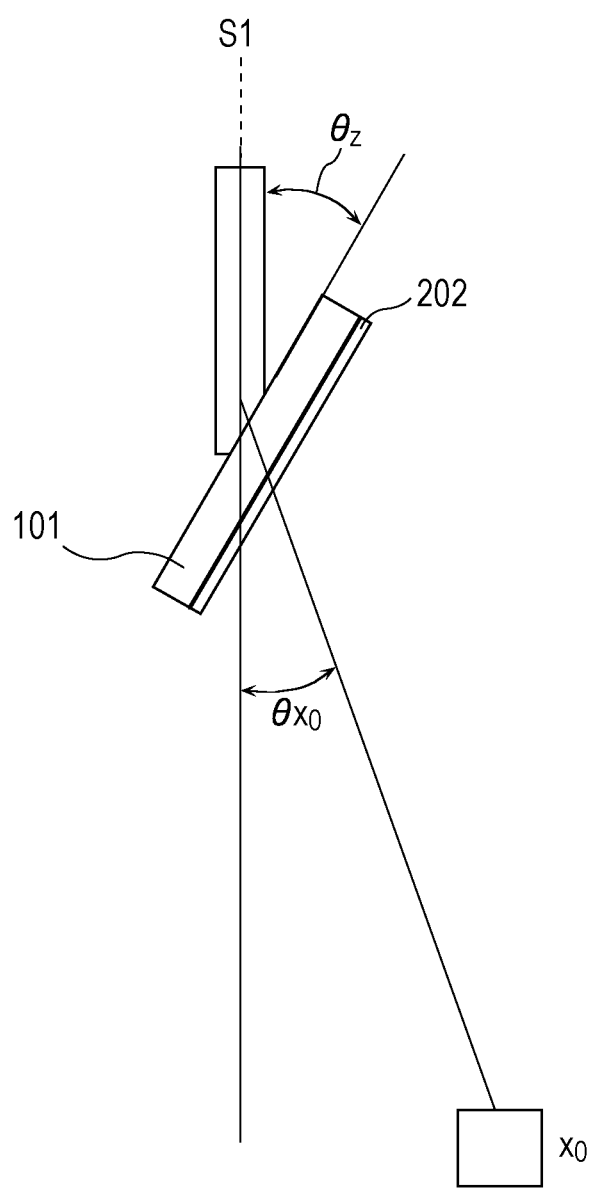
FIG. 8C is a diagram depicting a relationship between the lengths of horizontal edges of adjacent infrared detection elements in the second embodiment.

As illustrated in FIG. 8C, the sensor module 101 having the infrared sensor 202 mounted thereon is designed to be inclined at an angle (vertex angle) of $\theta_z$ from the scan rotation axis S1. An infrared detection element $x_0$ illustrated in FIG. 8C represents, for example, an infrared detection element located at the lower end among the n infrared detection elements illustrated in FIG. 8B. A vertex angle defined by the scan rotation axis S1 and a chief ray at the lowermost boundary, closest to the bottom surface 42, of the effective viewing angle (angle of view) of the infrared detection element $x_0$ is represented by an angle $\theta_{x0}$. In this case, the relationship of angle $\theta_{x0}=90-FOV/2-\theta_z-(FOV/2n)$ holds.

Likewise, for example, an angle $\theta_{x1}$ defined by the scan rotation axis S1 and a chief ray at the lowermost boundary, closest to the bottom surface 42, of the effective viewing angle (angle of view) of an infrared detection element $x_1$ adjacent (next) to the infrared detection element $x_0$ located at the lower end among the n infrared detection elements meets the relationship of angle $\theta_{x1}=90-FOV/2-\theta_z-(FOV/2n)+1*(FOV/n)$.

Likewise, an angle $\theta_{x2}$ defined by the scan rotation axis S1 and a chief ray at the lowermost boundary, closest to the bottom surface 42, of the effective viewing angle (angle of view) of an infrared detection element $x_2$ adjacent (next) to the infrared detection element $x_1$ is expressed by $90-FOV/2-\theta_z-(FOV/2n)+2*(FOV/n)$. Further, an angle $\theta_{xm}$ defined by the scan rotation axis S1 and a chief ray at the lowermost boundary, closest to the bottom surface 42, of the effective viewing angle (angle of view) of an infrared detection element $x_m$ at the m-th position from the infrared detection element $x_0$ can be expressed by $90-FOV/2-\theta_z-(FOV/2n)+m*(FOV/n)$.

Figure 8D:
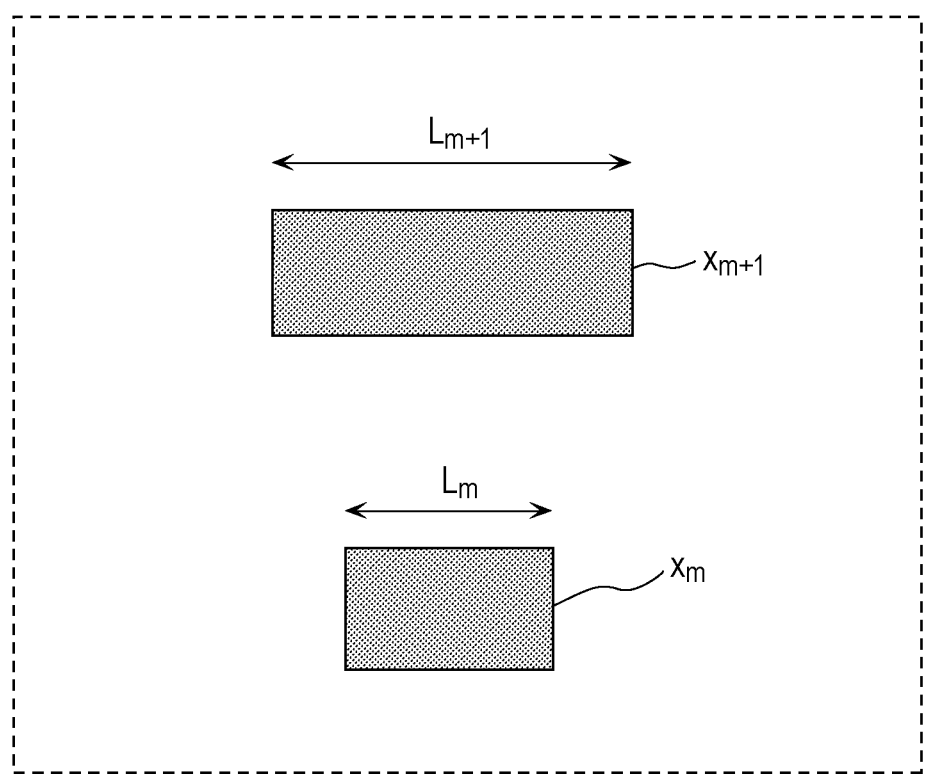
FIG. 8D is a diagram depicting a relationship between the lengths of horizontal edges of adjacent infrared detection elements in the second embodiment.

FIG. 8D conceptually illustrates adjacent infrared detection elements. When the horizontal width of the infrared detection element $x_m$ at the m-th position from the infrared detection element located at the lower end among the n infrared detection elements is represented by $L_m$ and the horizontal width of an infrared detection element $x_{m+1}$ adjacent to the infrared detection element $x_m$ in the direction away from the bottom surface 42 is represented by $L_{m+1}$, the relationship of Equation (1) below holds.

$$L_{m+1}/L_{m+2}=\sin(\theta_m)/\sin(\theta_{m+1}) \quad (1)$$

If the above equation is generalized, then the relationship of $L_x/L_y=\sin(\theta_x)/\sin(\theta_y)$ is satisfied, where $L_x$ denotes the length of the horizontal edges of a given infrared detection element among the plurality of infrared detection elements in each column, $L_y$ denotes the length of the horizontal edges of an infrared detection element adjacent to the given infrared detection element in the direction close to the bottom surface 42, $\theta_x$ denotes the angle defined by the scan rotation axis S1 and a chief ray at the lowermost boundary, closest to the bottom surface 42, of the angle of view of the given infrared detection element, and $\theta_y$ denotes the angle defined by the scan rotation axis S1 and a chief ray at the lowermost boundary, closest to the bottom surface 42, of the angle of view of the adjacent infrared detection element.

A plurality of infrared detection elements constituting the infrared sensor 202 that satisfy the relationship described above allow the scan densities (resolutions) of the infrared detection elements from the upper end to the lower end to be uniform even if the infrared detection elements in each row have different rotational speeds.

This eliminates the need for the control processing unit 12 to perform the distortion correction as described above in the first embodiment. That is, the control processing unit 12 is not required to perform distortion correction, which provides the advantages of no memory use and no computational load.

Figure 9:
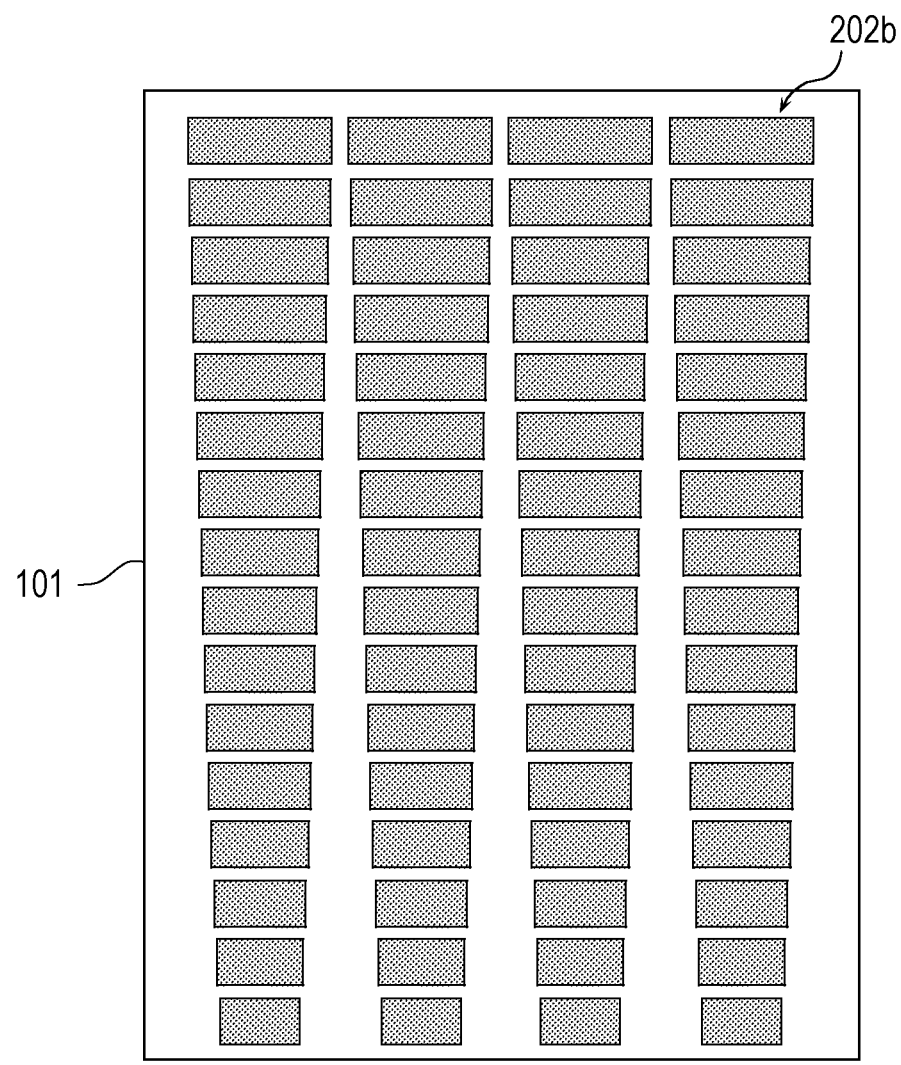
FIG. 9 is a diagram illustrating another example configuration of the infrared sensor according to the second embodiment.

The arrangement of the plurality of infrared detection elements constituting the infrared sensor 202 is not limited to that illustrated in FIG. 7. An arrangement illustrated in FIG. 9 may be used. FIG. 9 is a diagram illustrating another example configuration of the infrared sensor according to the second embodiment.

An infrared sensor 202b illustrated in FIG. 9 includes a plurality of infrared detection elements arranged in a plurality of columns and is configured such that each of the infrared detection elements in each column has horizontal edges substantially parallel to the bottom surface 42 and having a length that decreases as the distance to the bottom surface 42 decreases. More specifically, the infrared sensor 202b illustrated in FIG. 9 includes a plurality of infrared detection elements arranged in three or more columns and is configured such that each of the plurality of infrared detection elements in each of the columns has horizontal edges substantially parallel to the bottom surface 42 and having a length that decreases as the distance to the bottom surface 42 decreases, with the center-to-center distance of infrared detection elements at corresponding positions in adjacent columns among the three or more columns being kept constant. The relationship between the lengths of the horizontal edges of adjacent infrared detection elements in each column is substantially the same as that described above and thus is not described herein.

Advantages etc. of Second Embodiment

As described above, the infrared detection apparatus according to this embodiment includes the infrared sensor 202 whose central axis of the field of view is inclined with respect to the scan rotation axis S1. This can increase the detection range in a lower area near the position at which the infrared detection apparatus is installed.

In addition, the infrared detection apparatus according to this embodiment includes the infrared sensor 202, which is configured such that each of the infrared detection elements in each column has horizontal edges having a length that decreases as the distance to the bottom surface 42 decreases. Thus, even if the infrared detection elements in each row of the infrared sensor 202 whose central axis of the field of view is inclined with respect to the scan rotation axis S1 have different rotational speeds, the scan densities (resolutions) of the infrared detection elements from the upper end to the lower end can be made uniform, providing the advantage of no need for distortion correction of a thermal image.

The arrangement of the plurality of infrared detection elements constituting the infrared sensor according to this embodiment is not limited to the arrangements illustrated in FIG. 7 and FIG. 9. Some modifications are described hereinafter.

First Modification

Figure 10:
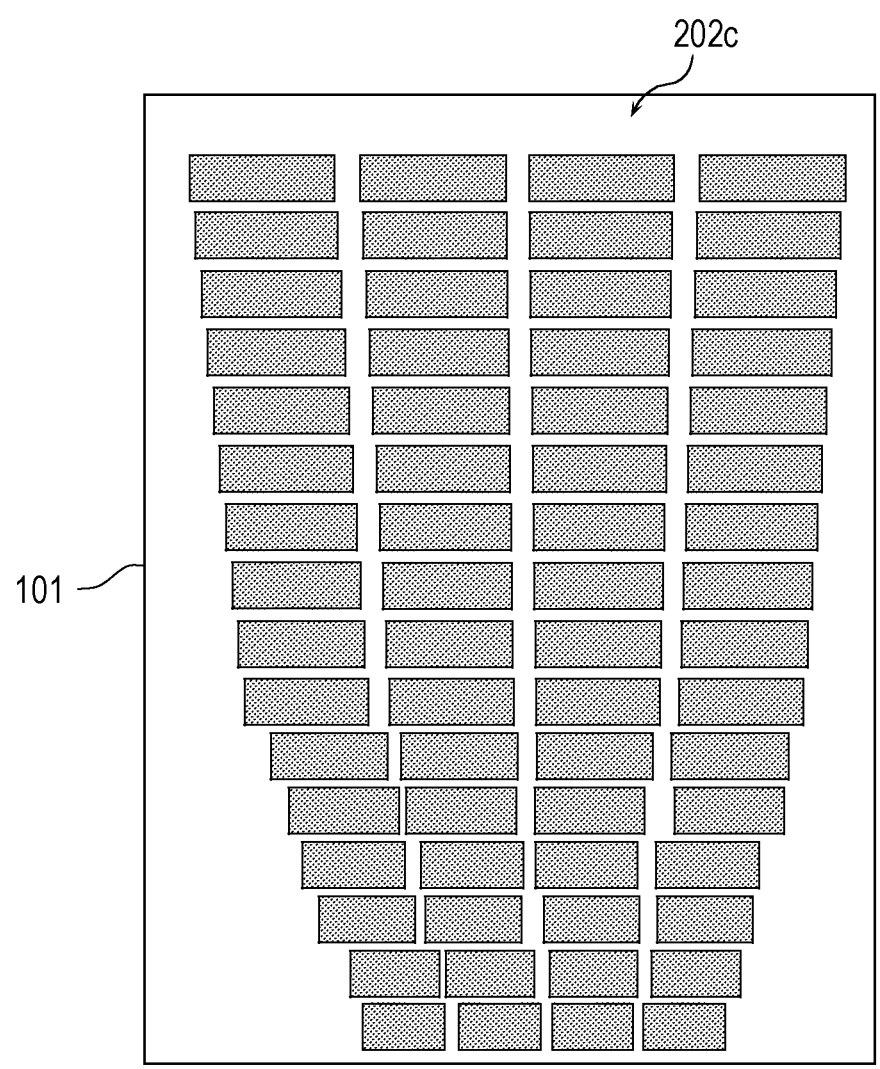
FIG. 10 is a diagram illustrating an example configuration of an infrared sensor according to a first modification of the second embodiment.

FIG. 10 is a diagram illustrating an example configuration of an infrared sensor according to a first modification of the second embodiment.

While the infrared sensor 202b illustrated in FIG. 9 has been described as including infrared detection elements such that the spacing between adjacent columns, that is, the center-to-center distance between corresponding infrared detection elements in adjacent columns, is constant, the present disclosure is not limited thereto. As in an infrared sensor 202c illustrated in FIG. 10, the infrared detection elements may be formed such that the center-to-center distance between corresponding infrared detection elements in adjacent columns decreases as the distance to the bottom surface 42 decreases. Specifically, the infrared sensor 202c illustrated in FIG. 10 may include a plurality of infrared detection elements arranged in three or more columns and may be configured such that: each of infrared detection elements in each of the three or more columns has horizontal edges substantially parallel to the bottom surface 42 and having a length that decreases as the distance to the bottom surface 42 decreases; and the infrared detection elements in each of the three or more columns are located so that the distance to the center of the three or more columns in a column direction decreases as the distance to the bottom surface 42 decreases. The relationship between the lengths of the horizontal edges of adjacent infrared detection elements in each column is substantially the same as that described with reference to FIG. 7 and thus is not described herein.

This configuration enables the infrared sensor 202c illustrated in FIG. 10 to have a smaller spacing between adjacent columns (a smaller distance between corresponding infrared detection elements in adjacent columns) than the infrared sensor 202b illustrated in FIG. 9, resulting in a higher scan density. That is, the infrared sensor 202c illustrated in FIG. 10 provides the advantage of higher-sensitivity scan than the infrared sensor 202b illustrated in FIG. 9.

Second Modification

Figure 11A:
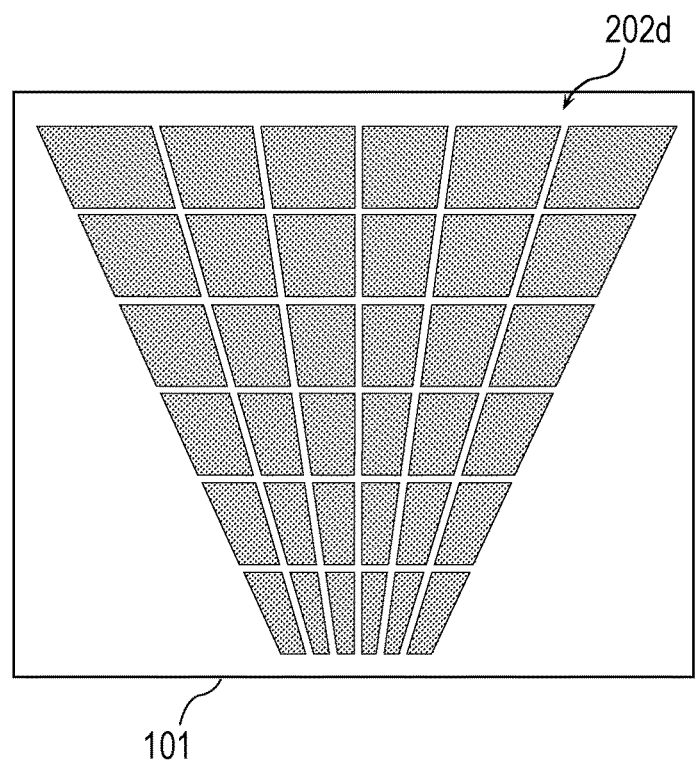
FIG. 11A is a diagram illustrating an example configuration of an infrared sensor according to a second modification of the second embodiment.
Figure 11B:
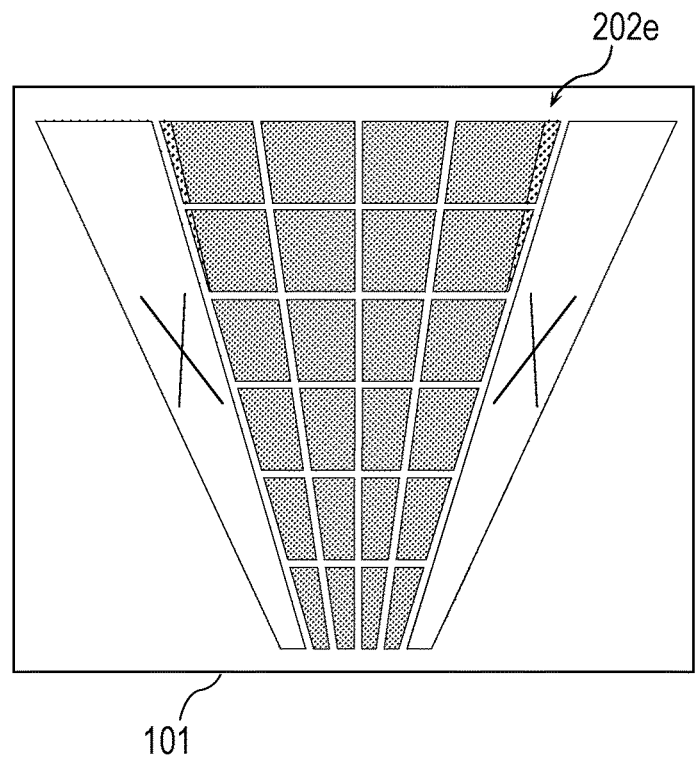
FIG. 11B is a diagram illustrating another example configuration of the infrared sensor according to the second modification of the second embodiment.

FIG. 11A is a diagram illustrating an example configuration of an infrared sensor according to a second modification of the second embodiment. FIG. 11B is a diagram illustrating another example configuration of the infrared sensor according to the second modification of the second embodiment.

While the infrared sensor 202b illustrated in FIG. 9 has been described as including a plurality of infrared detection elements each of which has a rectangular shape, the present disclosure is not limited thereto. As illustrated in FIG. 11A, in an infrared sensor 202d, each of a plurality of infrared detection elements constituting the infrared sensor 202d may have a parallelogram shape. In addition, as illustrated in FIG. 11A, the infrared sensor 202d may be configured such that whereas the distance between corresponding infrared detection elements in adjacent columns is constant, the center-to-center distance between corresponding infrared detection elements in adjacent columns decreases as the distance to the bottom surface 42 decreases.

This enables the infrared sensor 202d illustrated in FIG. 11A to have a smaller spacing between adjacent columns (a smaller distance between corresponding infrared detection elements in adjacent columns) than the infrared sensor 202c illustrated in FIG. 10, resulting in a higher scan density. That is, the infrared sensor 202d illustrated in FIG. 11A provides the advantage of higher-sensitivity scan than the infrared sensor 202c illustrated in FIG. 10.

As illustrated in FIG. 11B, in an infrared sensor 202e, the infrared detection elements at both ends in the rotation direction (at the right and left ends in FIG. 11B) among the plurality of infrared detection elements constituting the infrared sensor 202d illustrated in FIG. 11A may be disabled. This can suppress or reduce the influence of coma or spherical aberration of a lens used to concentrate infrared rays onto an infrared sensor. Spherical aberration is aberration attributable to a lens with a spherical surface, more specifically, aberration caused by the difference in path between rays that pass through a portion near the center of the lens and a portion near the edges of the lens because the lens has a spherical surface. Coma is a phenomenon in which a point image appears to have a tail at a position away from the optical axis, more specifically, a phenomenon in which light from a point away from the optical axis does not converge into a single point on an image surface to produce an image appearing to have a tail like a comet, resulting in a point image taking an elongated shape.

Third Modification

Figure 12A:
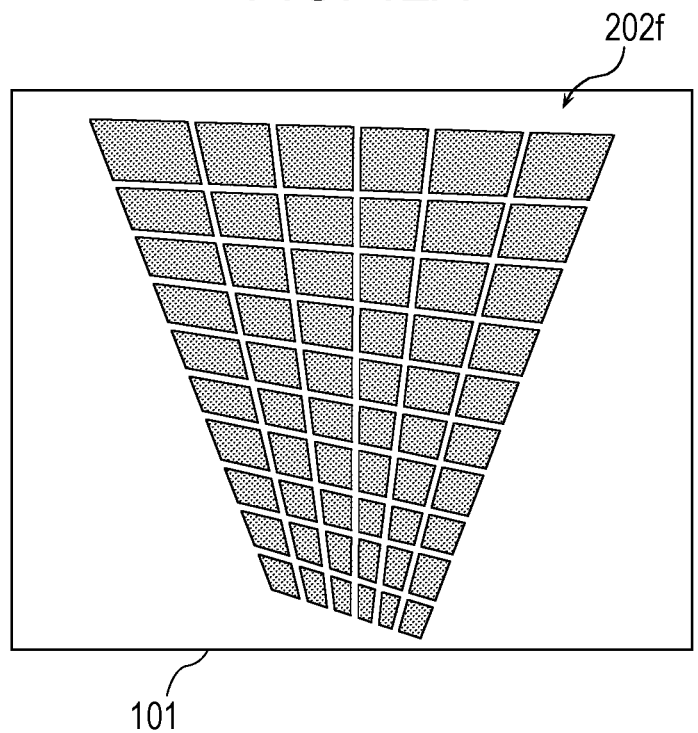
FIG. 12A is a diagram illustrating an example configuration of an infrared sensor according to a third modification of the second embodiment.
Figure 12B:
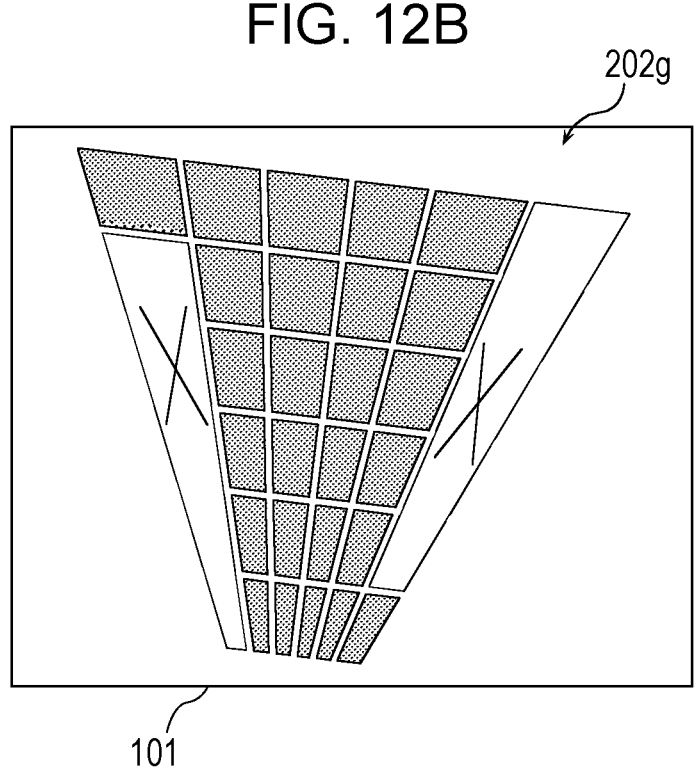
FIG. 12B is a diagram illustrating another example configuration of the infrared sensor according to the third modification of the second embodiment.

FIG. 12A is a diagram illustrating an example configuration of an infrared sensor according to a third modification of the second embodiment. FIG. 12B is a diagram illustrating another example configuration of the infrared sensor according to the third modification of the second embodiment.

While the infrared sensor 202d illustrated in FIG. 11A has been described as including a plurality of infrared detection elements such that infrared detection elements in each column are formed substantially parallel to the scan rotation axis S1 and the infrared detection elements in each row are formed substantially perpendicular to the scan rotation axis S1, the present disclosure is not limited thereto.

As illustrated in FIG. 12A, a plurality of infrared detection elements constituting an infrared sensor 202f and arranged in a matrix may be inclined at a predetermined angle with respect to the scan rotation axis S1. The predetermined angle is an angle adjusted so that all the respective center positions of the plurality of infrared detection elements constituting the infrared sensor 202f are different, as viewed in the direction perpendicular to the scan rotation axis S1.

Thus, when the infrared sensor 202f is rotated about the scan rotation axis S1, the number of infrared detection elements in the direction perpendicular to the scan rotation axis S1 is larger than that in a case where the plurality of infrared detection elements do not have a predetermined angle with respect to the scan rotation axis S1. That is, in the infrared sensor 202f, which is inclined at a predetermined angle with respect to the scan rotation axis S1, it is possible to substantially increase the number of pixels in the direction perpendicular to the scan rotation axis S1. This can enhance the resolution in the direction perpendicular to the scan rotation axis S1.

The infrared sensor 202f may be configured such that, as in the infrared sensor 202e illustrated in FIG. 11B, the infrared detection elements at both ends in the rotation direction (at the right and left ends in FIG. 12A) among the plurality of infrared detection elements constituting the infrared sensor 202f may be disabled. This can suppress or reduce the influence of coma or spherical aberration of a lens used to concentrate infrared rays onto an infrared sensor.

In addition, as in an infrared sensor 202g illustrated in FIG. 12B, of the disabled infrared detection elements in right and left end columns, particular infrared detection elements (e.g., the infrared detection element located at the lower end along the leading edge in the rotation direction and the infrared detection element located at the upper end along the trailing edge in the rotation direction) may be enabled. This is because these particular infrared detection elements are positioned at locations where the influence of lens distortion can also be reduced. Enabling such particular infrared detection elements (e.g., the infrared detection element located at the lower end along the leading edge in the rotation direction and the infrared detection element located at the upper end along the trailing edge in the rotation direction) can increase the number of infrared detection elements in the direction (the vertical axis) perpendicular to the scan rotation axis S1, compared to the case where all the infrared detection elements in both end columns are disabled, resulting in an increased number of pixels of a thermal image in the direction perpendicular to the scan rotation axis S1.

Fourth Modification

Figure 13:
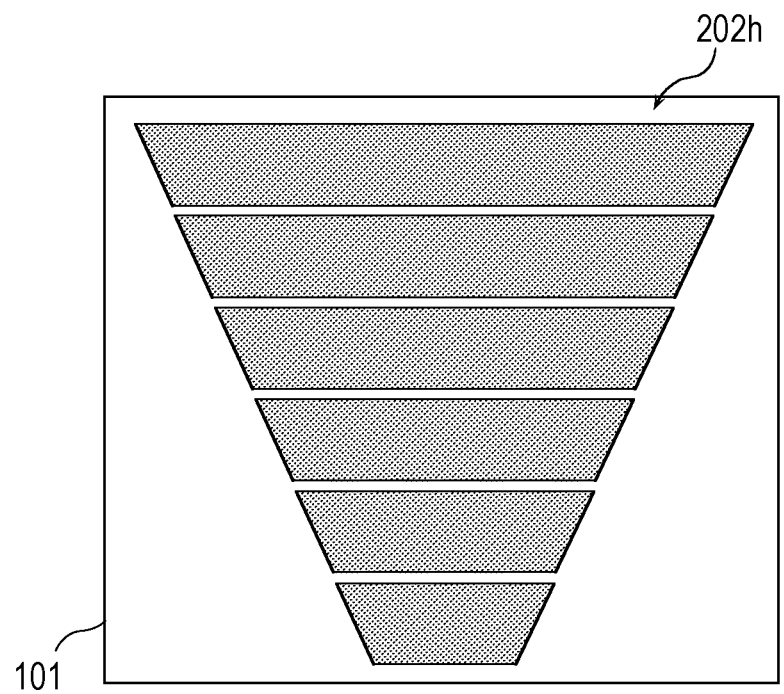
FIG. 13 is a diagram illustrating an example configuration of an infrared sensor according to a fourth modification of the second embodiment.

FIG. 13 is a diagram illustrating an example configuration of an infrared sensor 202h according to a fourth modification of the second embodiment.

While the infrared sensor 202 illustrated in FIG. 7 has been described as including a plurality of infrared detection elements each of which has a rectangular shape, the present disclosure is not limited thereto. As in the infrared sensor 202h illustrated in FIG. 13, a plurality of infrared detection elements constituting the infrared sensor 202h may be each formed into a trapezoidal shape. In this case, the lengths of the vertical edges of the plurality of infrared detection elements of the infrared sensor 202h are constant.

The relationship between the lengths of the horizontal edges of the infrared detection elements in a column which constitute the infrared sensor 202h is substantially the same as that described with reference to FIG. 7 and thus is not described herein.

Fifth Modification

Figure 14:
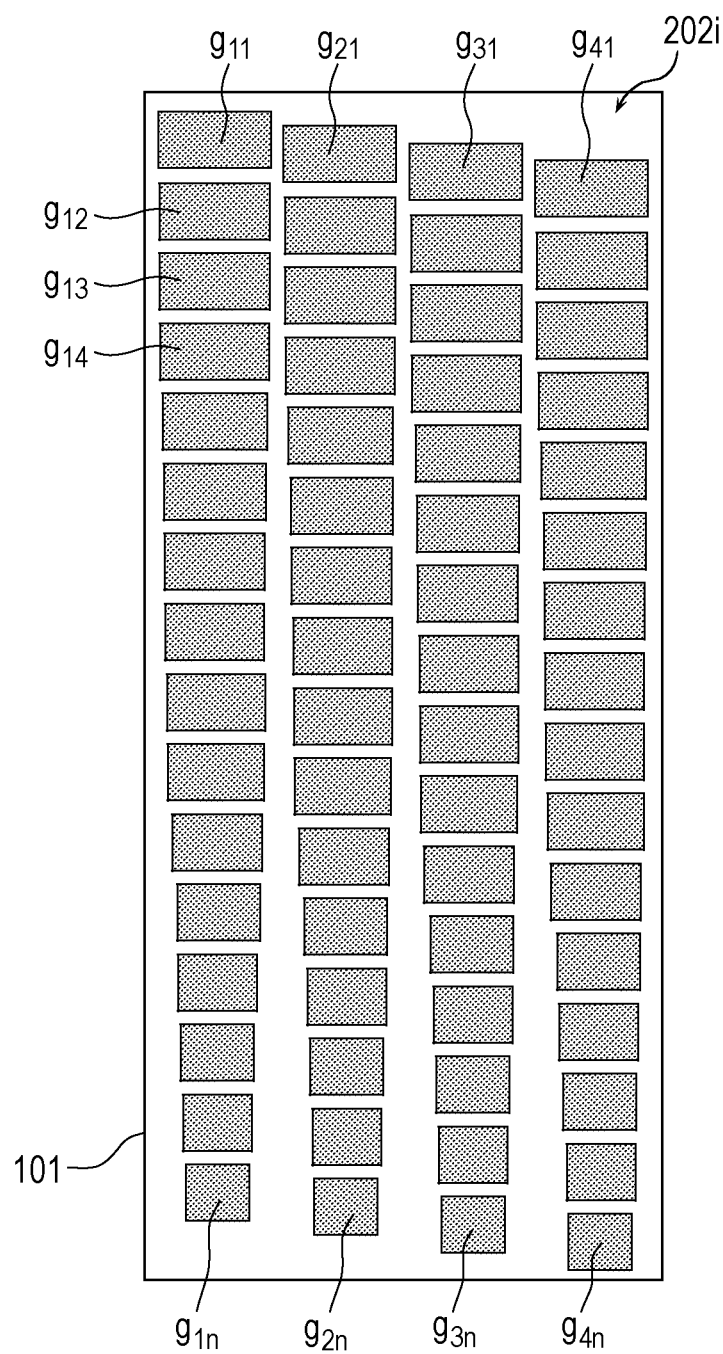
FIG. 14 is a diagram illustrating an example configuration of an infrared sensor according to a fifth modification of the second embodiment.
Figure 15:
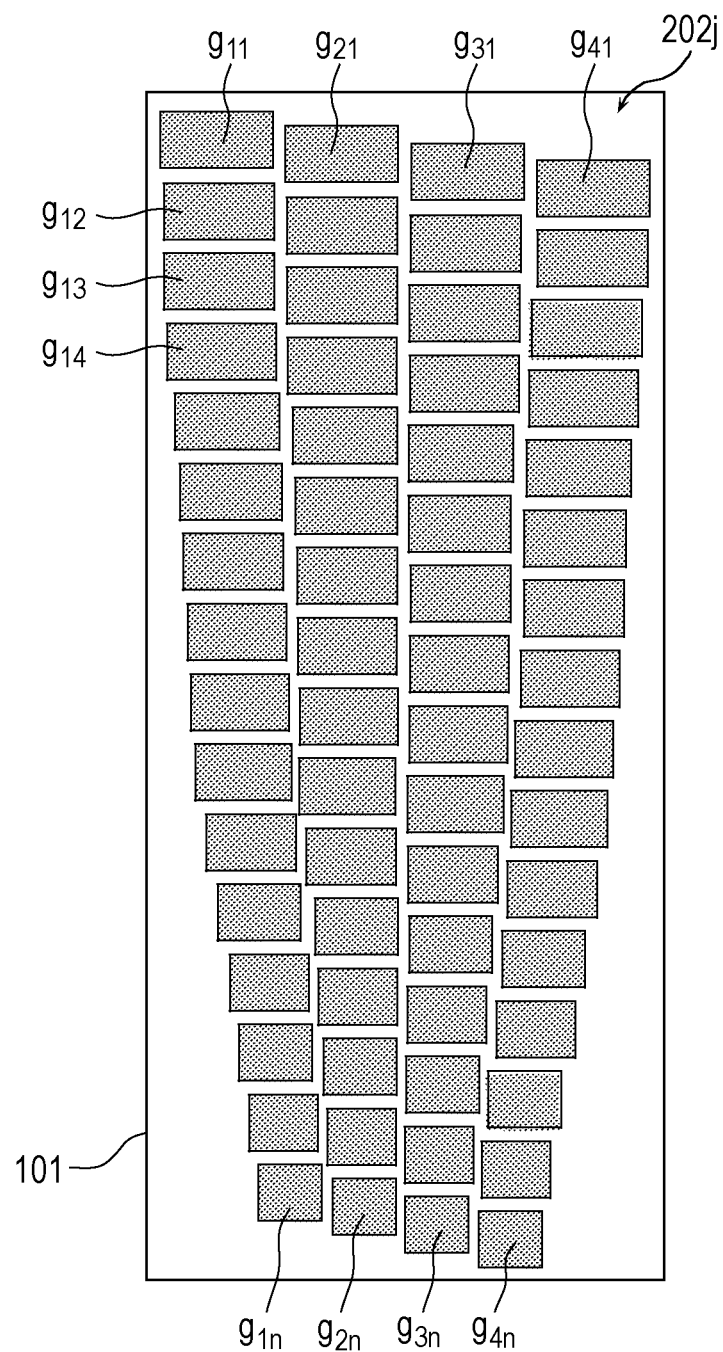
FIG. 15 is a diagram illustrating another example configuration of the infrared sensor according to the fifth modification of the second embodiment.

FIG. 14 is a diagram illustrating an example configuration of an infrared sensor according to a fifth modification of the second embodiment. FIG. 15 is a diagram illustrating another example configuration of the infrared sensor according to the fifth modification of the second embodiment. FIG. 16 is a table depicting an example of the sizes of a plurality of infrared detection elements constituting the infrared sensor according to the fifth modification of the second embodiment.

While the infrared sensor 202b illustrated in FIG. 9 has been described as including infrared detection elements such that the spacing between adjacent columns, that is, the center-to-center spacing of corresponding infrared detection elements in adjacent columns, is constant and the positions of corresponding infrared detection elements in adjacent columns are the same, the present disclosure is not limited thereto. As in an infrared sensor 202i illustrated in FIG. 14, the positions of infrared detection elements in each column may be displaced with respect to the positions of corresponding infrared detection elements in an adjacent column.

FIG. 14 illustrates an example in which an infrared detection element $g_{11}$ at the upper end in the first column and an infrared detection element $g_{21}$ at the upper end in the second column are displaced from each other by ¼ pixel, the infrared detection element $g_{21}$ at the upper end in the second column and an infrared detection element $g_{31}$ at the upper end in the third column are displaced from each other by ¼ pixel, and the infrared detection element $g_{31}$ at the upper end in the third column and an infrared detection element $g_{41}$ at the upper end in the fourth column are displaced from each other by ¼ pixel. Likewise, in each row other than upper end, the positions of corresponding infrared detection elements in adjacent columns are displaced from each other by ¼ pixel.

In other words, in the infrared sensor 202i illustrated in FIG. 14, the positions of the first infrared detection elements, as viewed from the bottom surface 42, in three or more columns are sequentially displaced toward the bottom surface 42. The positions of the first infrared detection elements may be such that the position of the first infrared detection element in a given column is displaced from the position of the first infrared detection element in an adjacent column by ¼ of the length of the vertical edges of the first infrared detection element in the adjacent column, which are substantially perpendicular to the bottom surface 42. The relationship between the lengths of the horizontal edges of adjacent infrared detection elements in each column is substantially the same as that described with reference to FIG. 7 and thus is not described herein.

Thus, when the infrared sensor 202i is rotated about the scan rotation axis S1, the number of infrared detection elements in the direction perpendicular to the scan rotation axis S1 is larger than that in the infrared sensor 202b illustrated in FIG. 9. That is, in the infrared sensor 202i, it is possible to substantially increase the number of pixels in the direction perpendicular to the scan rotation axis S1. This can enhance the resolution in the direction perpendicular to the scan rotation axis S1.

While the infrared sensor 202i illustrated in FIG. 14 has been described as including infrared detection elements such that the spacing between adjacent columns, that is, the center-to-center spacing of corresponding infrared detection elements in adjacent columns, is constant, the present disclosure is not limited thereto. As in an infrared sensor 202j illustrated in FIG. 15, the infrared detection elements in each column may be formed such that the center-to-center spacing of corresponding infrared detection elements in adjacent columns decreases as the distance to the bottom surface 42 decreases.

FIG. 16 depicts the lengths of the horizontal edges (horizontal widths) of the infrared detection elements in each row that satisfy Equation (1) above when the plurality of infrared detection elements constituting each of the infrared sensor 202i illustrated in FIG. 14 and the infrared sensor 202j illustrated in FIG. 15 are arranged in 16 rows and 4 columns and the vertex angle $\theta_z$ relative to the scan rotation axis S1 is 30 degrees.

As in a first propose, it is desirable to set the lengths of the vertical edges (vertical widths) so that the ratio of the lengths of the vertical edges and the horizontal edges of the infrared detection element located at the lowermost end is 2/1. If there is a constraint in a process, alternatively, as in a second propose, the lengths of the vertical edges (vertical widths) may be set so that the ratio of the lengths of the vertical edges and the horizontal edges of the infrared detection element located at the lowermost end is 3/2 (0.75/0.5).

Third Embodiment

While in the first and second embodiments, reference has been made to an infrared detection apparatus including an infrared sensor whose central axis of the field of view is inclined with respect to a scan rotation axis parallel to the installation surface 41, the present disclosure is not limited thereto. An example in this case will be described hereinbelow.

Configuration of Infrared Detection Apparatus

An infrared detection apparatus according to a third embodiment will be described hereinafter with reference to the drawings.

Figure 17:
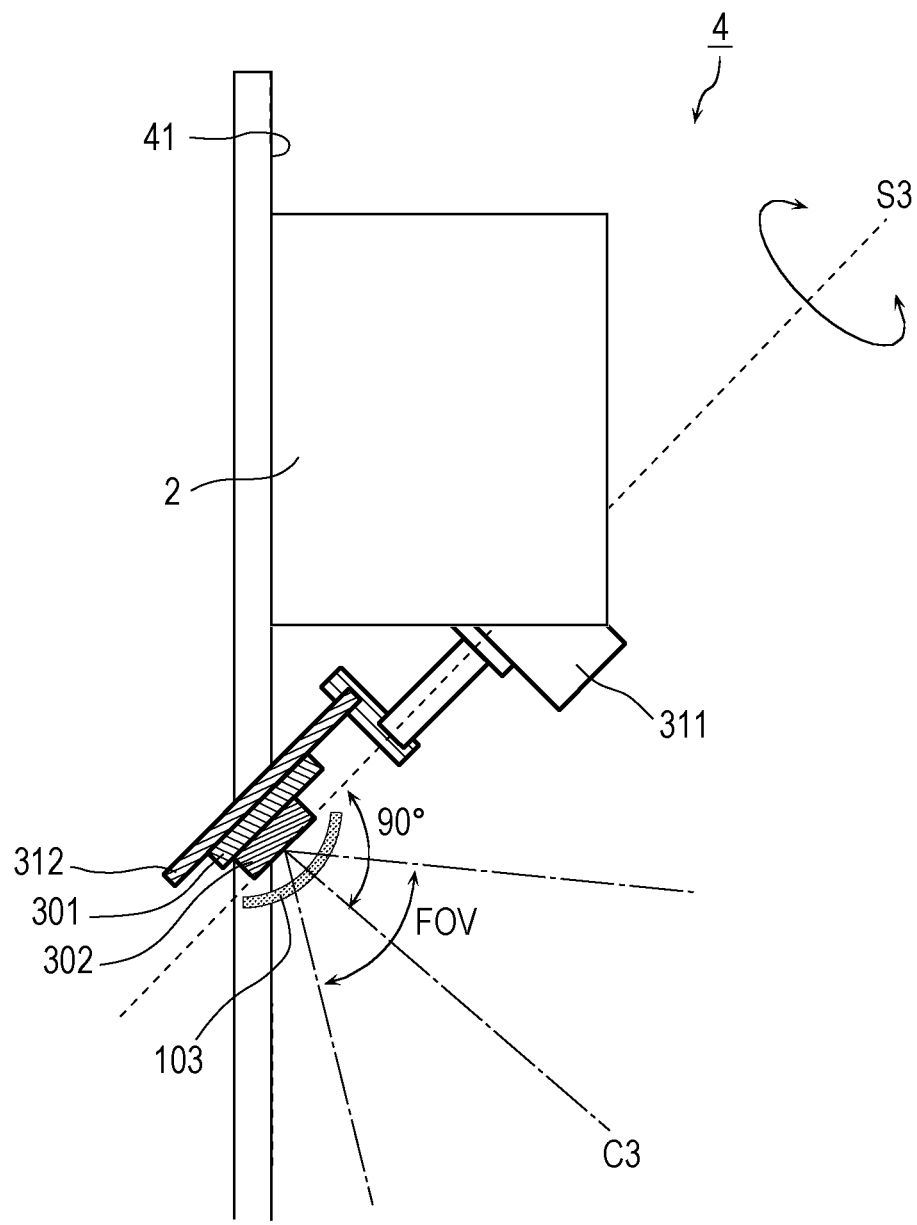
FIG. 17 is a schematic view of a physical configuration in which an infrared detection apparatus according to a third embodiment is mounted on a housing.

FIG. 17 is a schematic view of a physical configuration in which the infrared detection apparatus according to the third embodiment is mounted on a housing. Elements similar to those in FIG. 1 to FIG. 4 are assigned the same numerals and symbols and are not described in detail herein.

As illustrated in FIG. 17, the infrared detection apparatus according to this embodiment is attached to the housing 2 installed on the installation surface 41, which is substantially perpendicular to the bottom surface 42 of the space 4 and which is at a predetermined height from the bottom surface 42, and acquires a thermal image of the detection range. As in the first and second embodiments, the predetermined height is a height higher than the position of an object whose temperature is being detected (an object being measured), such a person or a heat source, and is, for example, greater than or equal to 1800 mm.

The infrared detection apparatus according to this embodiment illustrated in FIG. 17 is different from the infrared detection apparatus 1 according to the first embodiment in that a scan rotation axis S3 of a scanning unit (a motor 311), a mounting base 312, a sensor module 301, and an infrared sensor 302 are disposed at an inclination with respect to the installation surface 41. The configuration of the mounting base 312, the sensor module 301, and the infrared sensor 302 is the same as that of the mounting base 112, the sensor module 101, and the infrared sensor 102 according to the first embodiment, respectively, except for the arrangement thereof, and thus is not described herein.

In this embodiment, the scan rotation axis S3 and the arrangement surface of the infrared sensor 302 are inclined with respect to the installation surface 41. Thus, as illustrated in FIG. 17, the central axis C3 of the field of view of the infrared sensor 302 is not parallel to the direction vertical to the installation surface 41 (i.e., is not parallel to the bottom surface 42). In addition, as illustrated in FIG. 17, the scan rotation axis S3 passes along the arrangement surface of the infrared sensor 302 and the infrared sensor 302 is rotated about the scan rotation axis S3 that passes along the arrangement surface.

Thus, in this embodiment, the scan rotation axis S3 itself is inclined with respect to the installation surface 41, and the central axis C3 of the field of view of the infrared sensor 302 is substantially perpendicular to the scan rotation axis S3.

Advantages etc. of Third Embodiment

Accordingly, when the infrared sensor 302 is rotated about the scan rotation axis S3, an upper end and a lower end of the infrared sensor 302, as viewed from the bottom surface 42, rotate at the same speed (or pitch). This eliminates the need for the control processing unit 12 to perform the distortion correction as described above in the first embodiment. That is, the control processing unit 12 is not required to perform distortion correction, which provides the advantages of no memory use and no computational load.

Furthermore, the infrared detection apparatus according to this embodiment includes the infrared sensor 302 with the central axis C3 of the field of view being inclined toward the bottom surface 42 with respect to the direction substantially perpendicular to the installation surface 41. This also provides the advantage of increased detection range in a lower area near the position at which the infrared detection apparatus is installed.

Modification of First to Third Embodiments

In the second embodiment, as described above, the infrared sensor 202 includes a plurality of infrared detection elements arranged in one or more columns and is configured such that each of the infrared detection elements in each column has horizontal edges substantially parallel to the bottom surface 42 and having a length that decreases as the distance to the bottom surface 42 decreases. In addition, the lengths of the horizontal edges of adjacent infrared detection elements in each column are defined by Equation (1) above. However, the lengths of the horizontal edges are not limited to those defined by Equation (1) above.

For example, the lengths of the horizontal edges may not necessarily satisfy the relationship of $L_x/L_y=\sin(\theta_x)/\sin(\theta_y)$ as in Equation (1) above and may satisfy the relationship of $L_x/L_y>\sin(\theta_x)/\sin(\theta_y)$ or the relationship of $L_x/L_y<\sin(\theta_x)/\sin(\theta_y)$.

More specifically, the relationship of $L_x/L_y>\sin(\theta_x)/\sin(\theta_y)$ may be satisfied, where $L_x$ denotes the length of the horizontal edges of a given infrared detection element among the plurality of infrared detection elements in each column, $L_y$ denotes the length of the horizontal edges of an infrared detection element adjacent to the given infrared detection element in the direction close to the bottom surface 42, $\theta_x$ denotes the angle defined by the scan rotation axis S1 and a chief ray at the lowermost boundary, closest to the bottom surface 42, of the angle of view of the given infrared detection element, and $\theta_y$ denotes the angle defined by the scan rotation axis S1 and a chief ray at the lowermost boundary, closest to the bottom surface 42, of the angle of view of the adjacent infrared detection element.

In this case, there is an advantage that an infrared detection element having a horizontal effective viewing angle (parallel to the bottom surface 42) among the infrared detection elements constituting the infrared sensor is capable of performing scanning with high sensitivity. This capability is suitable for high-sensitivity scanning of an object being measured that is horizontally far from the position at which the infrared detection apparatus is installed.

Alternatively, the relationship of $L_x/L_y<\sin(\theta_x)/\sin(\theta_y)$ may be satisfied, where $L_x$ denotes the length of the horizontal edges of a given infrared detection element among the plurality of infrared detection elements in each column, $L_y$ denotes the length of the horizontal edges of an infrared detection element adjacent to the given infrared detection element in the direction close to the bottom surface 42, $\theta_x$ denotes the angle defined by the scan rotation axis S1 and a chief ray at the lowermost boundary, closest to the bottom surface 42, of the angle of view of the given infrared detection element, and $\theta_y$ denotes the angle defined by the scan rotation axis S1 and a chief ray at the lowermost boundary, closest to the bottom surface 42, of the angle of view of the adjacent infrared detection element.

In this case, there is an advantage in that an infrared detection element closer to the position directly below the position at which the infrared detection apparatus is installed is capable of performing scanning with higher scan density (higher sensitivity) with respect to the distance. This capability is suitable for high-sensitivity scanning of an area immediately below the position at which the infrared detection apparatus is installed.

A housing on which the infrared detection apparatus described with reference to each of the first to third embodiments is mounted is not limited to that of air conditioning equipment. The infrared detection apparatus may be mounted on a security camera or in a microwave oven.

Advantages etc. of First to Third Embodiments

An infrared detection apparatus according to an aspect of the present disclosure is an infrared detection apparatus for attachment to a housing installed in a space on an installation surface of the space, the installation surface being substantially perpendicular to a bottom surface of the space and being at a predetermined height from the bottom surface. The infrared detection apparatus includes an infrared sensor including one or more infrared detection elements arranged in one or more columns, and a scanning unit having a scan rotation axis. The scanning unit rotates the infrared sensor about the scan rotation axis to thereby cause the infrared sensor to scan the space. The one or more infrared detection elements are arranged on an arrangement surface which is inclined with respect to the installation surface.

With this configuration, it is possible to realize an infrared detection apparatus with an increased detection range in a lower area near the position at which the infrared detection apparatus is installed.

For example, the arrangement surface may have at a center thereof a rotation center which is the rotation center of the infrared sensor when the infrared sensor is rotated about the scan rotation axis and through which the scan rotation axis passes.

For example, the scan rotation axis and the arrangement surface may be inclined with respect to the installation surface, the scan rotation axis may pass across the arrangement surface, and the infrared sensor may be rotated about the scan rotation axis that passes along the arrangement surface.

For example, the scan rotation axis may be substantially parallel to the installation surface, and the arrangement surface may cross the scan rotation axis.

In this case, for example, the infrared sensor is configured such that a plurality of infrared detection elements are arranged in one or more columns and each of a plurality of infrared detection elements in each of the one or more columns has a horizontal edge substantially parallel to the bottom surface, the horizontal edge having a length that decreases as the distance to the bottom surface decreases.

In addition, for example, the relationship of $L_x/L_y=\sin(\theta_x)/\sin(\theta_y)$ may be satisfied, where $L_x$ denotes the length of the horizontal edges of a given infrared detection element among the plurality of infrared detection elements in each column, $L_y$ denotes the length of the horizontal edges of an infrared detection element adjacent to the given infrared detection element in the direction close to the bottom surface, $\theta_x$ denotes the angle defined by the scan rotation axis and a chief ray at the lowermost boundary, closest to the bottom surface, of the angle of view of the given infrared detection element, and $\theta_y$ denotes the angle defined by the scan rotation axis and a chief ray at the lowermost boundary, closest to the bottom surface, of the angle of view of the adjacent infrared detection element.

Alternatively, for example, the relationship of $L_x/L_y>\sin(\theta_x)/\sin(\theta_y)$ may be satisfied, where $L_x$ denotes the length of the horizontal edges of a given infrared detection element among the plurality of infrared detection elements in each column, $L_y$ denotes the length of the horizontal edges of an infrared detection element adjacent to the given infrared detection element in the direction close to the bottom surface, $\theta_x$ denotes the angle defined by the scan rotation axis and a chief ray at the lowermost boundary, closest to the bottom surface, of the angle of view of the given infrared detection element, and $\theta_y$ denotes the angle defined by the scan rotation axis and a chief ray at the lowermost boundary, closest to the bottom surface, of the angle of view of the adjacent infrared detection element.

Alternatively, for example, the relationship of $L_x/L_y<\sin(\theta_x)/\sin(\theta_y)$ may be satisfied, where $L_x$ denotes the length of the horizontal edges of a given infrared detection element among the plurality of infrared detection elements in each column, $L_y$ denotes the length of the horizontal edges of an infrared detection element adjacent to the given infrared detection element in the direction close to the bottom surface, $\theta_x$ denotes the angle defined by the scan rotation axis and a chief ray at the lowermost boundary, closest to the bottom surface, of the angle of view of the given infrared detection element, and $\theta_y$ denotes the angle defined by the scan rotation axis and a chief ray at the lowermost boundary, closest to the bottom surface, of the angle of view of the adjacent infrared detection element.

For example, the infrared sensor may include a plurality of infrared detection elements arranged in three or more columns and may be configured such that each of a plurality of infrared detection elements in each of the three or more columns has a horizontal edge substantially parallel to the bottom surface, the horizontal edge having a length that decreases as the distance to the bottom surface decreases, with the center-to-center distance of infrared detection elements at corresponding positions in adjacent columns among the three or more columns being kept constant.

Alternatively, for example, the infrared sensor may include a plurality of infrared detection elements arranged in three or more columns and may be configured such that each of infrared detection elements in each of the three or more columns has a horizontal edge substantially parallel to the bottom surface, the horizontal edge having a length that decreases as the distance to the bottom surface decreases, and the positions of a plurality of infrared detection elements in each of the three or more columns are located so that the distance to the center of the three or more columns in a column direction decreases as the distance to the bottom surface decreases.

For example, the positions of the first infrared detection elements, as viewed from the bottom surface, in the three or more columns may be sequentially displaced toward the bottom surface.

For example, the positions of the first infrared detection elements may be such that the position of the first infrared detection element in a given column is displaced from the position of the first infrared detection element in an adjacent column by ¼ of the length of vertical edges of the first infrared detection element in the adjacent column, which are substantially perpendicular to the bottom surface.

For example, in the infrared sensor, the one or more columns may be disposed at an inclination at a predetermined angle with respect to the scan rotation axis.

For example, the predetermined angle may be an angle adjusted so that all the respective center positions of the plurality of infrared detection elements constituting the infrared sensor are different, as viewed in the direction perpendicular to the scan rotation axis.

These general or specific embodiments may be implemented as a system, a method, an integrated circuit, a computer program, or a computer-readable recording medium such as a compact disc read-only memory (CD-ROM) or may be implemented as any selective combination thereof.

Fourth Embodiment

In this embodiment, a specific aspect of an infrared detection apparatus that can obtain enhanced resolution of a thermal image without an increase in the number of infrared detection elements will be described.

Configuration of Infrared Detection Apparatus

An infrared detection apparatus according to a fourth embodiment will be described hereinafter with reference to the drawings.

Figure 18:
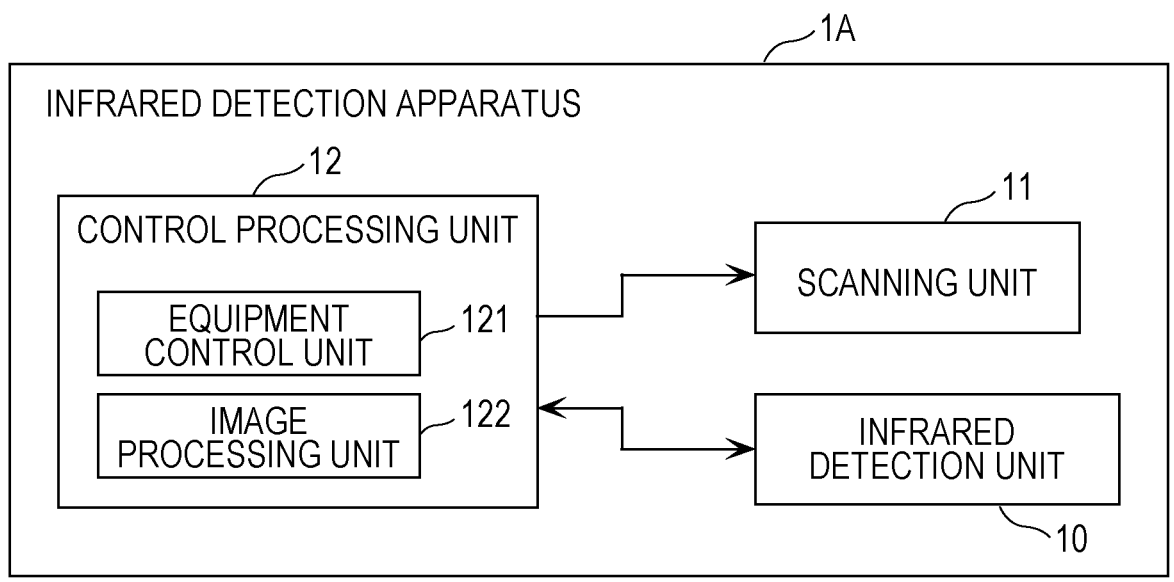
FIG. 18 is a diagram illustrating an example configuration of an infrared detection apparatus according to a fourth embodiment.
Figure 19A:
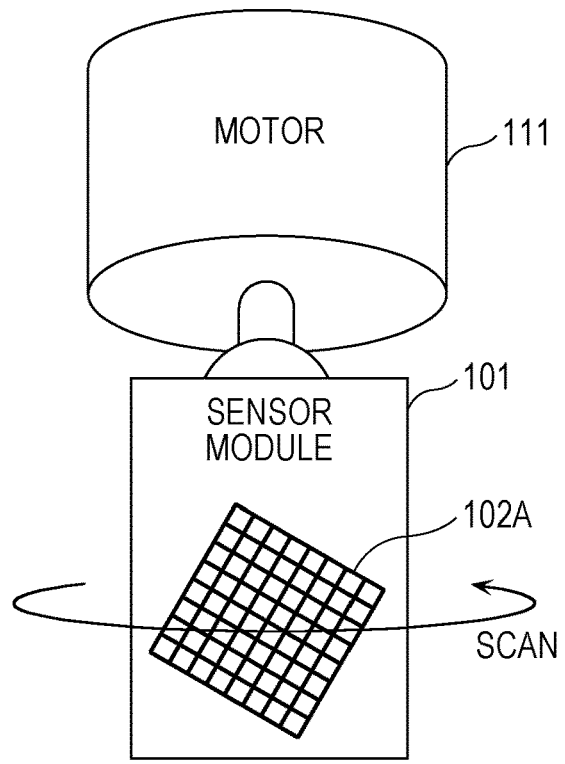
FIG. 19A is an image view of a configuration of a scanning unit and an infrared detection unit according to the fourth embodiment.
Figure 19B:
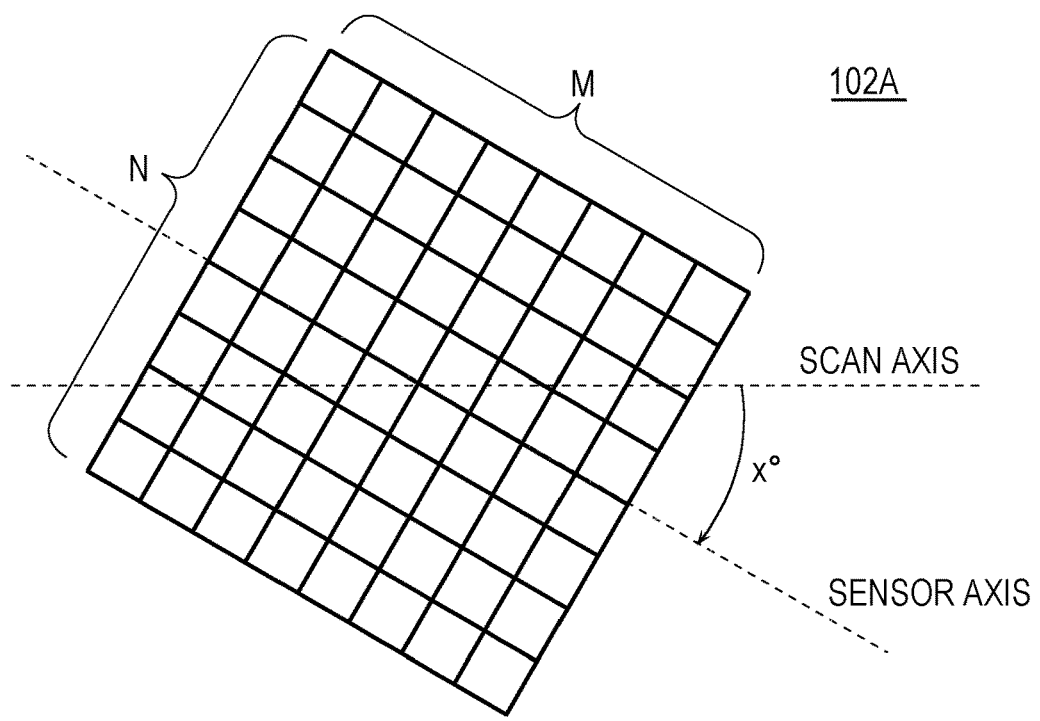
FIG. 19B is an image view of a configuration of an infrared sensor according to the fourth embodiment.

FIG. 18 is a diagram illustrating an example configuration of an infrared detection apparatus 1A according to the fourth embodiment. FIG. 19A is an image view of a configuration of an infrared detection unit 10 and a scanning unit 11 according to this embodiment. FIG. 19B is an image view of a configuration of an infrared sensor 102A according to this embodiment.

As illustrated in FIG. 18, the infrared detection apparatus 1A includes the infrared detection unit 10, the scanning unit 11, and a control processing unit 12.

The scanning unit 11 causes the infrared detection unit 10 to scan in a predetermined direction. More specifically, the scanning unit 11 moves the infrared sensor 102A in the predetermined direction to thereby cause the infrared sensor 102A to scan a detection range. In this embodiment, the scanning unit 11 includes a motor 111 illustrated in FIG. 19A. The motor 111 is controlled by the control processing unit 12 to cause the infrared sensor 102A of the sensor module 101 to rotate or move in the predetermined direction. The motor 111 is, for example, a stepping motor, a servo motor, or the like. The predetermined direction is a horizontal direction in FIG. 19A and corresponds to a direction of the scan axis (a scan direction) in FIG. 19B.

The control processing unit 12 controls the scanning unit 11 and processes thermal images (input images) acquired by the infrared detection unit 10. As illustrated in FIG. 18, the control processing unit 12 includes an equipment control unit 121 and an image processing unit 122.

The equipment control unit 121 determines control information for controlling the scanning unit 11 to scan on the basis of information detected by the infrared detection unit 10 and controls the scanning unit 11 in accordance with the determined control information. The image processing unit 122 generates a high-definition thermal image (an output image) by performing a super-resolution process on thermal images (input images) acquired by the infrared detection unit 10 and reconstructing the thermal images (input images). The image processing unit 122 outputs the generated high-definition thermal image, that is, a thermal image subjected to the super-resolution process.

The thermal image is an image composed of a plurality of pixels representing a distribution of temperatures over a temperature detection range. The super-resolution process is one of the resolution-enhancement processes that enable the generation of high-resolution information (an output image) that is not included in an input image. Examples of the super-resolution process include a processing method for obtaining a single high-resolution image from a plurality of images and a processing method that uses learning data. In this embodiment, the infrared detection unit 10 is caused to scan by the scanning unit 11 to thereby be able to acquire a thermal image of the temperature detection range, which is a thermal image with sub-pixel-level displacement, that is, thermal image data at different sample points. Thus, the following description will be given assuming the use of a processing method for obtaining a single high-resolution thermal image from a plurality of thermal images.

The image processing unit 122 may further acquire thermal image data indicating a person's location or the position or temperature of a heat source, such as the temperature of a user's hand or face or the temperature of a wall, within the temperature detection range on the basis of the thermal image subjected to the super-resolution process, and output the thermal image data.

The infrared detection unit 10 is caused to scan in a predetermined direction by the scanning unit 11 to thereby acquire a thermal image of the temperature detection range. More specifically, the infrared detection unit 10 includes the infrared sensor 102A including a plurality of infrared detection elements arranged in a matrix, and detects infrared radiation in the temperature detection range scanned by the infrared sensor 102A. The infrared sensor 102A is disposed so that the plurality of infrared detection elements arranged in a matrix are inclined at a predetermined angle with respect to the predetermined direction. The predetermined angle is an angle adjusted so that all the respective center positions of the plurality of infrared detection elements constituting the infrared sensor 102A are different, as viewed in the predetermined direction.

In this embodiment, the infrared detection unit 10 is constituted by, for example, the sensor module 101 illustrated in FIG. 19A. The sensor module 101 includes the infrared sensor 102A and a lens (not illustrated).

The lens is formed of a material with high infrared transmittance, such as silicon or ZnS. The lens is designed such that infrared radiation (infrared light) incident on the lens from individual directions enters different infrared detection elements constituting the infrared sensor 102A.

The infrared sensor 102A is constituted by, for example, as illustrated in FIG. 19B, a plurality of infrared detection elements arranged in a matrix of N rows and M columns (N and M are each a natural number greater than or equal to 2). Further, the infrared sensor 102A is rotated (moved) horizontally, that is, along the direction of the scan axis illustrated in FIG. 19B, to thereby be able to scan the temperature detection range. The infrared detection unit 10 is caused to scan in the predetermined direction (horizontally) to acquire a thermal image (an infrared image) of the temperature detection range, and outputs the thermal image to the image processing unit 122.

More specifically, the infrared sensor 102A is caused by the motor 111 to rotate (move) horizontally, that is, in the direction of the scan axis illustrated in FIG. 19B, for each sub-pixel position. As a result, the infrared sensor 102A acquires a thermal image of the temperature detection range, which is a thermal image (an infrared image) with sub-pixel-level displacement, and outputs the thermal image to the image processing unit 122.

The infrared sensor 102A is inclined at a predetermined angle (X° in FIG. 19B) with respect to the horizontal direction, that is, the direction of the scan axis illustrated in FIG. 19B. In other words, the infrared sensor 102A is constituted by a plurality of infrared detection elements arranged in a matrix of N rows and M columns, and the plurality of infrared detection elements in the matrix are arranged so as to be parallel and perpendicular to a sensor axis that is inclined at a predetermined angle (X°) with respect to the scan axis. That is, the predetermined angle (X°) is an angle adjusted so that all the respective center positions of the plurality of infrared detection elements constituting the infrared sensor 102A are different, as viewed in the direction of the scan axis. In other words, furthermore, the predetermined angle (X°) is an angle adjusted so that, when the plurality of infrared detection elements are rotated (moved) along the direction of the scan axis, the infrared detection elements in the M columns in a certain row which is parallel to the sensor axis and the infrared detection elements in rows adjacent to the certain row do not overlap in the direction of the scan axis.

Since the infrared sensor 102A is inclined at a predetermined angle (X° in FIG. 19B) with respect to the direction of the scan axis, the plurality of infrared detection elements constituting the infrared sensor 102A have the following relationships. The distances (e.g., a first distance) in the direction perpendicular to the scan axis (in FIG. 19B, in the longitudinal direction) between the respective center positions of adjacent infrared detection elements in the same column (e.g., in a first arrangement) are equal to each other.

In addition, the distance (e.g., a second distance) in the direction perpendicular to the scan axis (i.e., in the longitudinal direction) between the center position of the infrared detection element (e.g., a first element) located at an end of that column (i.e., the first arrangement) that corresponds to the leading edge in the scan direction and the center position of the infrared detection element (e.g., a second element) that is a column (e.g., a second arrangement) adjacent to that column (i.e., the first arrangement) and that is adjacent to the infrared detection element located at the other end of that column (i.e., the first arrangement) is equal to the first distance.

With this arrangement, when the plurality of infrared detection elements are rotated (moved) along the direction of the scan axis, the number of infrared detection elements in the direction perpendicular to the scan axis becomes larger than N, which is the number of infrared detection elements in the direction perpendicular to the scan axis in a case where the scan axis and the sensor axis are parallel. That is, in the infrared sensor 102A whose sensor axis is inclined from the scan axis by a predetermined angle (X°), it is possible to substantially increase the number of pixels of a thermal image in the direction (the vertical axis) perpendicular to the scan axis, compared with the case where the sensor axis is parallel to the scan axis. This can enhance the resolution in the direction (the vertical axis) perpendicular to the scan axis.

An example of the predetermined angle will be described hereinafter in conjunction with an exemplary implementation.

Exemplary Implementation

Next, an example configuration of the infrared sensor 102A according to an exemplary implementation will be described with reference to FIG. 20 and FIG. 21.

Figure 20:
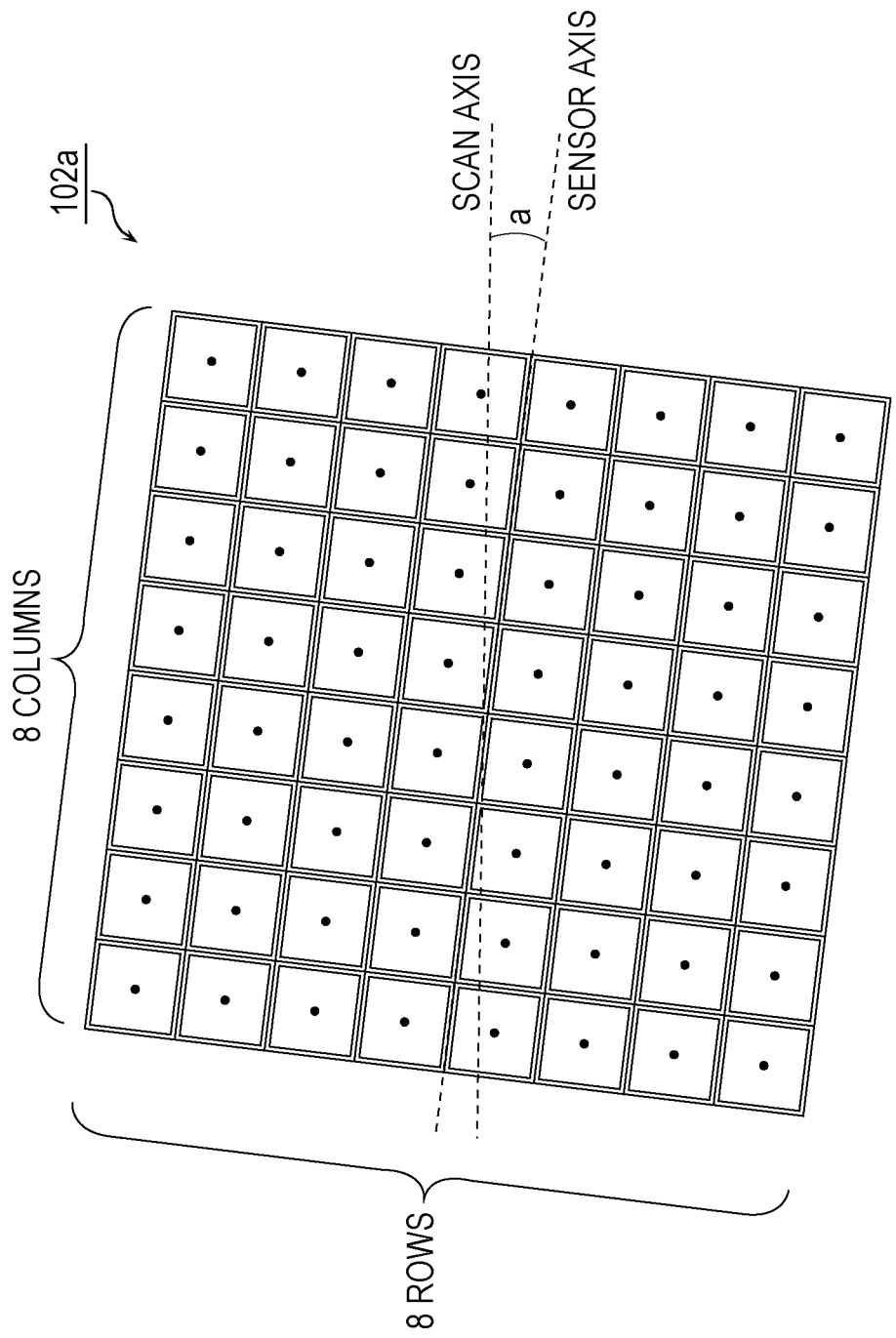
FIG. 20 is a diagram illustrating an example of an infrared sensor according to an exemplary implementation of the fourth embodiment.

FIG. 20 is a diagram illustrating an infrared sensor according to an exemplary implementation of the fourth embodiment.

An infrared sensor 102a illustrated in FIG. 20 is an example of the infrared sensor 102A and is constituted by a plurality of infrared detection elements arranged in 8 rows and 8 columns. A detection point is depicted at the center of each of the infrared detection elements illustrated in FIG. 20. Each infrared detection element may have high infrared detection sensitivity at its detection point and may detect infrared radiation at the detection point. Alternatively, while each infrared detection element detects infrared radiation on the entire area thereof, each infrared detection element may dominantly detect infrared radiation at the detection point thereof. Each detection point may represent the area of the corresponding infrared detection element. In this case, each detection point may represent the average of infrared radiation detected by the corresponding infrared detection element.

The sensor axis of the plurality of infrared detection elements in the 8 rows and 8 columns which constitute the infrared sensor 102a is inclined at a predetermined angle "a" with respect to the horizontal direction, that is, the direction of the scan axis illustrated in FIG. 20. The predetermined angle "a" is an example of the predetermined angle (X°) described above and is an angle adjusted so that all the respective center positions of the infrared detection elements in the 8 rows and 8 columns are different, as viewed in the direction of the scan axis. In other words, the predetermined angle "a" is an angle adjusted so that, when the plurality of infrared detection elements arranged in an 8×8 matrix which constitute the infrared sensor 102a are rotated (moved) along the direction of the scan axis, the infrared detection elements in the 8 columns in a certain row which is parallel to the sensor axis and the infrared detection elements in the 8 columns in rows adjacent to the certain row do not overlap in the direction of the scan axis.

Figure 21:
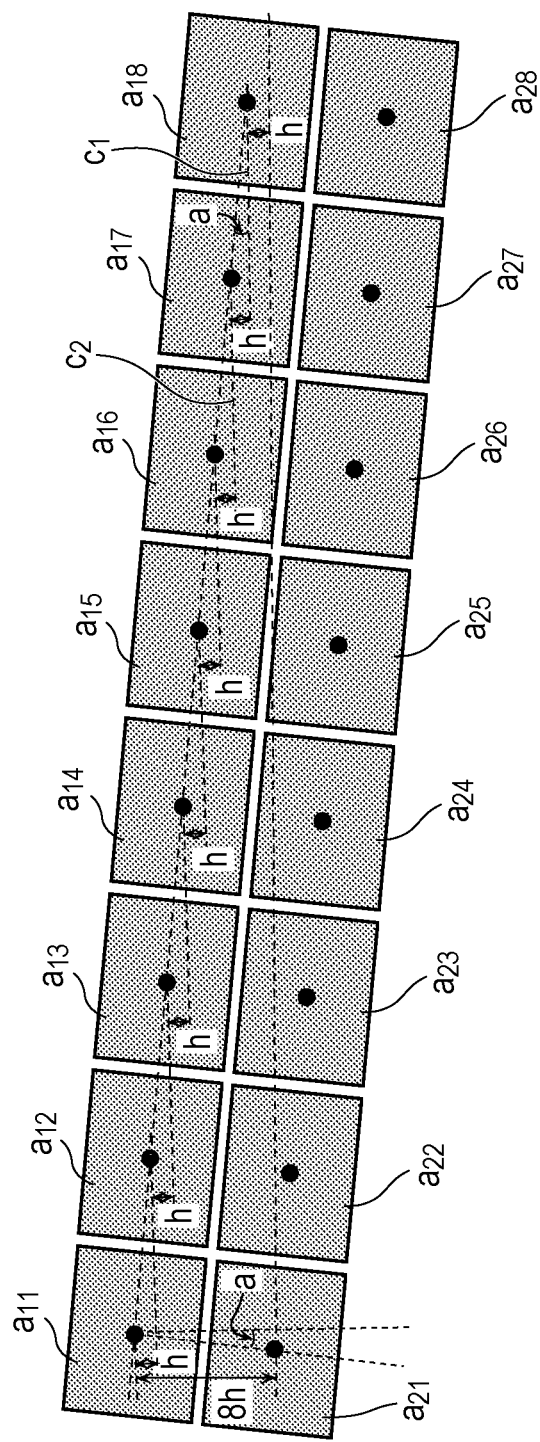
FIG. 21 is a diagram depicting an inclination of the infrared sensor illustrated in FIG. 20.

FIG. 21 is a diagram depicting the inclination of the infrared sensor 102a illustrated in FIG. 20. In FIG. 21, a plurality of infrared detection elements in 2 rows among the plurality of infrared detection elements arranged in the 8 rows and 8 columns illustrated in FIG. 20 are illustrated, for convenience of illustration. In FIG. 21, dotted lines $c_1$ and $c_2$ indicate lines that are parallel to the scan axis.

In FIG. 21, the predetermined angle "a" is an angle adjusted so that infrared detection elements $a_{11}$ to $a_{18}$ and infrared detection elements $a_{21}$ to $a_{28}$ do not overlap in the direction of the scan axis when rotated (moved) along the direction of the scan axis.

For example, a distance h in the longitudinal direction between the respective center positions of the infrared detection elements $a_{11}$ and $a_{12}$, a distance h in the longitudinal direction between the respective center positions of the infrared detection elements $a_{12}$ and $a_{13}$, a distance h in the longitudinal direction between the respective center positions of the infrared detection elements $a_{13}$ and $a_{14}$, a distance h in the longitudinal direction between the respective center positions of the infrared detection elements $a_{14}$ and $a_{15}$, a distance h in the longitudinal direction between the respective center positions of the infrared detection elements $a_{15}$ and $a_{16}$, a distance h in the longitudinal direction between the respective center positions of the infrared detection elements $a_{16}$ and $a_{17}$, and a distance h in the longitudinal direction between the respective center positions of the infrared detection elements $a_{17}$ and $a_{18}$, and a distance h in the longitudinal direction between the respective center positions of the infrared detection elements $a_{18}$ and $a_{21}$ are all equal to the first distance. This is also true for the case of the infrared detection elements $a_{21}$ to $a_{28}$.

The second distance, that is, a distance h in the longitudinal direction between the respective center positions of the infrared detection elements $a_{18}$ (the first element) and the infrared detection element $a_{21}$ (the second element) is equal to the first distance. The distance in the longitudinal direction between the respective center positions of the infrared detection elements $a_{11}$ and $a_{18}$ is 8h.

The predetermined angle "a" that satisfies the relationships described above is an angle that satisfies $\tan^{-1}(1/8)$ and can be calculated to be 7.125°.

Accordingly, the infrared sensor 102a is constituted by 8×8 infrared detection elements that are parallel and perpendicular to the sensor axis, and the sensor axis has an inclination (the predetermined angle a) of 7.125° with respect to the scan axis. This allows all the respective center positions of the infrared detection elements in the 8 rows and 8 columns that constitute the infrared sensor 102a to be different, as viewed in the direction of the scan axis. Since all the infrared detection elements in the 8 columns that constitute the infrared sensor 102a can be arranged so as not to overlap in the direction of the scan axis, it is possible to substantially increase the number of pixels of a thermal image in the direction (the vertical axis) perpendicular to the scan axis.

While in this exemplary implementation, reference has been made to infrared detection elements in 8 rows and 8 columns as an example of a plurality of infrared detection elements arranged in N rows and M columns which constitute the infrared sensor 102A, the present disclosure is not limited thereto.

Alternatively, infrared detection elements in 4 rows and 4 columns, infrared detection elements in 16 rows and 16 columns, or infrared detection elements in 32 rows and 32 columns may be used. Infrared detection elements in N rows and N columns (N is a natural number greater than or equal to 2) can reduce the cost of the use of the infrared sensor since such infrared detection elements are obtainable as general-purpose products.

Figure 22B:
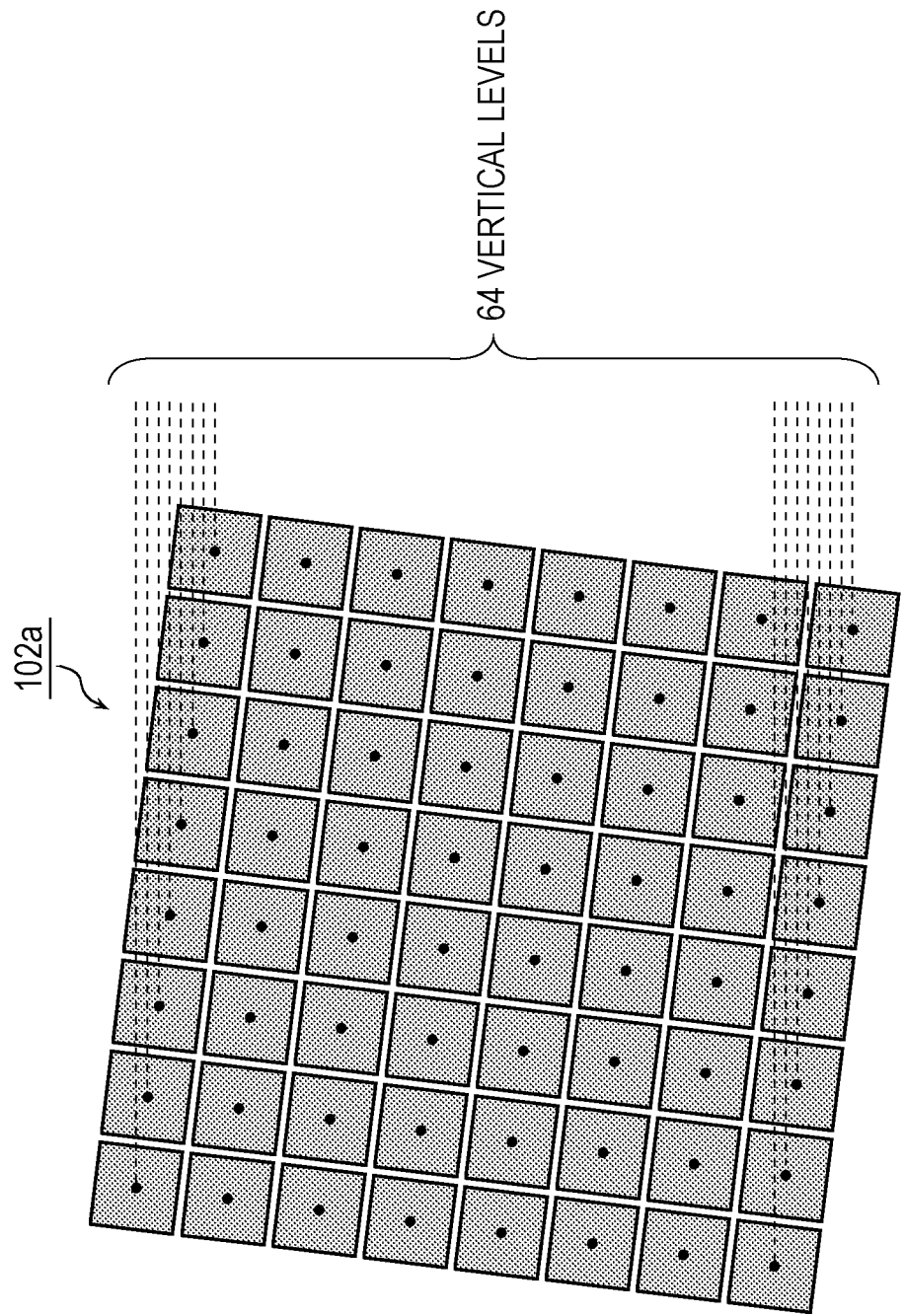
FIG. 22B is a diagram depicting an advantage of an infrared detection apparatus that includes the infrared sensor illustrated in FIG. 20.

FIG. 22A is a diagram depicting an advantage of an infrared detection apparatus that includes an infrared sensor 502a according to a comparative example. FIG. 22B is a diagram depicting an advantage of an infrared detection apparatus that includes the infrared sensor 102a illustrated in FIG. 20.

The infrared sensor 502a according to the comparative example illustrated in FIG. 22A is not inclined with respect to the direction of the scan axis (i.e., the horizontal direction). That is, the sensor axis of the infrared sensor 502a matches the scan axis. In this case, when the 8×8 infrared detection elements constituting the infrared sensor 502a are rotated (moved) along the direction of the scan axis, the infrared detection elements in the direction parallel to the scan axis (in the column direction) overlap. Thus, the number of infrared detection elements in the direction perpendicular to the scan axis is still 8.

In contrast, the infrared sensor 102a illustrated in FIG. 22B is inclined at 7.125 degrees with respect to the direction of the scan axis (i.e., the horizontal direction). That is, the sensor axis of the infrared sensor 102a is inclined at 7.125 degrees with respect to the scan axis. In this case, when the 8×8 infrared detection elements constituting the infrared sensor 102a are rotated (moved) along the direction of the scan axis, the infrared detection elements in the direction parallel to the scan axis (in the column direction) do not overlap. As a result, the number of infrared detection elements in the direction perpendicular to the scan axis is 64 (64 vertical levels), which is larger than 8 (8 vertical levels), which is the number of infrared detection elements in the row direction of the infrared sensor 102a.

Accordingly, the infrared detection apparatus 1A, which includes the infrared sensor 102a constituted by infrared detection elements having a sensor axis inclined at 7.125° with respect to the scan axis, can acquire a thermal image with high resolution that is 8 times that in the comparative example without an increase in the number of infrared detection elements constituting the infrared sensor 102a. In addition, the thermal image is subjected to a super-resolution process by the control processing unit 12, thereby enabling the infrared detection apparatus 1A to acquire a thermal image with more enhanced resolution.

Operation of Infrared Detection Apparatus

Next, the operation of the infrared detection apparatus 1A having the configuration described above will be described.

Figure 23:
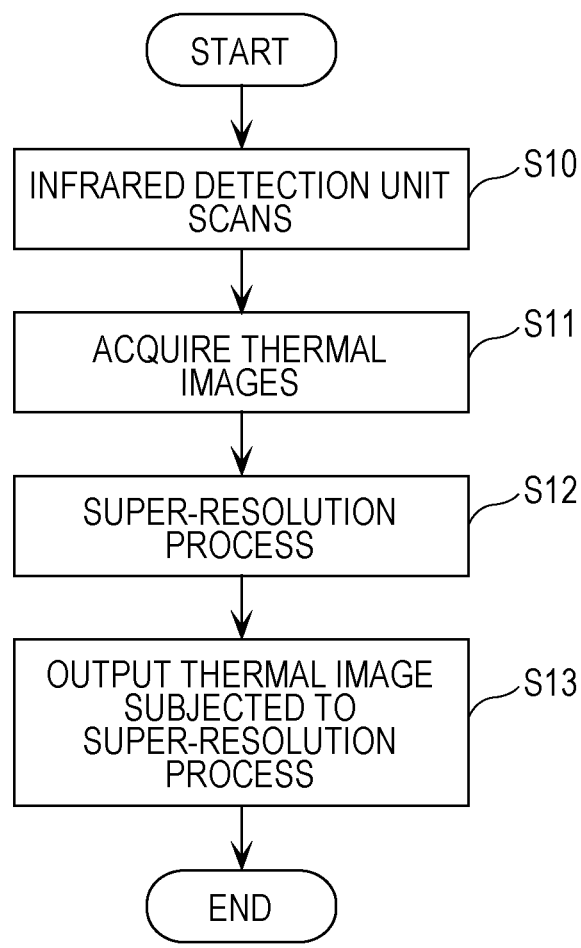
FIG. 23 is a flowchart illustrating the operation of the infrared detection apparatus according to the fourth embodiment.

FIG. 23 is a flowchart illustrating the operation of the infrared detection apparatus 1A according to the fourth embodiment.

First, the infrared detection apparatus 1A causes the infrared detection unit 10 to perform scanning (S10) to acquire thermal images of a temperature detection range (S11). Specifically, the infrared detection apparatus 1A causes the infrared sensor 102a of the infrared detection unit 10 to move (rotate) along the scan axis to thereby cause the infrared sensor 102a to scan the temperature detection range to acquire thermal images of the temperature detection range. The infrared sensor 102a is moved (rotated) by the scanning unit 11 on a per-sub-pixel basis for scanning to acquire a plurality of thermal images displaced on a per-sub-pixel basis.

Then, the infrared detection apparatus 1A performs a super-resolution process on the acquired thermal images (S12). Specifically, the infrared detection apparatus 1 performs processing on the acquired plurality of thermal images to reconstruct the resulting plurality of thermal images to generate a single high-definition thermal image.

Then, the infrared detection apparatus 1A outputs the generated high-definition thermal image, that is, a thermal image subjected to the super-resolution process (S13).

Accordingly, the infrared detection apparatus 1A can acquire a high-resolution thermal image of the temperature detection range.

Advantages etc. of Fourth Embodiment

As described above, the infrared detection apparatus according to this embodiment includes an infrared sensor constituted by infrared detection elements having a sensor axis inclined at a predetermined angle with respect to a scan axis. This can enhance the resolution of a thermal image without increasing the number of infrared detection elements constituting the infrared sensor. The predetermined angle is an angle adjusted so that all the respective center positions of the plurality of infrared detection elements constituting the infrared sensor are different, as viewed in a predetermined direction that is the scan direction. For example, when the infrared sensor is constituted by infrared detection elements in 8 rows and 8 columns, the predetermined angle is 7.125 degrees.

Since the infrared detection apparatus according to this embodiment can acquire a high-resolution thermal image without an increase in the number of infrared detection elements constituting the infrared sensor, no additional motor is required to cause the infrared sensor to move (scan) also in the direction perpendicular to the scan axis. Also, since the infrared detection apparatus according to this embodiment can acquire a high-resolution thermal image without an increase in the number of infrared detection elements constituting the infrared sensor, no need exists to use a high-cost infrared sensor including a larger number of infrared detection elements. That is, the infrared detection apparatus according to this embodiment provides the advantage of reduction in not only the cost for a motor to acquire a high-resolution thermal image but also in the cost of the use of an infrared sensor including a larger number of infrared detection elements.

The infrared detection apparatus according to the comparative example that makes it possible to acquire a high-resolution thermal image by increasing the number of scan directions of the infrared sensor with the use of an additional motor has a larger mechanical size by an amount corresponding to the additional motor. Thus, the infrared detection apparatus according to the comparative example is difficult to mount on other equipment such as air conditioning equipment as a module. In contrast, the infrared detection apparatus according to this embodiment does not require any additional motor to increase the number of scan directions (additional scanning in the direction perpendicular to the scan axis), resulting in no increase in size. Thus, there is also an advantage in that the infrared detection apparatus according to this embodiment is easy to mount on other equipment such as air conditioning equipment as a module.

In addition, compared with the use of an additional motor to move (scan) the infrared sensor also in the direction perpendicular to the scan axis, the infrared detection apparatus according to this embodiment does not require time for further scanning in the direction perpendicular to the scan axis after scanning in the direction of the scan axis. That is, the infrared detection apparatus according to this embodiment also provides the advantage of enhancement of the resolution of a thermal image without increasing the infrared detection time.

This advantage will be described more specifically. The infrared detection apparatus according to the comparative example makes it possible to acquire a high-resolution thermal image by increasing the number of scan directions of the infrared sensor with the use of an additional motor, and takes more scanning time (infrared detection time) to acquire a thermal image by an amount corresponding to the increase in the number of scan directions. That is, the infrared detection apparatus according to the comparative example requires time to acquire a thermal image of a temperature detection range, resulting in a large time difference between the start of scan and the acquisition of a thermal image. Thus, a problem arises in that the resolution of the acquired thermal image is lower than that expected. In contrast, the infrared detection apparatus according to this embodiment does not require any additional motor to increase the number of scan directions (additional scanning in the direction perpendicular to the scan axis). Thus, it is possible to enhance the resolution of a thermal image without increasing the infrared detection time.

Modification

In the fourth embodiment, reference has been made to the case where all of the infrared detection elements constituting the infrared sensor are enabled (all of the infrared detection elements constituting the infrared sensor are used). However, the present disclosure is not limited thereto. Some of the infrared detection elements constituting the infrared sensor may be enabled taking into account the influence of coma or spherical aberration of the lens used to concentrate infrared rays onto the infrared sensor, and the other infrared detection elements may be disabled.

An example in this case will be described hereinbelow as a modification.

Spherical aberration is aberration attributable to a lens with a spherical surface, more specifically, aberration caused by the difference in path between rays that pass through a portion near the center of the lens and a portion near the edges of the lens because the lens has a spherical surface. Coma is a phenomenon in which a point image appears to have a tail at a position away from the optical axis, more specifically, a phenomenon in which light from a point away from the optical axis does not converge into a single point on an image surface to produce an image appearing to have a tail like a comet, resulting in a point image taking an elongated shape.

Configuration of Infrared Sensor

Figure 24:
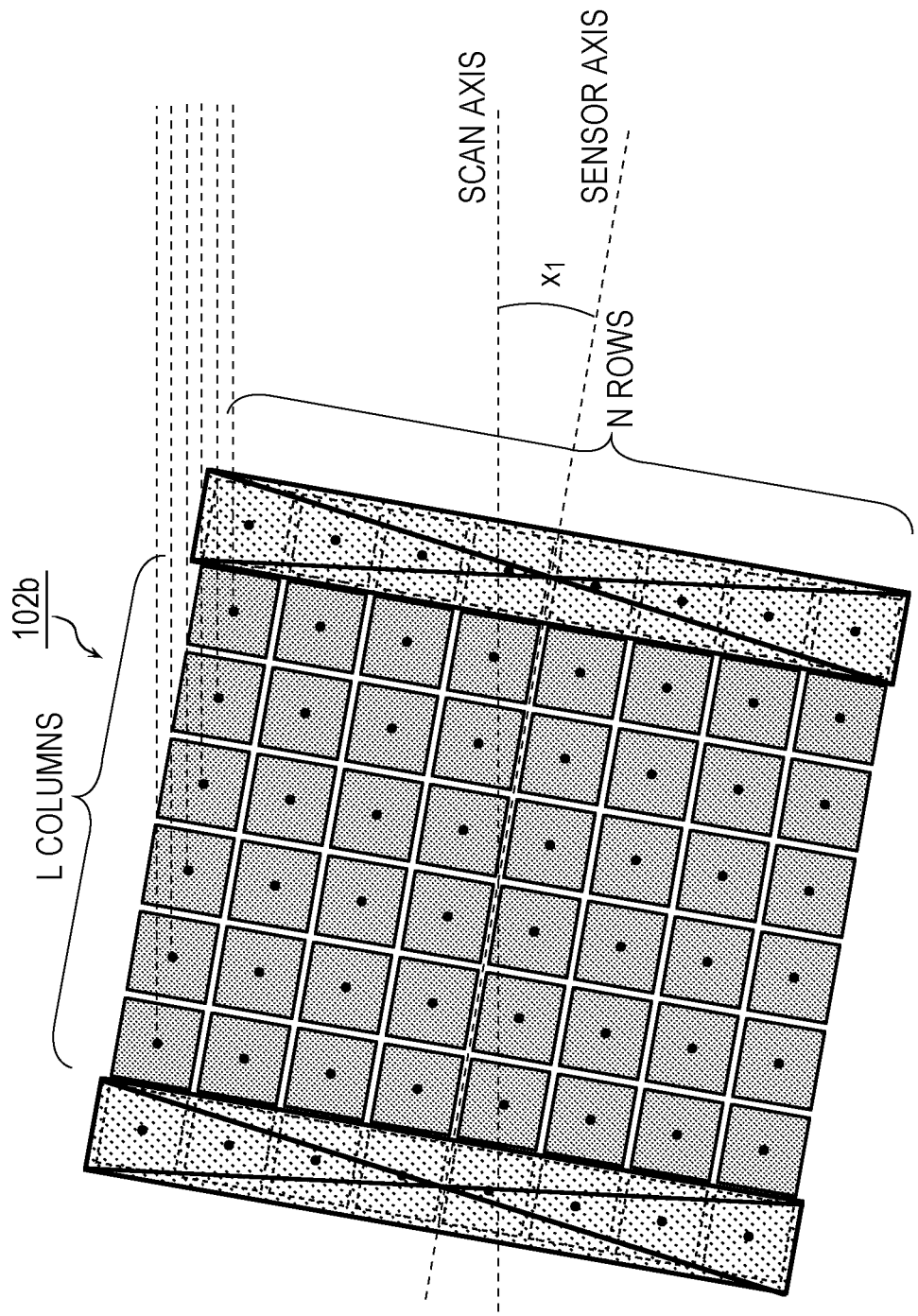
FIG. 24 is an image view of a configuration of an infrared sensor according to a modification of the fourth embodiment.

FIG. 24 is an image view of a configuration of an infrared sensor 102$b$ according to a modification of the fourth embodiment.

The infrared sensor 102$b$ is an example of the infrared sensor 102A. A plurality of infrared detection elements constituting the infrared sensor 102$b$ are arranged in N rows and N columns (N is a natural number greater than or equal to 2), and the infrared detection elements in the both end columns among the N columns are disabled. That is, the infrared sensor 102$b$ uses particular infrared detection elements in N rows and L columns (L<N, where L is a natural number greater than or equal to 2), which are obtained by excluding both end columns from the N columns. The reason for the exclusion of the both end columns from the N columns is that, in the lens used for the infrared sensor 102b, coma or spherical aberration has more influence on an infrared detection element of the infrared sensor 102b that is located at a position more distant from the center.

As in the fourth embodiment, the infrared sensor 102b is inclined at a predetermined angle with respect to the direction of the scan axis ($X_1$ in FIG. 24). The predetermined angle $X_1$ is an angle adjusted so that all the respective center positions of the infrared detection elements in the N rows and N columns that constitute the infrared sensor 102b are different, as viewed in the direction of the scan axis. For example, when the infrared sensor 102b is constituted by a plurality of infrared detection elements in 8 rows and 8 columns and the particular infrared detection elements are the infrared detection elements in 8 rows and 6 columns, the predetermined angle $X_1$ is 9.462°.

The predetermined angle may be an angle adjusted so that all the respective center positions of some (e.g., the infrared detection elements in N rows and L columns), rather than all, of the infrared detection elements in the N rows and N columns that constitute the infrared sensor 102b are different, as viewed in the direction of the scan axis.

Figure 25:
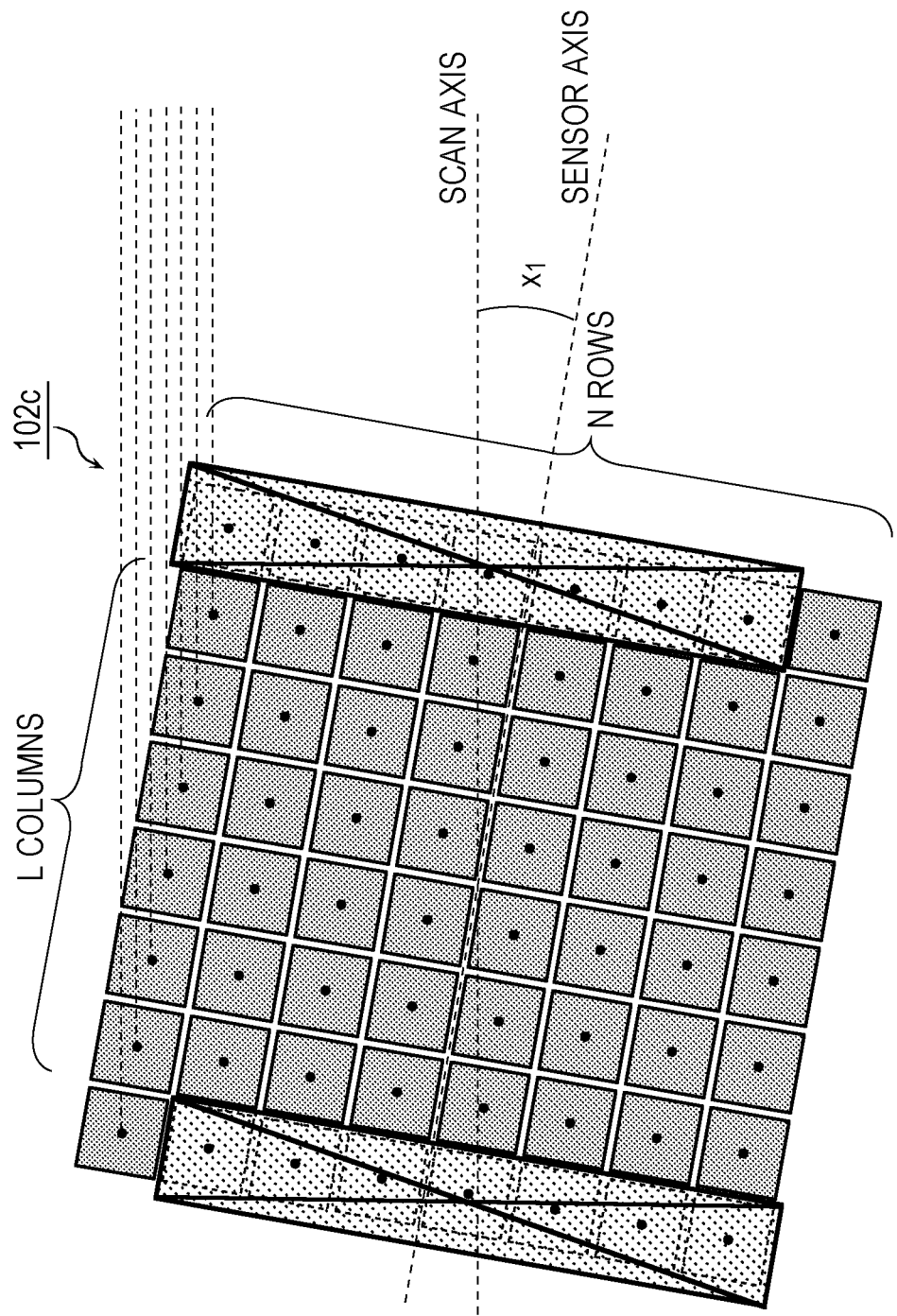
FIG. 25 is an image view of a configuration of an infrared sensor according to another example of the modification of the fourth embodiment.

In addition, the predetermined angle preferably has a value that satisfies the following equation: $X_1 = \arctan(1/C_{eff})$, where $X_1$ represents the predetermined angle, and $C_{eff}$ represents the number of columns in which pixels are used. In this equation, $C_{eff}$ is 6 in FIG. 24. In FIG. 25, described below, $C_{eff}$ is also 6.

Advantages etc. of Modification

As described above, the infrared detection apparatus according to this modification can enhance the resolution of a thermal image without an increase in the number of infrared detection elements constituting the infrared sensor. In this modification, furthermore, not all but some of the infrared detection elements constituting the infrared sensor are used. This provides the advantage of reduced influence of coma or spherical aberration of a lens used to concentrate infrared rays onto the infrared sensor.

In this modification, reference has been made to the case where, as an example of using some of the infrared detection elements constituting the infrared sensor, the infrared detection elements in both end columns in the scan axis direction are disabled and not used, the present disclosure is not limited thereto. For example, as illustrated in FIG. 25, some of the infrared detection elements in both end columns in the scan axis direction may be enabled.

FIG. 25 is an image view of a configuration of an infrared sensor according to another example of the modification of the fourth embodiment. Elements similar to those in FIG. 24 are assigned the same numerals and symbols and are not described in detail herein.

An infrared sensor 102c illustrated in FIG. 25 is an example of the infrared sensor 102A and is constituted by infrared detection elements arranged in N rows and N columns (N is a natural number greater than or equal to 2).

In the infrared sensor 102c, the infrared detection elements in the both end columns among the N columns, except some of them, are disabled. More specifically, in the infrared sensor 102c, as illustrated in FIG. 25, the following infrared detection elements are used: the infrared detection elements in N rows and L columns (L<N, where L is a natural number greater than or equal to 2), which are obtained by excluding both end columns from the N columns, the infrared detection element located at the lower end in the right end column in FIG. 25 (i.e., of both end columns among the N columns, the end column corresponding to the leading edge during scanning), and the infrared detection element located at the upper end in the left end column in FIG. 25 (i.e., of both end columns among the N columns, the end column corresponding to the trailing edge during scanning). The reason for the exclusion of the both end columns from the N columns is that, as described above, coma or spherical aberration has greater influence on the infrared detection elements in these columns. The reason for enabling some of the infrared detection elements in both end columns among the N columns is to increase the number of infrared detection elements in the direction (the vertical axis) perpendicular to the scan axis to increase the field of view along the vertical axis in order to increase the number of pixels of a thermal image in the direction (the vertical axis) perpendicular to the scan axis. Another reason is that such infrared detection elements are located at positions on which the influence of lens distortion can also be reduced.

Fifth Embodiment

An example of enabling particular infrared detection elements among the infrared detection elements constituting the infrared sensor is not limited to the example described above. In a fifth embodiment, a description will be given of another example configuration of the particular infrared detection elements. In the following, differences from the fourth embodiment are mainly described.

Configuration of Infrared Sensor

Figure 26:
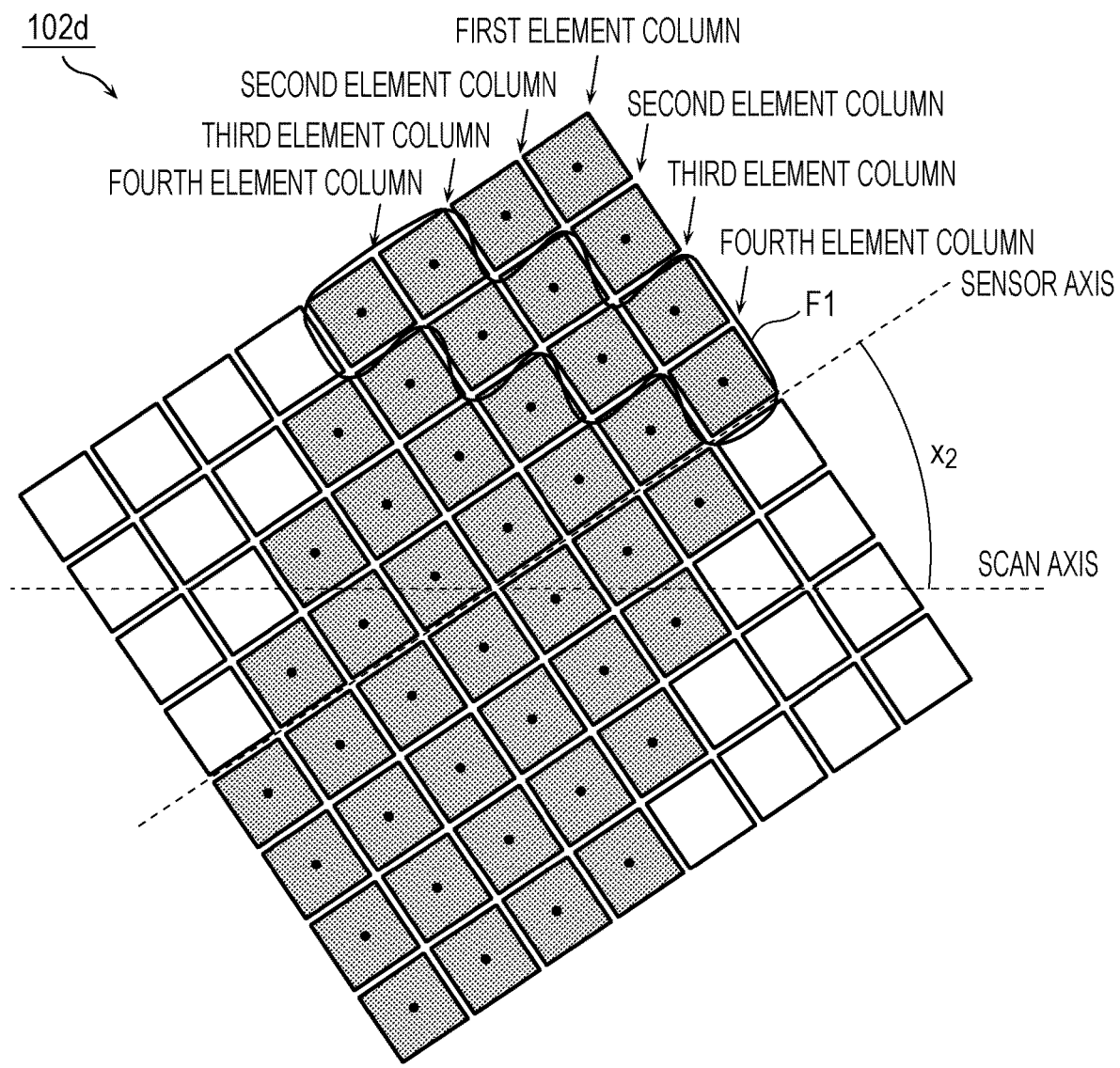
FIG. 26 is an image view of an example configuration of an infrared sensor according to a fifth embodiment.
Figure 27:
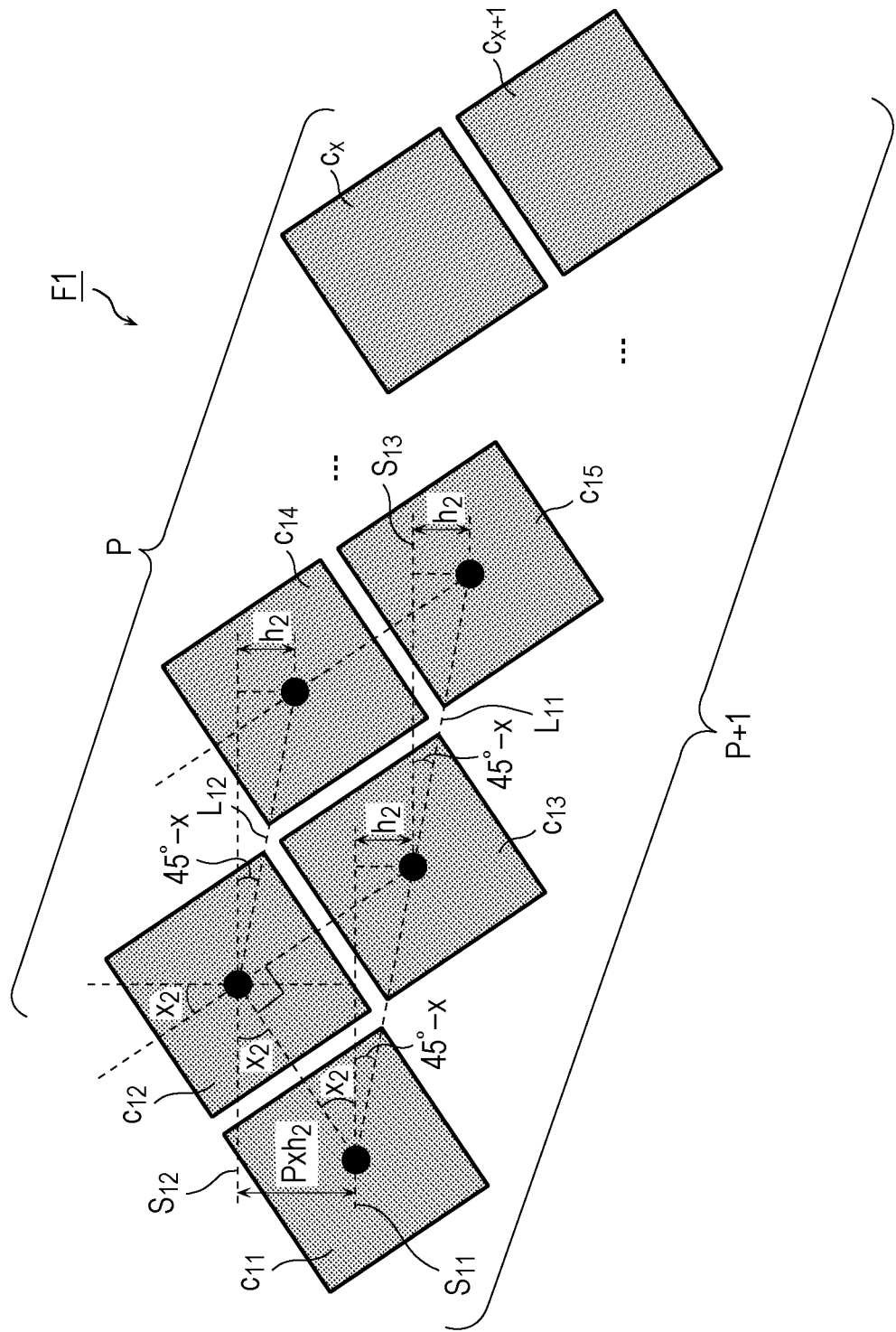
FIG. 27 is a diagram depicting an inclination of the infrared sensor illustrated in FIG. 26.

FIG. 26 is an image view of an example configuration of an infrared sensor according to the fifth embodiment. FIG. 27 is a diagram depicting an inclination of the infrared sensor illustrated in FIG. 26.

An infrared sensor 102d is an example of the infrared sensor 102A. The infrared sensor 102d is constituted by a plurality of infrared detection elements, and particular infrared detection elements among the plurality of infrared detection elements are enabled whereas the other infrared detection elements are disabled.

In this embodiment, the plurality of infrared detection elements constituting the infrared sensor 102d are arranged in N rows and N columns (N is a natural number greater than or equal to 2), and the particular infrared detection elements are the infrared detection elements other than the infrared detection elements in both end portions of the N rows and N columns in the direction of the scan axis.

More specifically, the particular infrared detection elements illustrated in FIG. 26 include a first element column, second element columns, third element columns, and fourth element columns. The first element column is an array of infrared detection elements arranged along a first diagonal line that is one of the two diagonal lines of the N rows and N columns having a larger angle relative to the direction of the scan axis. The second element columns are arrays of infrared detection elements arranged adjacent to the first element column and along the first diagonal line. The third element columns are arrays of infrared detection elements arranged adjacent to the second element columns and along the first diagonal line. The fourth element columns are arrays of infrared detection elements arranged adjacent to the third element columns and arranged the first diagonal line. That is, among the plurality of infrared detection elements constituting the infrared sensor 102d, the infrared detection elements in the first to fourth element columns are enabled as particular infrared detection elements whereas the other infrared detection elements are disabled.

As in the fourth embodiment, the infrared sensor 102d is inclined at a predetermined angle ($x_2$ in FIG. 26) with respect to the direction of the scan axis. The predetermined angle $x_2$ is an angle adjusted so that all the respective center positions of the particular infrared detection elements described above are different, as viewed in the direction of the scan axis.

A method for calculating the predetermined angle $x_2$ will now be described with reference to FIG. 27, for example. FIG. 27 illustrates an area F1, which includes some of the particular infrared detection elements illustrated in FIG. 26. In FIG. 27, dotted lines $S_{11}$, $S_{12}$, and $S_{13}$ indicate lines that are parallel to the scan axis. A dotted line $L_{11}$ indicates a line connecting infrared detection elements $c_{11}$, $c_{13}$, and $c_{15}$ and extending parallel to the sensor axis. Likewise, a dotted line $L_{12}$ indicates a line connecting infrared detection elements $c_{12}$ and $c_{14}$ and extending parallel to the sensor axis.

For example, a distance $h_2$ in the direction perpendicular to the scan axis (in FIG. 27, in the longitudinal direction) between the respective center positions of the infrared detection elements $c_{11}$ and $c_{13}$, a distance $h_2$ in the direction perpendicular to the scan axis (in FIG. 27, in the longitudinal direction) between the respective center positions of the infrared detection elements $c_{13}$ and $c_{15}$, and a distance $h_2$ in the direction perpendicular to the scan axis (in FIG. 27, in the longitudinal direction) between the respective center positions of the infrared detection elements $c_{12}$ and $c_{14}$ are all equal to each other. For example, the distance in the direction perpendicular to the scan axis (in FIG. 27, in the longitudinal direction) between the respective center positions of the infrared detection elements $c_{11}$ and $c_{12}$ is given by multiplying P by $h_2$ (i.e., $P \times h_2$), where P is represented by (the number of element columns)−1.

By calculating the angle $x_2$ that satisfies the relationships described above, it is possible to calculate the predetermined angle $x_2$. Specifically, this relationship can be expressed as relational expressions:

$$\sin(x_2) = Ph_2/D_1$$

$$\sin(45 - x_2) = h_3/(\sqrt{2} \cdot D_1)$$

where $D_1$ denotes the distance between the infrared detection elements and is, for example, the distance (along the sensor axis) between the respective center positions of the infrared detection elements $c_{11}$ and $c_{12}$. By solving the relational expressions, it is possible to calculate the predetermined angle $x_2$. That is, the relational expressions are solved as $\sin(x_2) = P\sqrt{2} \cdot \sin(45 - x_2)$, that is, $\sin(x_2) = P \cos(x_2) - P \sin(x_2)$, and then transformed to $\tan(x_2) = P/(P+1)$. Thus, it is possible to determine the predetermined angle $x_2 = \tan^{-1}(P/P+1)$.

An example of the predetermined angle will be described hereinafter in conjunction with an exemplary implementation.

Exemplary Implementation

An example configuration of an infrared sensor according to this exemplary implementation will be described hereinafter with reference to FIG. 28 and FIG. 29.

Figure 28:
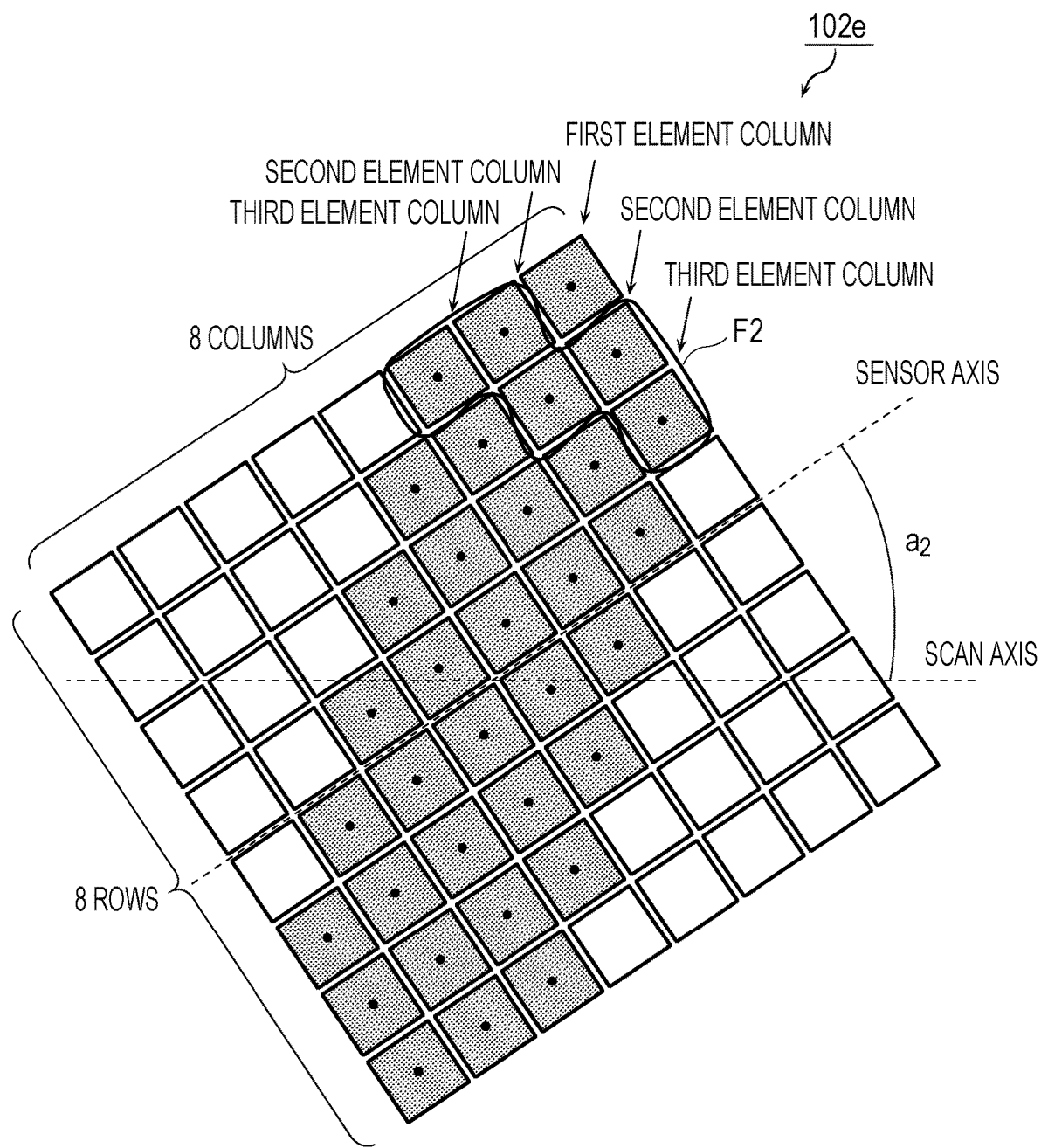
FIG. 28 is an image view of a configuration of an infrared sensor according to an exemplary implementation of the fifth embodiment.

FIG. 28 is an image view of a configuration of an infrared sensor according to an exemplary implementation of the fifth embodiment. FIG. 29 is a diagram depicting an inclination of the infrared sensor illustrated in FIG. 28.

An infrared sensor 102e illustrated in FIG. 27 is an example of the infrared sensor 102A and is constituted by a plurality of infrared detection elements arranged in 8 rows and 8 columns. In the infrared sensor 102e, particular infrared detection elements among the plurality of infrared detection elements are enabled whereas the other infrared detection elements are disabled.

In this exemplary implementation, the plurality of infrared detection elements constituting the infrared sensor 102e are arranged in 8 rows and 8 columns, and the particular infrared detection elements are the infrared detection elements other than infrared detection elements in both end portions of the 8 rows and 8 columns in the direction of the scan axis.

More specifically, the particular infrared detection elements illustrated in FIG. 28 include a first element column, second element columns, and third element columns. The first element column is an array of infrared detection elements arranged along a first diagonal line that is one of the two diagonal lines of the 8 rows and 8 columns having a larger angle relative to the direction of the scan axis. The second element columns are arrays of infrared detection elements arranged adjacent to the first element column and along the first diagonal line. The third element columns are arrays of infrared detection elements arranged adjacent to the second element columns and along the first diagonal line. That is, among the plurality of infrared detection elements constituting the infrared sensor 102e, the infrared detection elements in the first to third element columns are enabled as particular infrared detection elements whereas the other infrared detection elements are disabled.

Further, the infrared sensor 102e is inclined at a predetermined angle ($a_2$ in FIG. 28) with respect to the direction of the scan axis. The predetermined angle $a_2$ is an angle adjusted so that all the respective center positions of the particular infrared detection elements described above are different, as viewed in the direction of the scan axis.

A method for calculating the predetermined angle $a_2$ will now be described with reference to FIG. 29, for example. FIG. 29 illustrates an area F2, which includes some of the particular infrared detection elements illustrated in FIG. 28. In FIG. 29, dotted lines $S_{21}$, $S_{22}$, and $S_{23}$ indicate lines that are parallel to the scan axis. A dotted line $L_{21}$ indicates a line connecting infrared detection elements $c_{21}$, $c_{23}$, and $c_{25}$ and extending parallel to the sensor axis. Likewise, a dotted line $L_{22}$ indicates a line connecting infrared detection elements $c_{22}$ and $c_{24}$ and extending parallel to the sensor axis.

In this case, first distances, each of which is the distance in the direction perpendicular to the direction of the scan axis between the center position of a first element (the infrared detection element $c_{23}$), which is an infrared detection element included in the first element column, and the center position of each of second elements (the infrared detection elements $c_{21}$ and $c_{25}$), which are adjacent to the first element (the infrared detection element $c_{23}$) among a plurality of infrared detection elements adjacent to a plurality of infrared detection elements that are arranged in a row direction having a predetermined angle with respect to the direction of the scan axis and that include the first element (the infrared detection element $c_{23}$), the second elements (the infrared detection elements $c_{21}$ and $c_{25}$) being infrared detection elements included in the third element columns, are equal to each other. In addition, a second distance is equal to the first distance. The second distance is the distance in the direction perpendicular to the direction of the scan axis between the center position of a third element (the infrared detection element $c_{21}$), which is one of the two second elements (the infrared detection elements $c_{21}$ and $c_{25}$) corresponding to the trailing edge in the scan direction, and the center position of a fourth element (the infrared detection element $c_{24}$), which is an infrared detection element included in the second element columns and which is adjacent to the first element (the infrared detection element $c_{23}$) and not adjacent to the third element (the infrared detection element $c_{21}$) among the plurality of infrared detection elements that are arranged in the row direction and that include the first element (the infrared detection element $c_{23}$). In addition, a third distance is equal to the first distance. The third distance is the distance in the direction perpendicular to the direction of the scan axis between the center position of the fourth element (the infrared detection element $c_{24}$) and the center position of a fifth element (the infrared detection element $c_{22}$), which is an infrared detection element included in the second element columns and which is adjacent to the third element (the infrared detection element $c_{21}$) among a plurality of infrared detection elements that are arranged in the row direction and that include the third element (the infrared detection element $c_{21}$).

Figure 29:
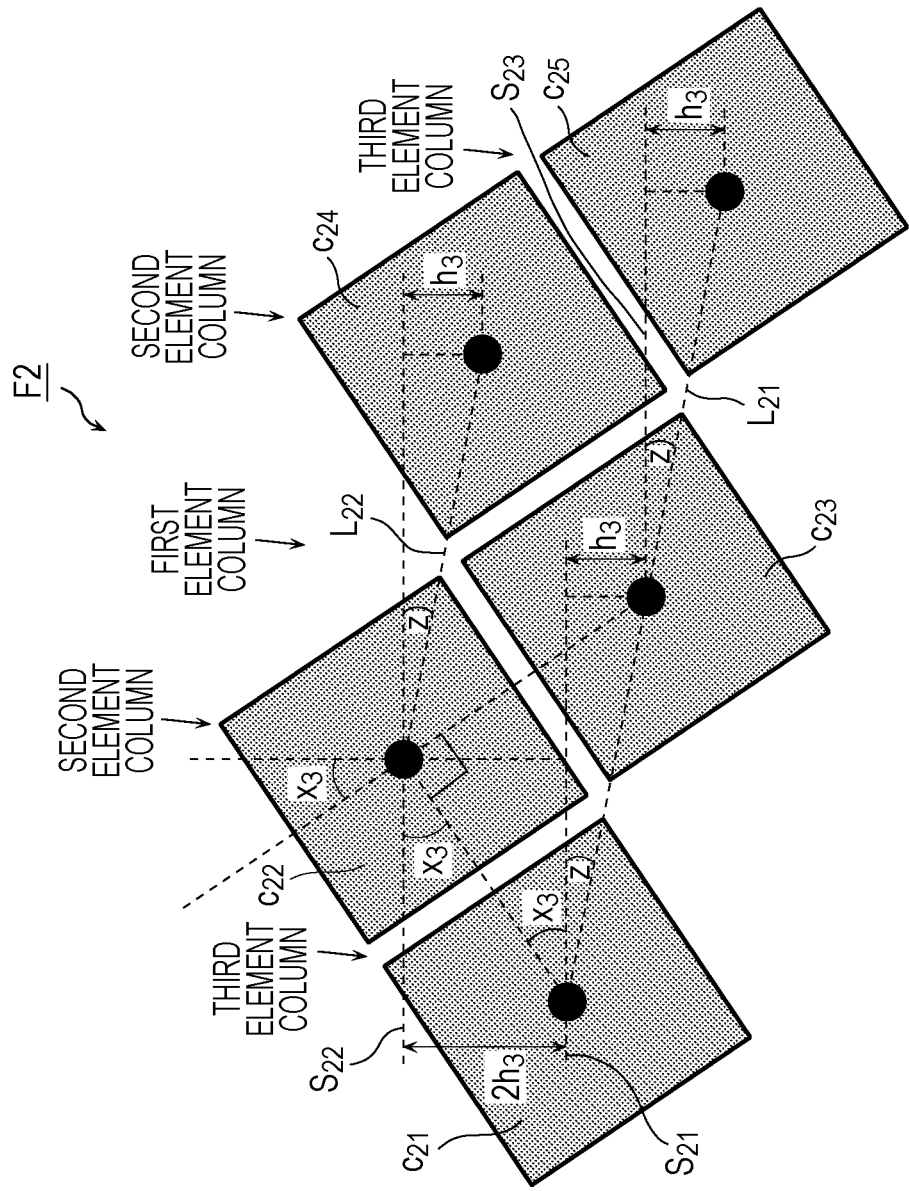
FIG. 29 is a diagram depicting an inclination of the infrared sensor illustrated in FIG. 28.

More specifically, as illustrated in FIG. 29, for example, a distance $h_3$ in the direction perpendicular to the scan axis (in FIG. 29, in the longitudinal direction) between the respective center positions of the infrared detection elements $c_{21}$ and $c_{23}$, a distance $h_3$ in the direction perpendicular to the scan axis (in FIG. 29, in the longitudinal direction) between the respective center positions of the infrared detection elements $c_{23}$ and $c_{25}$, and a distance $h_3$ in the direction perpendicular to the scan axis (in FIG. 29, in the longitudinal direction) between the respective center positions of the infrared detection elements $c_{22}$ and $c_{24}$ are all equal to each other. For example, the distance in the direction perpendicular to the scan axis (in FIG. 29, in the longitudinal direction) between the respective center positions of the infrared detection elements $c_{21}$ and $c_{22}$ is $2h_3$ (which is given by {(the number of element columns)$-1$}$\times h_3$).

By calculating the angle $x_3$ that satisfies the relationships described above, it is possible to calculate the predetermined angle $a_2$. Specifically, this relationship can be expressed as relational expressions:

$$\sin(x_3) = 2h_3/D_2$$

$$\sin(z) = h_3/(\sqrt{2} \cdot D_2)$$

$$z = 45 - x_3$$

where $D_2$ denotes the distance between the infrared detection elements and is, for example, the distance (along the sensor axis) between the respective center positions of the infrared detection elements $c_{21}$ and $c_{22}$. By solving the relational expressions, it is possible to calculate the predetermined angle $a_2$. That is, the relational expressions are solved as $\sin(x_3) = 2\sqrt{2} \cdot \sin(z)$, that is, $\sin(x_3) = 2\cos(x_3) - 2\sin(x_3)$, and then transformed to $\tan(x_3) = 2/3$. Thus, it is possible to determine $x_3 = 33.69$ degrees. Hence, the predetermined angle $a_2$ can be calculated to be 33.69 degrees.

Accordingly, the infrared sensor 102e is constituted by 8×8 infrared detection elements that are parallel and perpendicular to the sensor axis, and the sensor axis has an inclination of 33.69° (the predetermined angle $a_2$) with respect to the scan axis. With this configuration, of the infrared detection elements in the 8 rows and 8 columns that constitute the infrared sensor 102e, all the respective center positions of the infrared detection elements in the first to third element columns, which are enabled as particular infrared detection elements, are different, as viewed in the direction of the scan axis, and do not overlap in the direction of the scan axis. Thus, in the infrared sensor 102e, it is possible to increase the number of infrared detection elements in the direction perpendicular to the scan axis and to substantially increase the number of pixels of a thermal image in the direction (the vertical axis) perpendicular to the scan axis.

While in this exemplary implementation, the infrared sensor 102e is constituted by infrared detection elements in 8 rows and 8 columns, the present disclosure is not limited thereto. Alternatively, infrared detection elements in 4 rows and 4 columns, infrared detection elements in 16 rows and 16 columns, or infrared detection elements in 32 rows and 32 columns may be used. Infrared detection elements in N rows and N columns (N is a natural number greater than or equal to 2) can reduce the cost of the use of the infrared sensor since such infrared detection elements are obtainable as general-purpose products.

Figure 30:
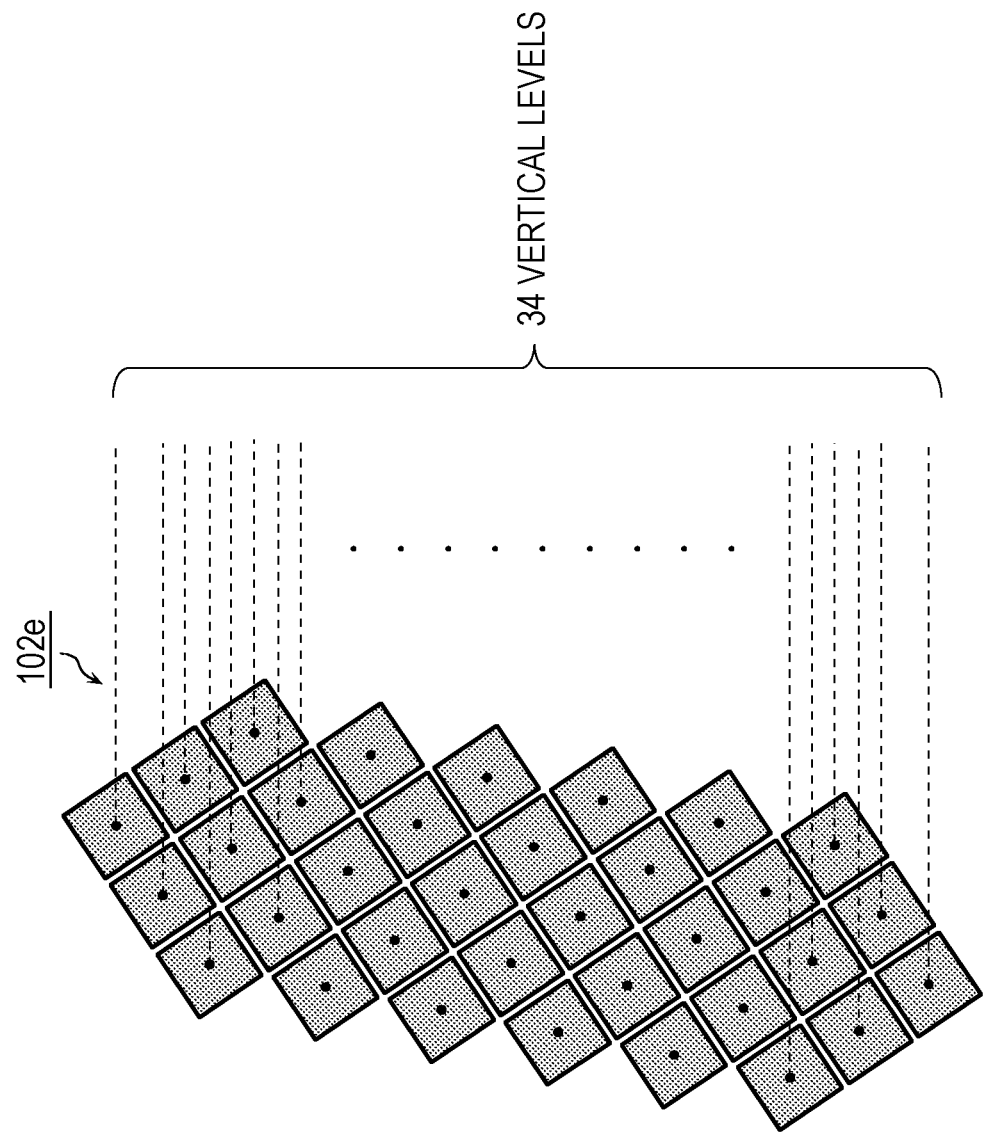
FIG. 30 is a diagram depicting an advantage of an infrared detection apparatus that includes the infrared sensor illustrated in FIG. 28.

FIG. 30 is a diagram depicting an advantage of an infrared detection apparatus that includes the infrared sensor 102e illustrated in FIG. 28.

The infrared sensor 102e illustrated in FIG. 30 is inclined at 33.69 degrees with respect to the direction of the scan axis (i.e., the horizontal direction). That is, the sensor axis of the infrared sensor 102e is inclined at 33.69 degrees with respect to the scan axis. In this case, when the infrared sensor 102e is rotated (moved) along the direction of the scan axis, the particular infrared detection elements in the direction parallel to the scan axis (in the column direction) do not overlap. As a result, the number of particular infrared detection elements in the direction perpendicular to the scan axis is 34 (34 vertical levels), which is larger than 8 (8 vertical levels), which is the number of infrared detection elements in the row direction of the infrared sensor 102e.

Accordingly, the infrared detection apparatus 1A, which includes the infrared sensor 102e constituted by infrared detection elements having a sensor axis inclined at 33.69 degrees with respect to the scan axis, can acquire a thermal image with high resolution that is 4.25 times that in the comparative example without an increase in the number of infrared detection elements constituting the infrared sensor 102e. In addition, the thermal image is subjected to a super-resolution process by the control processing unit 12, thereby enabling the infrared detection apparatus 1A to acquire a thermal image with more enhanced resolution.

Advantages etc. of Fifth Embodiment

As described above, the infrared detection apparatus according to this embodiment can enhance the resolution of a thermal image without an increase in the number of infrared detection elements constituting the infrared sensor. In this embodiment, furthermore, not all but some of the infrared detection elements constituting the infrared sensor are used. This provides the advantage of reduced influence of coma or spherical aberration of a lens used to concentrate infrared rays onto the infrared sensor.

The predetermined angle is an angle adjusted so that all the respective center positions of particular infrared detection elements among the plurality of infrared detection elements constituting the infrared sensor are different, as viewed in a predetermined direction that is the scan direction. For example, when the infrared sensor is constituted by infrared detection elements in 8 rows and 8 columns and the infrared detection elements in the first to third element columns are enabled as the particular infrared detection elements, the predetermined angle is 33.69 degrees.

In this case, three element columns include fewer infrared detection elements than infrared detection elements in 8 rows and 8 columns are arranged substantially parallel to the scan axis, providing the advantage of reduction in the scanning time, that is, the time (the infrared detection time) taken to scan the temperature detection range. This also provides the advantage of further enhancement of the resolution.

In addition, as in the fourth embodiment, the infrared detection apparatus according to this embodiment can reduce not only the cost for a motor to acquire a high-resolution thermal image but also the cost of the use of an infrared sensor including a larger number of infrared detection elements. As in the fourth embodiment, furthermore, there is also an advantage in that the infrared detection apparatus according to this embodiment is easy to mount on other equipment such as air conditioning equipment as a module.

In the fourth and fifth embodiments described above, reference has been made to, as an example of the infrared sensor 102A, an infrared sensor including a plurality of infrared detection elements arranged in a matrix of 8 rows and 8 columns (8×8). However, the present disclosure is not limited thereto. Alternatively, the infrared sensor 102A may be constituted by a plurality of infrared detection elements arranged in a matrix of 16 rows and 16 columns or 32 rows and 32 columns. It is sufficient that the infrared sensor 102A be constituted by a plurality of infrared detection elements arranged in a matrix of N rows and M columns (N and M are each a natural number greater than or equal to 2).

Sixth Embodiment

Underlying Knowledge Forming Basis of Sixth Embodiment

While in the first embodiment and so on, reference has been made to a sensor module including an infrared sensor and a lens, the present disclosure is not limited thereto. The sensor module may be a package that accommodates an infrared sensor and an integrated circuit (IC) chip (or an IC element) for performing signal processing on an output signal of the infrared sensor.

In this case, the IC chip generates heat upon being driven. It is thus necessary to suppress the influence of the heat generated by the IC chip on detection results of the infrared sensor.

Accordingly, for example, Japanese Unexamined Patent Application Publication No. 2011-174762 discloses a configuration in which a wall portion is provided between the IC chip and the infrared sensor to prevent heat generated by the IC chip from being transferred to the infrared sensor.

However, a sensor module (package) having an infrared sensor is rotated around the scan rotation axis to thereby scan a detection range. Depending on the arrangement of the IC chip and the infrared sensor, heat generated by the IC chip during scanning may reach the infrared sensor through the atmosphere in the package and may exert an adverse influence on the detection results of the infrared sensor. That is, in the sensor module (package) disclosed in Japanese Unexamined Patent Application Publication No. 2011-174762, since no consideration is paid to the direction in which the IC chip and the infrared sensor are arranged (side-by-side), it is difficult to suppress the influence of heat generated by the IC chip on the detection results of the infrared sensor during scanning. There is thus a concern that, due to the influence of heat from the IC chip, a detection temperature in a detection range scanned by the infrared sensor may increase, resulting in a reduction in the sensor characteristics of the infrared sensor.

Accordingly, in the sixth embodiment, an infrared detection apparatus that can suppress or reduce the influence of heat from the IC chip during scanning will be described.

Configuration of Infrared Detection Apparatus

An infrared detection apparatus according to the sixth embodiment will be described hereinafter with reference to the drawings.

Figure 31:
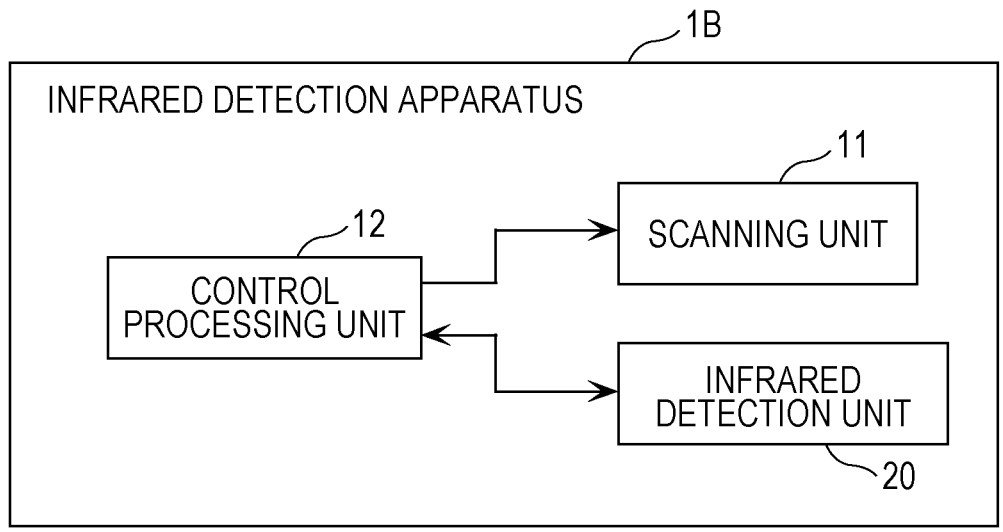
FIG. 31 is a diagram illustrating an example configuration of an infrared detection apparatus according to a sixth embodiment.
Figure 32:
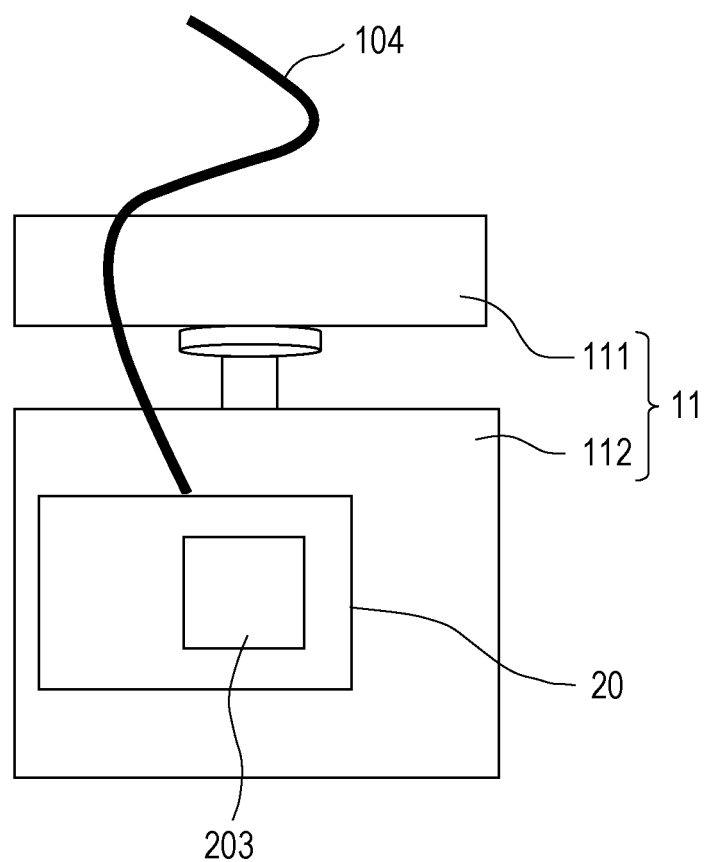
FIG. 32 is a partial schematic view of a physical configuration in which the infrared detection apparatus according to the sixth embodiment is mounted on a housing.
Figure 33A:
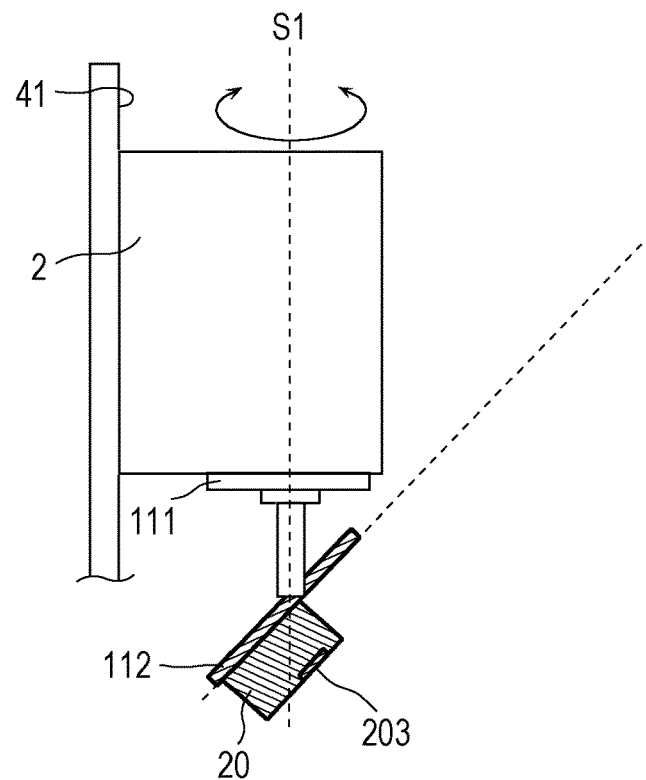
FIG. 33A is a diagram illustrating a physical configuration of the infrared detection apparatus according to the sixth embodiment.
Figure 33B:
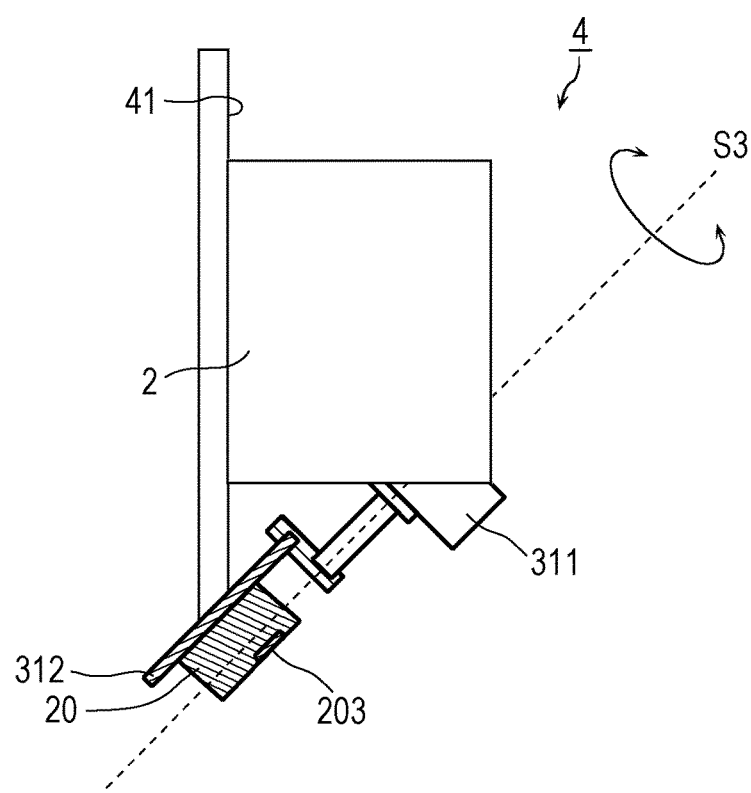
FIG. 33B is a diagram illustrating another physical configuration of the infrared detection apparatus according to the sixth embodiment.

FIG. 31 is a diagram illustrating an example configuration of an infrared detection apparatus 1B according to this embodiment. FIG. 32 is a partial schematic view of a physical configuration in which the infrared detection apparatus 1B according to this embodiment is mounted on a housing. FIG. 33A is a diagram illustrating a physical configuration of the infrared detection apparatus 1B according to this embodiment. FIG. 33B is a diagram illustrating another physical configuration of the infrared detection apparatus according to this embodiment. Elements similar to those in FIG. 1 to FIG. 4 are assigned the same numerals and symbols and are not described in detail herein.

As described above with reference to FIG. 3, the infrared detection apparatus 1B according to this embodiment is attached to a housing 2 installed on an installation surface 41, which is substantially perpendicular to a bottom surface of a space 4 and which is at a predetermined height from the bottom surface, and acquires a thermal image of a detection range in the space 4.

As illustrated in FIG. 31, the infrared detection apparatus 1B includes an infrared detection unit 20, a scanning unit 11, and a control processing unit 12. The infrared detection apparatus 1B illustrated in FIG. 31 is different from the infrared detection apparatus 1 according to the first embodiment in the configuration of the infrared detection unit 20.

Scanning Unit

First, the configuration and so on of the scanning unit 11 according to this embodiment will be described.

The scanning unit 11 has a scan rotation axis and rotates the infrared detection unit 20 about the scan rotation axis to thereby cause an infrared sensor 102, which is included in the infrared detection unit 20, to scan the space 4.

For example, as illustrated in FIG. 33A, the scanning unit 11 includes a motor 111 and a mounting base 112 and has a scan rotation axis S1 that is substantially parallel to the installation surface 41. The motor 111 is controlled by the control processing unit 12 to rotate the mounting base 112 about the scan rotation axis S1 to thereby cause the infrared detection unit 20 to rotate about the scan rotation axis S1. The infrared detection unit 20 is placed on the mounting base 112. As illustrated in FIG. 33A, the mounting base 112 is disposed at an inclination with respect to the scan rotation axis S1 and crosses the scan rotation axis S1.

For example, as illustrated in FIG. 33B, the scanning unit 11 may include a motor 311 and a mounting base 312 and may have a scan rotation axis S3 inclined from the installation surface 41. In this case, the motor 311 is controlled by the control processing unit 12 to rotate the mounting base 312 about the scan rotation axis S3 to thereby cause the infrared detection unit 20 to rotate about the scan rotation axis S3. The infrared detection unit 20 is placed on the mounting base 312. The mounting base 312 is disposed substantially parallel to the scan rotation axis S3.

Control Processing Unit

Next, the configuration and so on of the control processing unit 12 according to this embodiment will be described.

The control processing unit 12 controls the scanning unit 11, processes thermal images (input images) acquired by the infrared detection unit 20 (the infrared sensor 102), and outputs a resulting image to a computation device included in the housing 2. The control processing unit 12 may be included in the computation device in the housing 2. The details of the processes performed by the control processing unit 12, such as a distortion correction process and a super-resolution process, are substantially the same as those described above in the first embodiment and thus are not described herein. The distortion correction process and the super-resolution process may be performed by an IC chip 204 (described below) in the infrared detection unit 20.

Infrared Detection Unit

Next, the configuration and so on of the infrared detection unit 20 according to this embodiment will be described.

Figure 34:
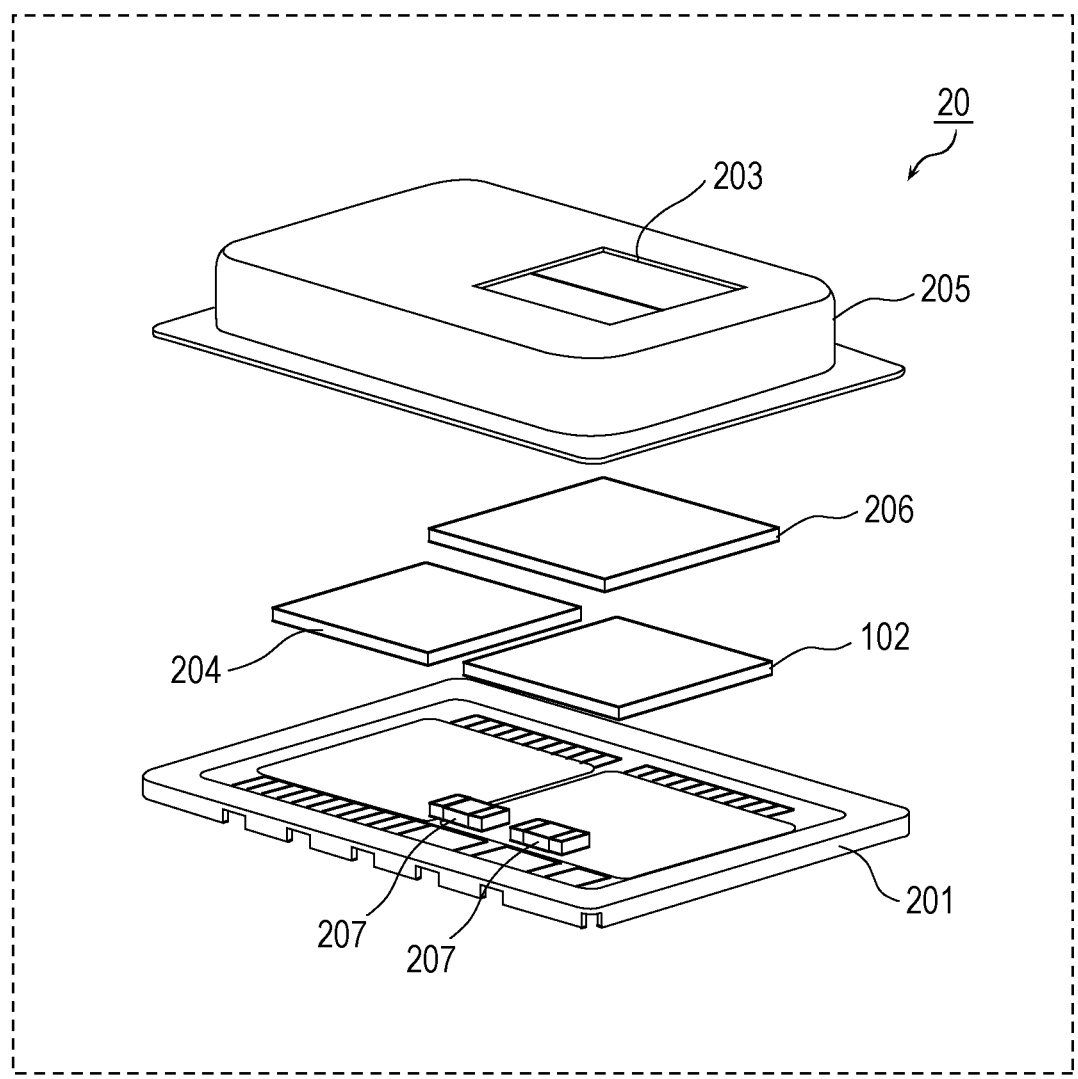
FIG. 34 is an exploded perspective view of an infrared detection unit according to the sixth embodiment.
Figure 35:
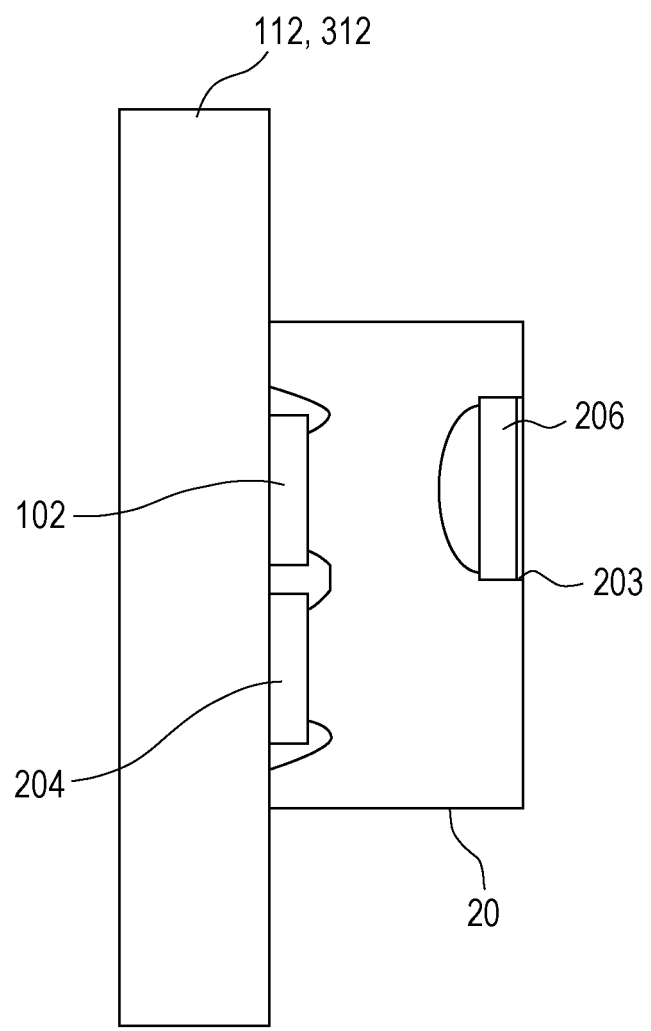
FIG. 35 is a schematic sectional view of the infrared detection unit according to the sixth embodiment.

FIG. 34 is an exploded perspective view of the infrared detection unit 20 according to this embodiment. FIG. 35 is a schematic sectional view of the infrared detection unit 20 according to this embodiment.

As illustrated in FIG. 33A or FIG. 33B, the infrared detection unit 20 is rotated about the scan rotation axis S1 or S3 by the scanning unit 11 to thereby scan a temperature detection range in the space 4. In this embodiment, the infrared detection unit 20 is a package that receives the infrared sensor 102 and the IC chip 204 in such a manner that the infrared sensor 102 and the IC chip 204 are arranged substantially side-by-side in the direction along the scan rotation axis of the infrared sensor 102. The package corresponds to a type of sensor module in the first embodiment and so on. More specifically, as illustrated in FIG. 34, the infrared detection unit 20 includes a package body 201, the infrared sensor 102, the IC chip 204, a package lid 205 having a window opening 203, and a plurality of thermistors 207.

The package body 201 is formed into a flat plate, and the infrared sensor 102 and the IC chip 204 are mounted on one surface side of the package body 201 so as to be arranged substantially side-by-side in the direction along the scan rotation axis S1 or S3 of the infrared sensor 102. The thermistors 207 are also disposed on the package body 201 in close proximity to the infrared sensor 102 along the scan rotation axis S1 or S3. The package lid 205, which encloses the infrared sensor 102 and the IC chip 204, is joined on the one surface side of the package body 201.

Examples of the base material of the package body 201 may include an electrically insulating material such as ceramic or resin. The use of ceramic as an electrically insulating material for the package body 201 can improve the moisture resistance and heat resistance of the package body 201, compared with the use of an organic material such as an epoxy resin.

The package body 201 also has defined thereon a wiring pattern (not illustrated) to which the infrared sensor 102, the IC chip 204, and so on are electrically connected. The package body 201 further has defined thereon a plurality of external connection electrodes (not illustrated) that are connected to the wiring pattern as appropriate. The package body 201 can be formed of, for example, a ceramic substrate, a printed wiring board, or the like. It is desirable that the distance between the external connection electrodes and the IC chip 204 be smaller than the distance between the external connection electrodes and the infrared sensor 102. This provides an arrangement that prevents heat flow radiated to the outside through the external connection electrodes from traveling through the infrared sensor 102, and can reduce a temperature distribution in the infrared sensor 102. It is more desirable that the external connection electrodes and the infrared sensor 102 be positioned opposite each other with the IC chip 204 therebetween. In this case, it is possible to further reduce a temperature distribution in the infrared sensor 102.

The package lid 205 encloses the infrared sensor 102 and the IC chip 204 and is joined on the one surface side of the package body 201. The package lid 205 has the window opening 203 at a position corresponding to the infrared sensor 102 to allow infrared radiation to reach the infrared sensor 102. A lens 206, which allows infrared light to enter the infrared sensor 102, is disposed in the window opening 203.

The lens 206 allows infrared radiation (infrared light) to enter the infrared sensor 102. More specifically, as described above, the lens 206 is formed of a material with high infrared transmittance, such as silicon or ZnS. The lens 206 is designed such that infrared radiation (infrared light) incident on the lens 206 from individual directions enters each of one or more infrared detection elements constituting the infrared sensor 102.

In this embodiment, the scan rotation axis S1 or S3 passes through the optical center of the lens 206. Thus, the infrared detection unit 20 (the infrared sensor 102) and the lens 206 are driven to rotate around the scan rotation axis S1 or S3 that passes through the optical center of the lens 206.

The scan rotation axis S1 or S3 may not necessarily pass through the optical center of the lens 206. The infrared sensor 102 may have at the center of the arrangement surface (lens center) thereof a rotation center which is the rotation center of the infrared sensor 102 when the infrared sensor 102 is rotated about the scan rotation axis S1 and through which the scan rotation axis S1 passes.

The thermistors 207, which are configured to detect temperatures of the infrared sensor 102, are arranged close to the infrared sensor 102 in the package body 201 and generate analog output voltages corresponding to the temperatures of the infrared sensor 102. In this embodiment, the thermistors 207 are arranged in close proximity to the infrared sensor 102. The thermistors 207 output the generated output voltages to the IC chip 204. Instead of the thermistors 207, any components such as thermocouples capable of detecting temperatures of the infrared sensor 102 may be used.

IC Chip

Next, the configuration and so on of the IC chip 204 according to this embodiment will be described.

The IC chip 204 is, for example, an application-specific IC (ASIC) and performs signal processing on an output signal of the infrared sensor 102. The IC chip 204 is not limited to an ASIC and may be any component on which a desired signal processing circuit is integrated. The IC chip 204 may be formed by using, for example, a silicon substrate or may be formed by using a compound semiconductor substrate such as a GaAs substrate or an InP substrate.

In this embodiment, the IC chip 204 is a bare chip. This is because the use of a bare chip can reduce the size of the infrared detection unit 20, compared with the packaging of a bare chip of the IC chip 204.

As described above, the IC chip 204 is mounted on the package body 201 together with the infrared sensor 102. The IC chip 204 and the infrared sensor 102 are arranged substantially side-by-side in the direction along the scan rotation axis of the infrared sensor 102.

The IC chip 204 may perform a correction process on an output signal of the infrared sensor 102 and perform signal processing on the output signal subjected to the correction process on the basis of output results of the two or more thermistors 207. This allows the IC chip 204 to perform temperature correction on a thermal image by using thermistors, resulting in the infrared detection unit 20 being able to acquire a favorable thermal image with less noise. As described above, the IC chip 204 may incorporate some of the functions of the control processing unit 12 to perform a super-resolution process and so on.

The IC chip 204 cooperates with the infrared sensor 102. The circuit configuration of the IC chip 204 may be designed as desired in accordance with the type of the infrared sensor 102 or the like and may be implemented using, for example, a signal processing circuit that performs signal processing on an output signal of the infrared sensor 102. In the following, a description is given of an example circuit configuration of the IC chip 204.

Figure 36:
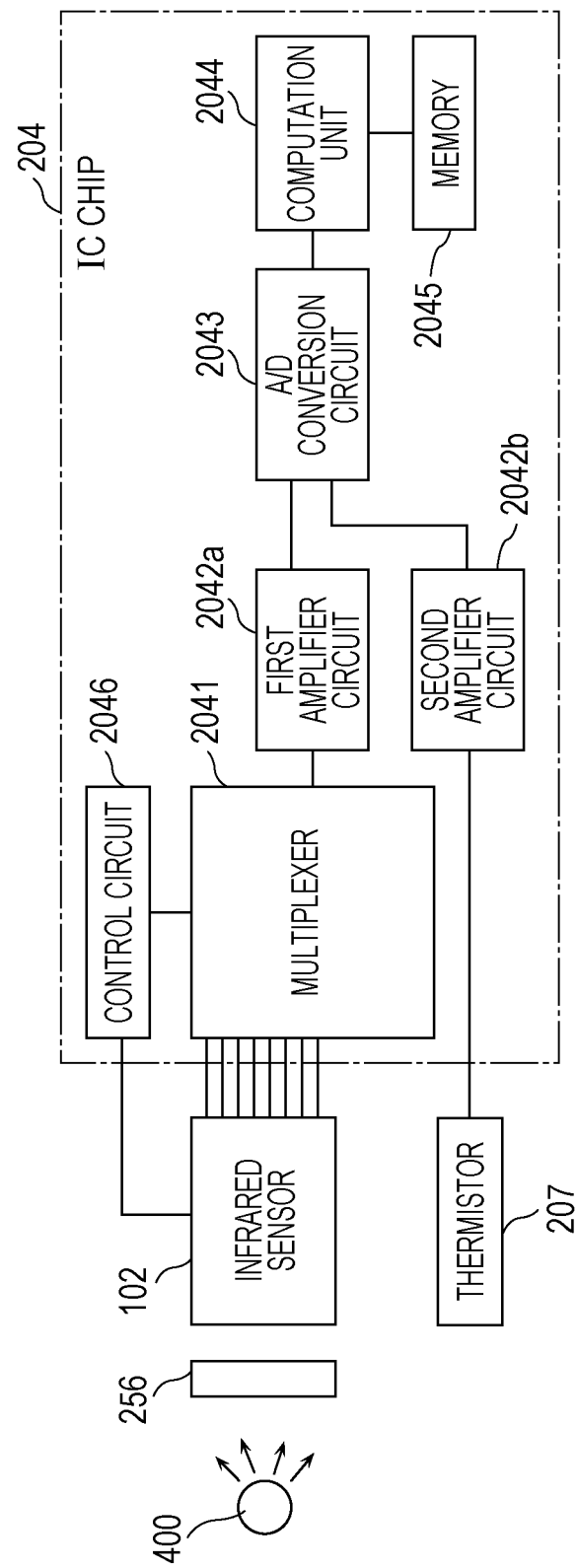
FIG. 36 is a circuit block diagram of an integrated circuit (IC) chip according to the sixth embodiment.

FIG. 36 is a circuit block diagram of the IC chip 204 according to this embodiment.

As illustrated in FIG. 36, the IC chip 204 includes a first amplifier circuit 2042a that amplifies an output voltage of the infrared sensor 102, a second amplifier circuit 2042b that amplifies output voltages of the thermistors 207, and a multiplexer 2041 that selects one of a plurality of output voltages of the infrared sensor 102 and inputs the selected output voltage to the first amplifier circuit 2042a. The IC chip 204 further includes an analog-to-digital (A/D) conversion circuit 2043. The A/D conversion circuit 2043 converts the output voltage of the infrared sensor 102, which has been amplified by the first amplifier circuit 2042a, and the output voltages of the thermistors 207, which have been amplified by the second amplifier circuit 2042b, into digital values. The IC chip 204 further includes a computation unit 2044. The computation unit 2044 computes the temperature of an object 400 by using the digital values output from the A/D conversion circuit 2043 in response to the output voltages of the infrared sensor 102 and the thermistors 207. The IC chip 204 further includes a memory 2045, which is a storage unit that stores data and so on to be used for computation by the computation unit 2044. The IC chip 204 further includes a control circuit 2046 that controls the infrared sensor 102.

Configuration of Infrared Sensor

Next, the configuration of the infrared sensor 102 will be described.

The infrared sensor 102 is rotated around the scan rotation axis S1, as illustrated in FIG. 33A, to scan the temperature detection range in the space 4 and outputs an output signal indicating a thermal image (an infrared image) of the scanned temperature detection range to the IC chip 204. Specifically, the infrared sensor 102 includes one or more infrared detection elements arranged in one or more columns on a surface thereof (hereinafter referred to as the "arrangement surface"), and detects infrared radiation in the temperature detection range in the space 4 scanned by the one or more infrared detection elements.

The arrangement surface on which the one or more infrared detection elements are arranged is inclined with respect to the installation surface 41. In other words, the arrangement surface is inclined from the scan rotation axis S1. The arrangement surface crosses the scan rotation axis S1. Thus, for example, as described above with reference to FIG. 3, the central axis of the field of view of the infrared sensor 102 is directed toward the bottom surface with respect to the direction vertical to the installation surface 41, that is, is directed downward.

This allows a lower area near the position at which the infrared sensor 102 is installed to be included in the effective viewing angle (angle of view). In the infrared sensor 102 according to this embodiment, therefore, it is possible to increase the detection range in the lower area.

While in this embodiment, reference is made to the case where the scan rotation axis S1 or S3 passes through the optical center of the lens 206, as described above, a rotation center which is the rotation center of the infrared sensor 102 when the infrared sensor 102 is rotated about the scan rotation axis S1 or S3 and through which the scan rotation axis S1 or S3 passes may be provided at the center (the lens center) of the arrangement surface of the infrared sensor 102, rather than at the optical center of the lens 206.

The arrangement of the plurality of infrared detection elements constituting the infrared sensor 102 may be implemented using any of the arrangements described in the second to fifth embodiments. In the following, some example arrangements of the plurality of infrared detection elements constituting the infrared sensor 102 will be described with reference to the drawings.

FIG. 37, FIG. 38, and FIG. 39A to FIG. 39C are diagrams illustrating example arrangements of the plurality of infrared detection elements constituting the infrared sensor according to this embodiment. Elements similar to those in FIG. 2, FIG. 19A, FIG. 20, and so on are assigned the same numerals and symbols and are not described in detail herein.

First Example Arrangement

Figure 37:
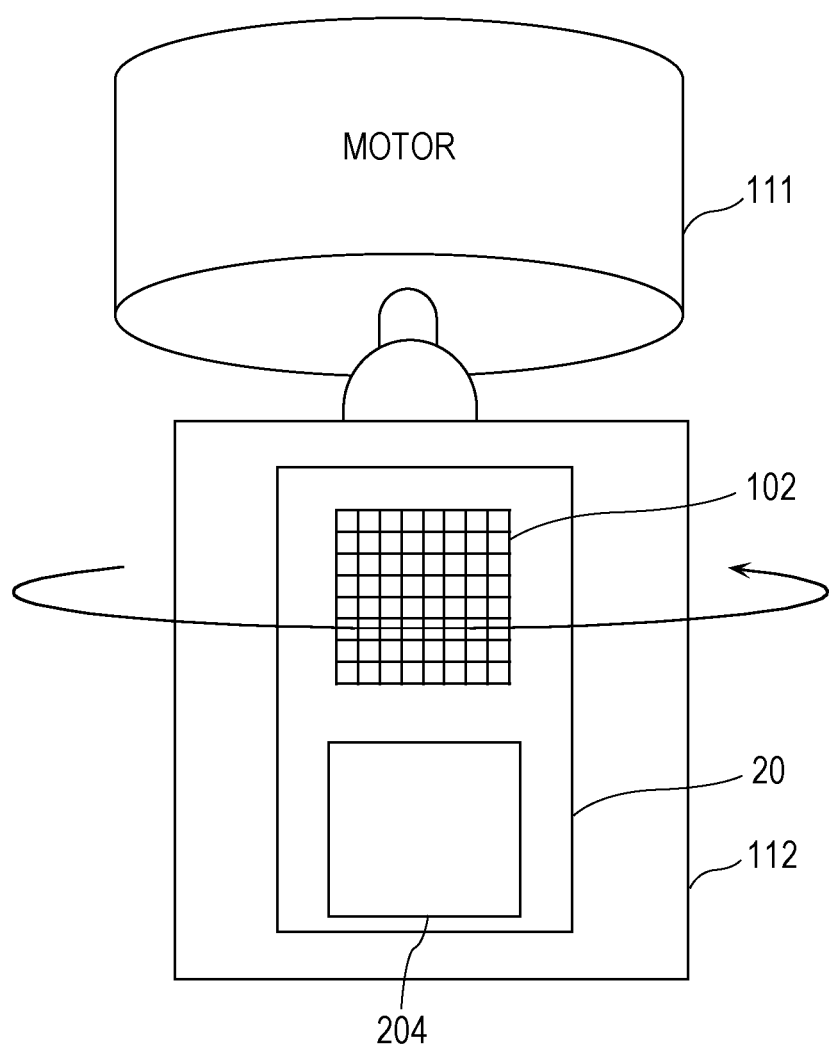
FIG. 37 is a diagram illustrating an example arrangement of a plurality of infrared detection elements constituting an infrared sensor according to the sixth embodiment.

For example, as illustrated in FIG. 37, the infrared sensor 102 and the IC chip 204 may be arranged side-by-side (or substantially side-by-side) in the direction along the scan rotation axis S1 (or S3) of the infrared sensor 102, and the columns of the plurality of infrared detection elements constituting the infrared sensor 102 may be arranged along the direction of rotation about the scan rotation axis S1.

Second Example Arrangement

Figure 38:
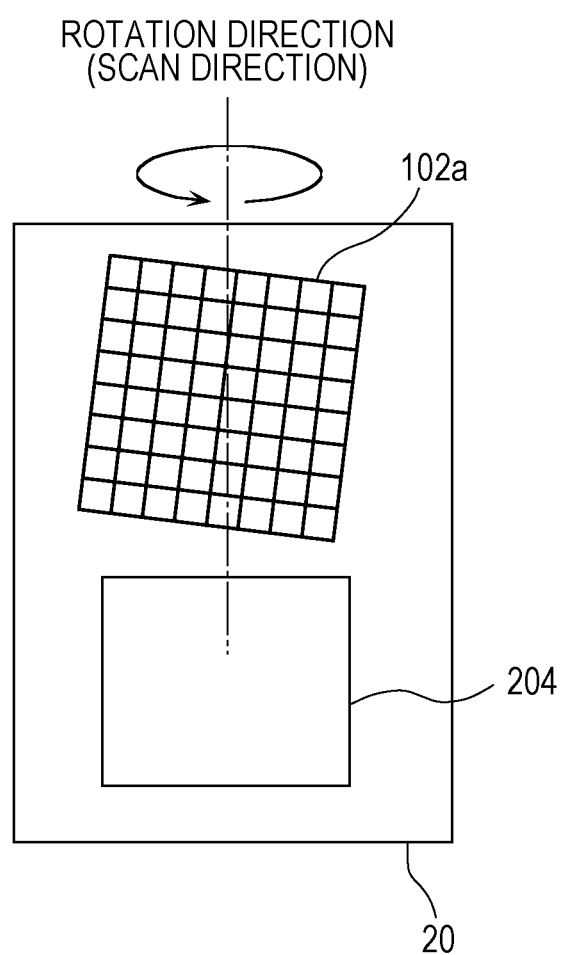
FIG. 38 is a diagram illustrating an example arrangement of the plurality of infrared detection elements constituting the infrared sensor according to the sixth embodiment.

For example, the infrared sensor 102 may be an infrared sensor 102a illustrated in FIG. 38. That is, as illustrated in FIG. 38, the infrared sensor 102a and the IC chip 204 may be arranged side-by-side (or substantially side-by-side) in the direction along the scan rotation axis S1 (or S3) of the infrared sensor 102a, and the columns of the plurality of infrared detection elements constituting the infrared sensor 102a may be disposed at an inclination at a predetermined angle with respect to the direction of rotation about the scan rotation axis S1 (or S3). The predetermined angle is an angle adjusted so that all the respective center positions of the plurality of infrared detection elements constituting the infrared sensor 102a are different, as viewed in the direction of rotation about the scan rotation axis S1 (or S3). The details of the predetermined angle and the infrared sensor 102a are substantially the same as those described above in the fourth and fifth embodiments and thus are not described herein.

In the infrared sensor 102a having the configuration described above, as described above in the fourth embodiment and so on, it is possible to substantially increase the number of pixels in the direction perpendicular to the scan rotation axis S1. That is, it is possible to enhance the resolution in the direction perpendicular to the scan rotation axis S1 without increasing the actual number of infrared detection elements constituting the infrared sensor.

Third Example Arrangement

Figure 39A:
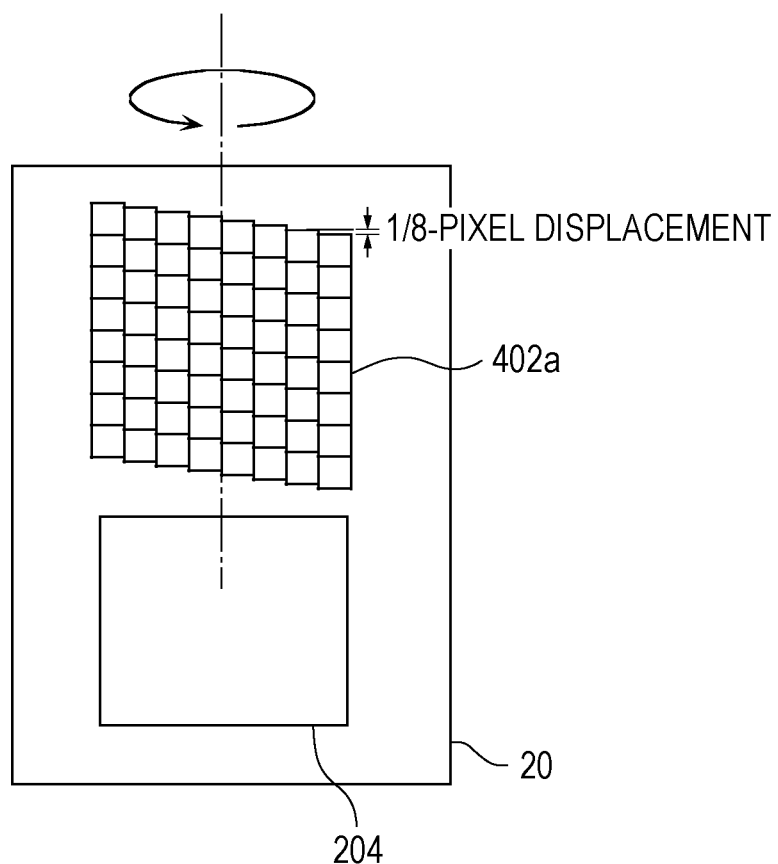
FIG. 39A is a diagram illustrating an example arrangement of the plurality of infrared detection elements constituting the infrared sensor according to the sixth embodiment.

For example, the infrared sensor 102 may be an infrared sensor 402a illustrated in FIG. 39A. That is, as illustrated in FIG. 39A, the infrared sensor 402a may include a plurality of infrared detection elements arranged in two or more columns in an arrangement direction in which the infrared sensor 402a and the IC chip 204 are arranged, and may be configured such that the two or more columns are displaced from each other in the arrangement direction. In the example illustrated in FIG. 39A, the two or more columns in the infrared sensor 402a are displaced from each other in such a manner that a column closer to the leading edge in the direction of rotation about the scan rotation axis S1 (or S3) is closer to an end in the arrangement direction in which the infrared sensor 402a and the IC chip 204 are arranged, that is, is farther from the IC chip 204. In the example illustrated in FIG. 39A, infrared detection elements are arranged in 8 rows and 8 columns, and the infrared detection elements in adjacent columns are displaced from each other by ⅛ pixel.

Figure 39B:
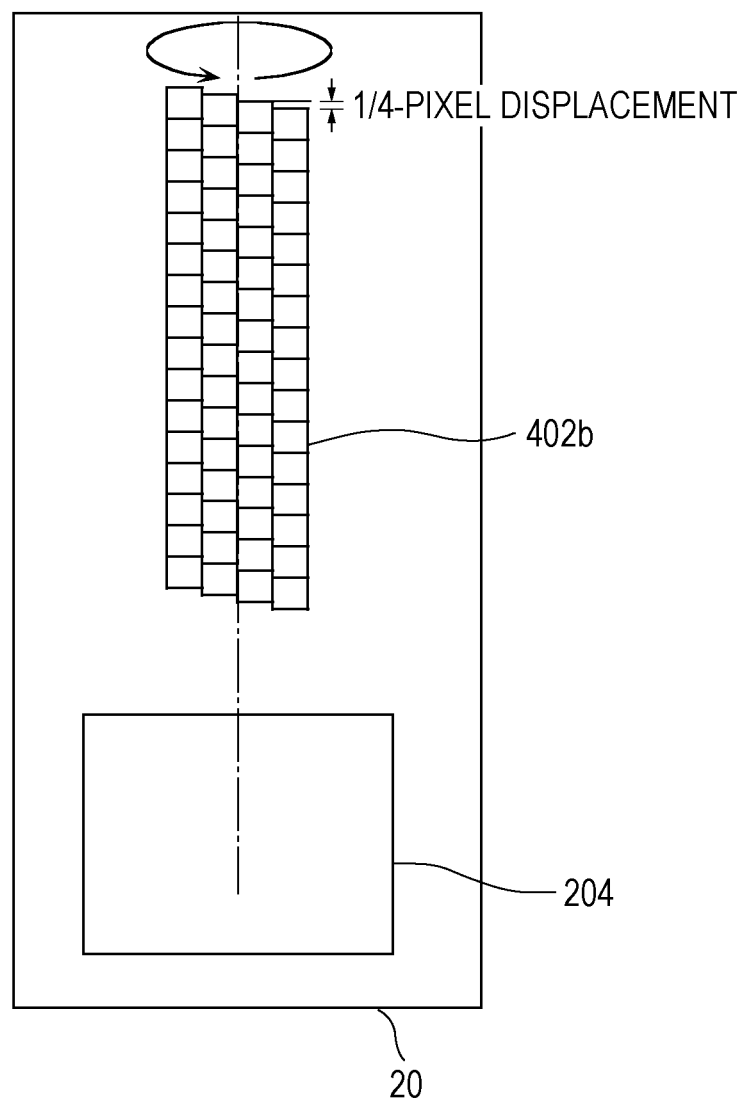
FIG. 39B is a diagram illustrating an example arrangement of the plurality of infrared detection elements constituting the infrared sensor according to the sixth embodiment.
Figure 39C:
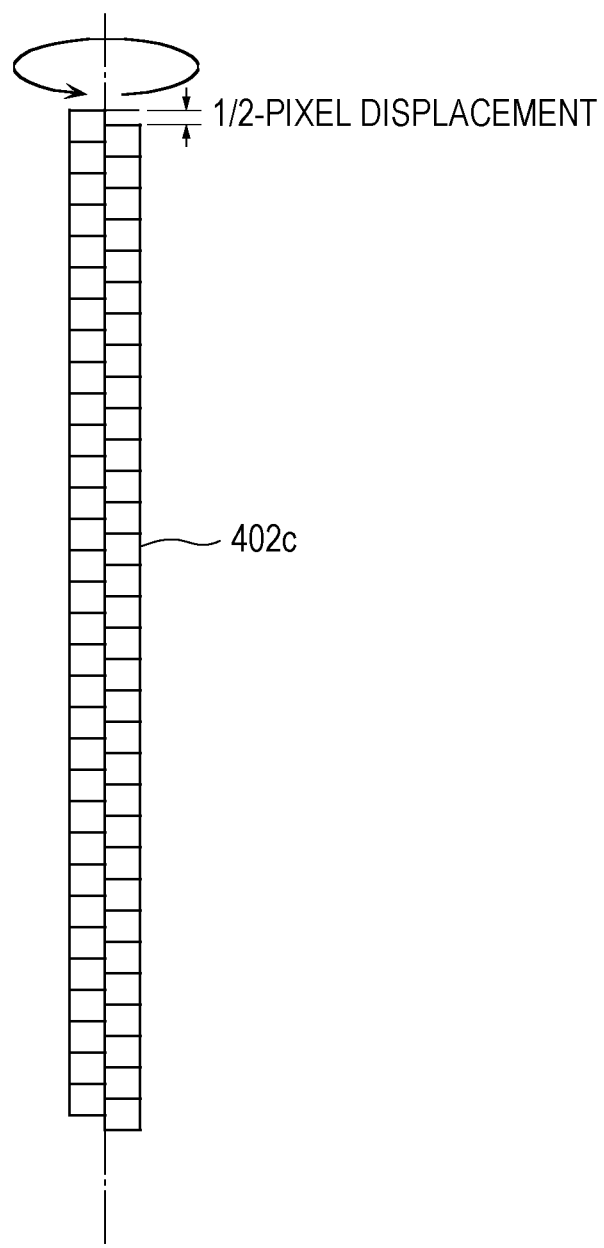
FIG. 39C is a diagram illustrating an example arrangement of the plurality of infrared detection elements constituting the infrared sensor according to the sixth embodiment.

An example in which the infrared detection elements in adjacent columns are displaced from each other (pixel displacement arrangement) is not limited to the infrared sensor 402a illustrated in FIG. 39A. For example, an infrared sensor 402b illustrated in FIG. 39B or an infrared sensor 402c illustrated in FIG. 39C may be used. More specifically, as illustrated in FIG. 39B, in the infrared sensor 402b, infrared detection elements are arranged in 16 rows and 4 columns and the infrared detection elements in adjacent columns are displaced from each other by ¼ pixel. As illustrated in FIG. 39C, in the infrared sensor 402c, infrared detection elements are arranged in 32 rows and 2 columns and the infrared detection elements in adjacent columns are displaced from each other by ½ pixel.

In the infrared sensor 402a and so on having the configurations described above, as described above in the second embodiment, it is possible to substantially increase the number of pixels in the direction perpendicular to the scan rotation axis S1 (or S3). That is, it is possible to enhance the resolution in the direction perpendicular to the scan rotation axis S1 without increasing the number of infrared detection elements actually constituting the infrared sensor.

In FIG. 39A to FIG. 39C, the arrangements of infrared sensors having 64 pixels in total are illustrated. That is, it is desirable to use an infrared sensor having $n^2$ pixels (n is a natural number) in total even when the number of rows of pixels and the number of columns of pixels are different, such as 16 rows and 4 columns (16×4) or 32 rows and 2 columns (32×2). This is because the configurations described above allow an electrical signal to be converted into a temperature signal by using the same ASIC as that for 8×8, that is, the IC chip 204, and can reduce the cost of ASIC development.

Fourth Example Arrangement

Also, for example, similarly to the infrared sensors 202 and so on illustrated in FIG. 7, FIG. 9, FIG. 10, FIG. 11A to FIG. 15 described above in the second embodiment, the infrared sensor 102 may include a plurality of infrared detection elements arranged in one or more columns and may be configured such that each of the infrared detection elements in each column has horizontal edges substantially parallel to the bottom surface 42 and having a length that decreases as the distance to the bottom surface 42 decreases. The details are substantially the same as those described in the second embodiment and no description is provided here.

In the infrared sensors 202 and so on having the configurations described above, as described above in the second embodiment, even if the infrared detection elements in each row in the infrared sensor 202 whose central axis of the field of view is inclined with respect to the scan rotation axis S1 have different rotational speeds, the scan densities (resolutions) of the infrared detection elements from the upper end to the lower end can be made uniform. This provides the advantage of no need for distortion correction of a thermal image.

Advantages etc. of Sixth Embodiment

As described above, according to this embodiment, it is possible to realize the infrared detection apparatus 1B that can suppress or reduce the influence of heat from the IC chip 204 during scanning.

The advantage of suppressed or reduced influence of heat from the IC chip 204 during scanning will now be described with reference to the drawings.

Figure 40A:
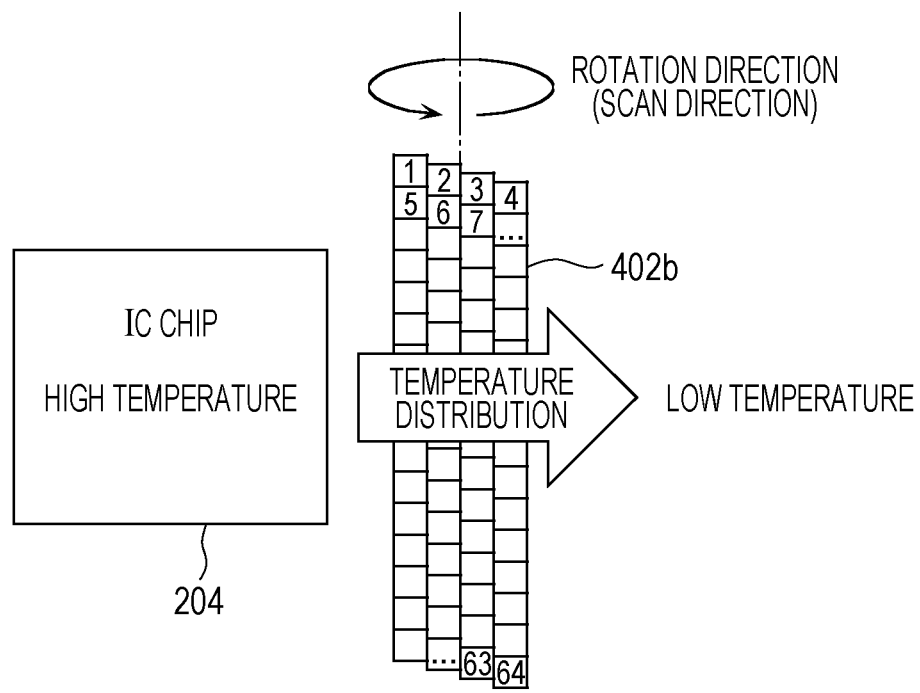
FIG. 40A is a diagram depicting the influence of heat from an IC chip during scanning in a comparative example.
Figure 40B:
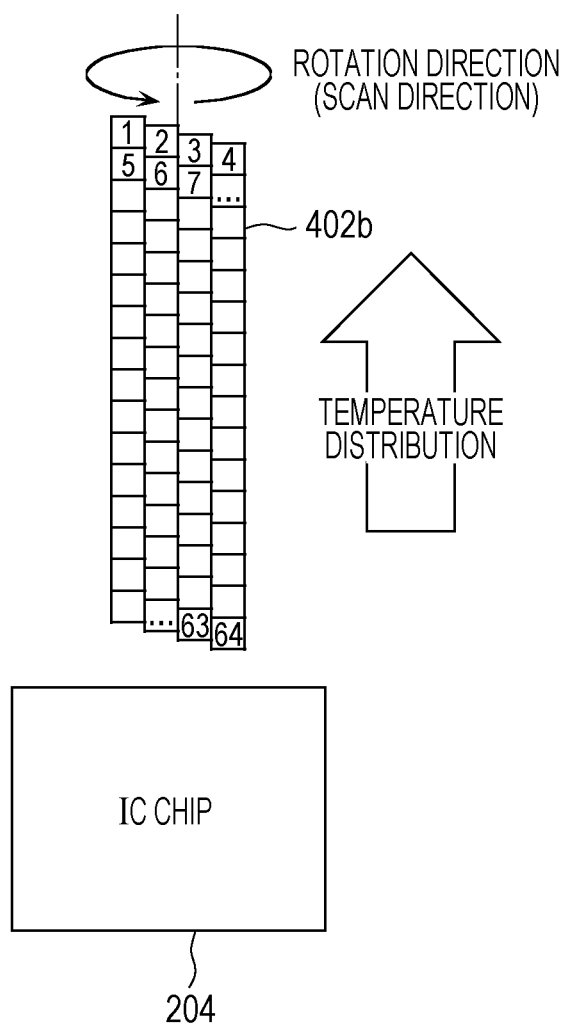
FIG. 40B is a diagram depicting the influence of heat from an IC chip during scanning in the infrared detection apparatus according to the sixth embodiment.

FIG. 40A is a diagram depicting the influence of heat from the IC chip 204 during scanning in a comparative example. FIG. 40B is a diagram depicting the influence of heat from the IC chip during scanning in the infrared detection apparatus according to this embodiment. In FIG. 40A and FIG. 40B, a description will be given of the infrared sensor 402b illustrated in FIG. 39B since this is also true for the infrared sensor 102a having the inclination described with reference to FIG. 38 (i.e., an inclined infrared sensor), the infrared sensors 402a, described with reference to FIG. 39A to FIG. 39C, configured such that the infrared detection elements in adjacent columns are displaced from each other (i.e., infrared sensors with pixel displacement arrangement), and so on. In FIG. 40A and FIG. 40B, furthermore, the infrared detection elements constituting the infrared sensor 402b are assigned numbers (1, 2, 3, 4, 5, 6, 7, 8, . . . , 63, and 64) sequentially from the top.

For example, the IC chip 204, which is an ASIC, generates heat. In the arrangement of the IC chip 204 and the infrared sensor 402b according to the comparative example illustrated in FIG. 40A, a temperature distribution occurs toward the direction of rotation about the scan rotation axis (i.e., in the lateral direction in FIG. 40A). This causes a problem in that when the infrared sensor 402b, described with reference to FIG. 39B, configured such that pixels in adjacent columns are displaced from each other is used to acquire a thermal image and to perform a super-resolution process, horizontal streak noise can be generated in an image subjected to the super-resolution process. For example, whereas the infrared detection element with number 4 has a low temperature, the infrared detection element with number 5 has a high temperature, causing a temperature difference between the infrared detection element with number 4 and the infrared detection element with number 5. That is, a temperature difference occurs between infrared detection elements with adjacent numbers. A temperature distribution in the lateral direction (i.e., in the rotation direction and the scan direction) may cause undesired processing results to be output, such as generation of horizontal streak noise such creation of jagged lines, when a super-resolution process is performed.

In contrast, in the arrangement of the IC chip 204 and the infrared sensor 402b according to this embodiment illustrated in FIG. 40B, a temperature distribution occurs in the direction along the scan rotation axis (i.e., in the longitudinal direction in FIG. 40B). In this case, since the temperature increases in the order of the infrared detection elements with numbers 1, 2, 3, . . . , 63, and 64, a smaller temperature difference occurs between infrared detection elements with adjacent numbers. Thus, even when a super-resolution process is performed on an acquired thermal image, the generation of horizontal streak noise in an image subjected to the super-resolution process can be suppressed or such horizontal streak noise can be reduced. That is, the infrared detection apparatus according to this embodiment can suppress or reduce the influence of heat from the IC chip 204 during scanning.

In FIG. 40B, an example in which the IC chip 204 is disposed directly below the infrared sensor 402b is illustrated. That is, in the illustrated example, the angle θ (not illustrated) defined by the scan rotation axis and a line (hereinafter, a first line) connecting a substantially center position of the infrared sensor 402b and a substantially center position of the IC chip 204 is 0°. However, the present disclosure is not limited to this example, and it is sufficient that the infrared sensor 402b and the IC chip 204 be arranged substantially side-by-side in the direction along the scan rotation axis of the infrared sensor 402b. The term "substantially side-by-side", as used herein, refers to an arrangement with an angle θ satisfying −45°<θ<+45°, for example, between the first line and the scan rotation axis. In other words, it is sufficient that an arrangement with an angle satisfying "the angle defined by the first line and the scan rotation axis"<"the angle defined by the first line and the direction perpendicular to the scan rotation axis". In view of the influence of a temperature distribution described above, it is more preferably that −15°<θ<+15° be satisfied.

In addition, it is desirable to provide, for example, a temperature measurement unit capable of detecting the temperature of the infrared sensor 402b, such as a thermistor or a thermocouple. This configuration allows the IC chip 204 to perform a correction process on an output signal of the infrared sensor 402b and perform signal processing on the output signal subjected to the correction process on the basis of output results of the thermistors 207. That is, the IC chip 204 can output a more favorable thermal image by suppressing or reducing the influence of heat from the IC chip 204 by performing correction on the basis of output results of the thermistors 207. Hence, there is an advantage in that even when a super-resolution process is performed thereafter, a thermal image with less horizontal streak noise can be acquired.

Figure 41A:
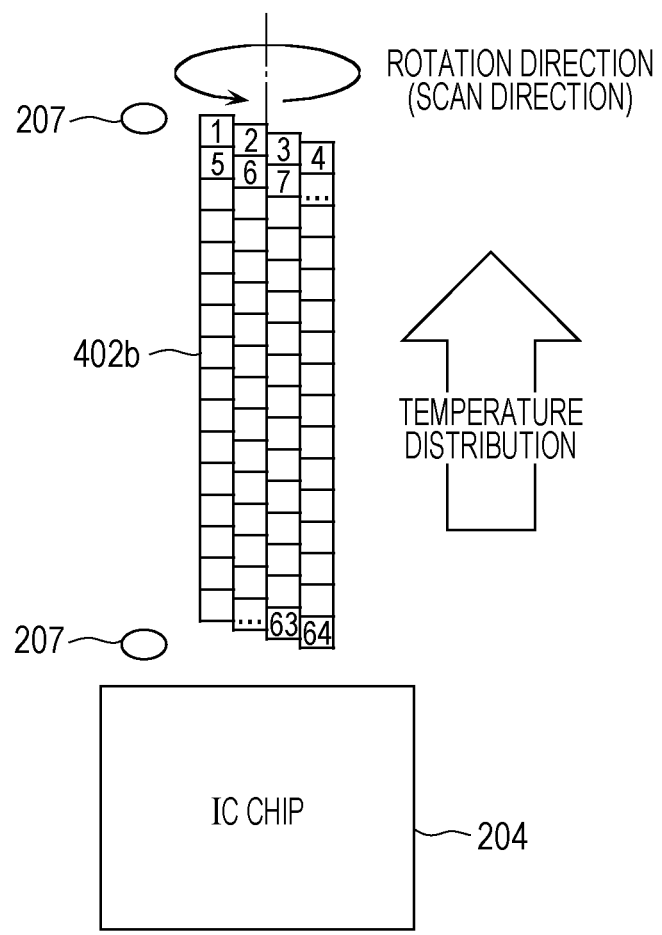
FIG. 41A is a diagram illustrating an example of the arrangement of thermistors according to the sixth embodiment.
Figure 41B:
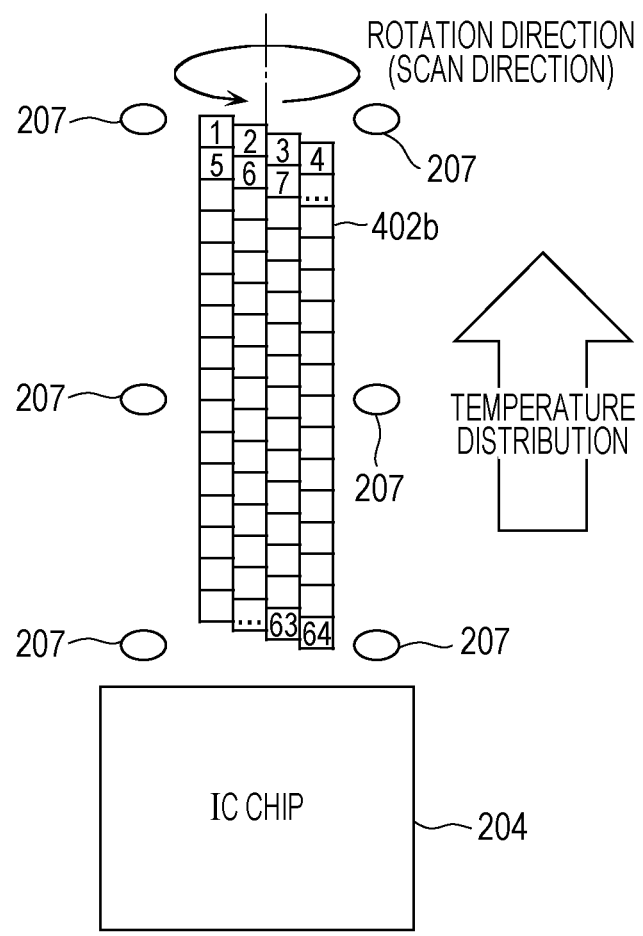
FIG. 41B is a diagram illustrating an example of the arrangement of thermistors according to the sixth embodiment.

FIG. 41A and FIG. 41B are diagrams illustrating examples of the arrangement of thermistors when a plurality of thermistors are used. When the infrared detection apparatus 1B according to this embodiment includes two thermistors 207, the thermistors 207 may be arranged in the manner illustrated in FIG. 41A, for example. When the infrared detection apparatus 1B according to this embodiment includes six thermistors 207, the thermistors 207 may be arranged in the manner illustrated in FIG. 41B, for example.

In FIG. 41A and FIG. 41B, the use of a plurality of thermistors is illustrated. However, the present disclosure is not limited to the illustrated examples. The infrared detection apparatus 1B according to this embodiment may include a single thermistor.

First Modification
Underlying Knowledge Forming Basis of First Modification

As described above in the sixth embodiment, when an infrared sensor and a heat generating body such as an IC chip are contained in a single package, it is necessary to take into account the influence of heat from the IC chip during scanning. For example, as illustrated in FIG. 40A, when the infrared sensor 402b and the IC chip 204 are arranged side-by-side, a temperature distribution occurs in the lateral direction, that is, in the rotation direction (the scan direction). When the infrared sensor 402b is used to acquire a thermal image and to perform a super-resolution process, the temperature distribution toward the scan direction causes image noise such as horizontal streaks or jagged lines to be generated in an image obtained by a super-resolution technique.

It is also necessary to take in account the influence of image distortion caused by an optical system such as a lens. This is because when a thermal image is acquired by an infrared sensor, a thermal image containing image distortion caused by an optical system may cause image noise such as streaks or jagged lines to be generated in an image obtained by a super-resolution technique.

In this modification, a description will be given of an infrared detection apparatus in which the influence of image distortion caused by an optical system during scanning can be suppressed or reduced. In the following, differences from the sixth embodiment are mainly described.

The configuration of the infrared detection apparatus according to this modification is different from that of the infrared detection apparatus 1B according to the sixth embodiment in the configuration of a lens 206B (not illustrated) and the characteristics of a thermal image acquired by the infrared sensor 102 or the like. Other configurations are similar to those in the sixth embodiment and are not described herein.

Lens 206B

Figure 42A:
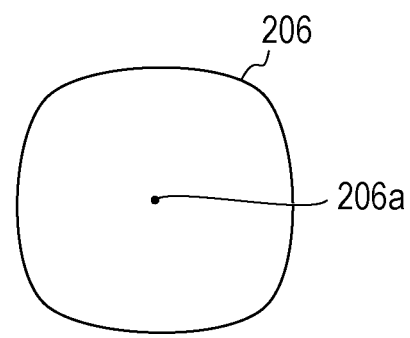
FIG. 42A is a diagram illustrating an example optical configuration of a lens in a comparative example.
Figure 42B:
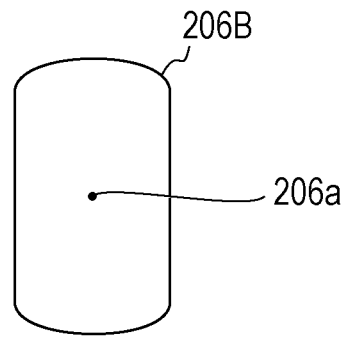
FIG. 42B is a diagram illustrating an example optical configuration of a lens in a first modification of the sixth embodiment.

FIG. 42A is a diagram illustrating an example optical configuration of the lens 206 in a comparative example. FIG. 42B is a diagram illustrating an example optical configuration of a lens 206B according to a first modification of the sixth embodiment.

The lens 206B allows infrared light to pass therethrough. In this modification, the lens 206B has a shape in which end portions of a lens having substantially identical lengths in a scan rotation axis direction and a scan direction are cut away in the scan direction.

More specifically, the lens used in the infrared detection apparatus 1B according to the sixth embodiment is, for example, the lens 206. As illustrated in FIG. 42A, the lens 206 has an optical center 206a and has substantially identical lengths in a scan rotation axis direction and in a scan direction. In contrast, the lens 206B used in the infrared detection apparatus according to this modification is formed by, as illustrated in FIG. 42B, modifying the shape of the lens 206 illustrated in FIG. 42A in such a manner that end portions of the lens 206 in the scan direction are cut away. With this shape, the lens 206B has lower sensitivity than the lens 206. On the contrary, the point spread function (PSF) of the infrared sensor 102 in the lateral direction (the scan direction) can be made narrower than the PSF of the infrared sensor 102 in the longitudinal direction (the scan rotation axis direction). The smaller the lens, the lower the sensitivity. However, a lens having a longitudinal diameter that is larger than a lateral diameter thereof can reduce the PSF in the lateral direction while suppressing a reduction in sensitivity.

When the lens 206B has the shape illustrated in FIG. 42B, the infrared detection elements (pixels) constituting the infrared sensor 102 or the like may have each a rectangular shape that is long in the scan rotation axis direction and short in the scan direction.

The lens 206 may be an (optically) axially asymmetric lens, for example. For example, the lens 206 may be a cylindrical lens.

Infrared Sensor 102 or the Like

As in the sixth embodiment, the infrared sensor 102 or the like includes infrared detection elements arranged in two or more columns and in two or more rows. The infrared sensor 102 or the like is rotated around the scan rotation axis that passes through part of the lens to thereby scan a detection range, and outputs an output signal indicating a thermal image of the detection range. At least two infrared detection elements of the infrared sensor 102 are located at positions displaced from each other as viewed in the direction perpendicular to the scan rotation axis.

In this modification, the number of first infrared detection elements that are included in the infrared detection elements arranged in the two or more columns and in the two or more rows and that have a smaller half-width of a point spread function in a scan direction than a half-width of a point spread function in the direction of the scan rotation axis is larger than the number of second infrared detection elements that are included in the infrared detection elements arranged in the two or more columns and in the two or more rows and that have a larger half-width of a point spread function in the scan direction than a half-width of a point spread function in the direction of the scan rotation axis. The first infrared detection elements may include four corner infrared detection elements among the infrared detection elements arranged in the two or more columns and in the two or more rows.

In the infrared sensor 102 or the like, the difference in the half-width of the point spread function in the scan direction between an infrared detection element at a first position and an infrared detection element at a second position among infrared detection elements at both ends in adjacent rows among the infrared detection elements arranged in the two or more columns may be smaller than the difference in the half-width of the point spread function in the scan direction between the infrared detection element at the first position and an infrared detection element at a third position among infrared detection elements in the adjacent rows or among infrared detection elements at both ends in adjacent columns among the two or more columns, the infrared detection element at the first position and the infrared detection element at the second position being consecutive in scan order, the infrared detection element at the first position and the infrared detection element at the third position not being consecutive in the scan order.

A specific description will be made with reference to FIG. 41A, as an example.

For example, for the infrared detection element with number 4 (hereinafter the pixel 4) and the infrared detection element with number 5 (hereinafter the pixel 5) illustrated in FIG. 41A, the larger the difference between the horizontal half-width of the PSF of the pixel 4 (in the scan direction) and the horizontal half-width of the PSF of the pixel 5, the more likely it is to generate image noise such as horizontal streaks or jagged lines. However, the difference between the vertical half-width of the PSF of the pixel 4 (in rotation axis direction) and the vertical half-width of the PSF of the pixel 5 (in the rotation axis direction) is less influential in image noise.

As described above, an infrared sensor may cause image noise such as horizontal streaks or jagged lines with respect to the scan direction due to the influence of image distortion caused by an optical system in the scan direction.

Accordingly, in this modification, to suppress or reduce the influence of image distortion caused by an optical system in the scan direction, infrared detection elements (pixels) constituting an infrared sensor are configured such that the PSF in the scan direction is narrower than the PSF in the rotation axis direction. This configuration is implemented using the configuration of the optical system, that is, the lens 206B.

In particular, the pixels at the four corners, for example, the pixels 1, 4, 61, and 64 illustrated in FIG. 41A, are more likely to be affected by distortion caused by the optical system. It is thus desirable to design the optical system or the sensor arrangement so that, for example, the extent of the PSF of at least the pixels at the four corners, such as at least the pixels 1, 4, 61, and 64, in the scan direction is smaller than the extent of the PSF of those in the direction perpendicular to the scan direction. This is because the configuration described above narrows the PSF in the scan direction and also reduces the difference between the PSFs of the pixels 4 and 5 in the scan direction.

Advantages etc. of First Modification

As described above, according to this modification, it is possible to realize an infrared detection apparatus in which the influence of image distortion caused by an optical system during scanning can be suppressed or reduced.

While in the first modification described above, reference has been made to an infrared detection apparatus in which an infrared sensor and an IC chip are arranged, the present disclosure is not limited thereto. In the first modification, the infrared sensor 102 or the like may not necessarily be arranged together with the IC chip 204. While in the first modification described above, the plurality of infrared detection elements constituting the infrared sensor 102 or the like have been described as being located at positions displaced from each other as viewed in the direction perpendicular to the scan rotation axis, the present disclosure is not limited thereto. This case will be described hereinbelow.

Figure 43A:
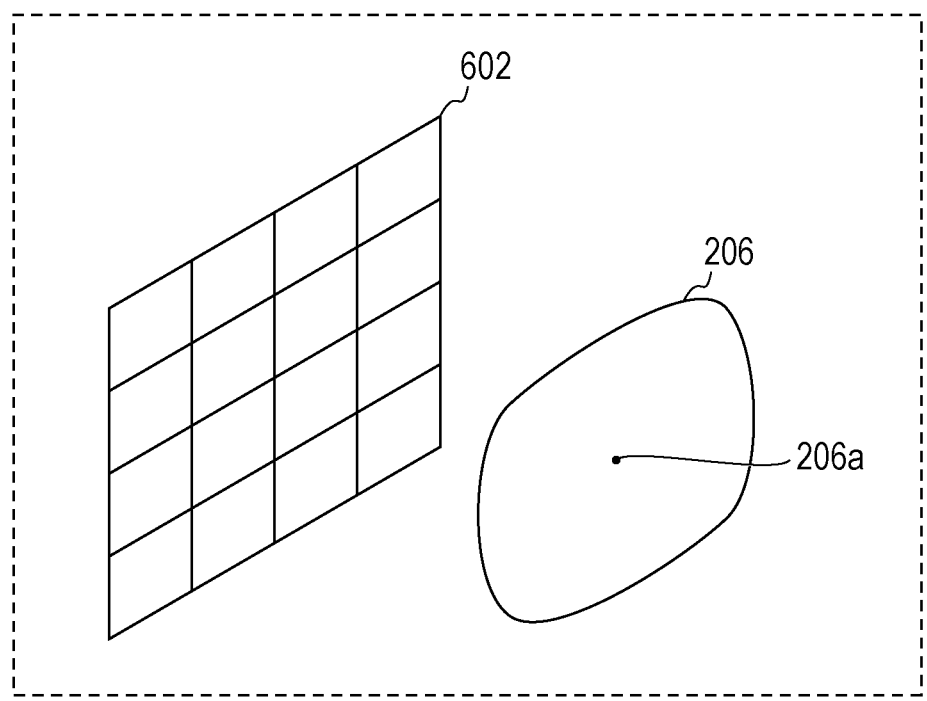
FIG. 43A is a diagram illustrating an example of the arrangement of the lens and the infrared sensor according to a comparative example.
Figure 43B:
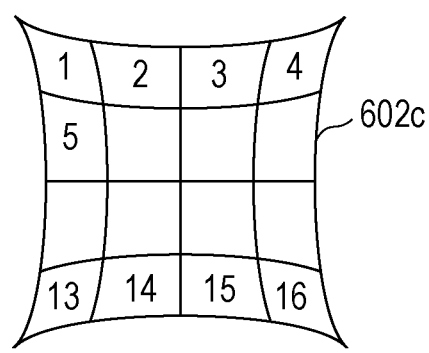
FIG. 43B is a diagram illustrating, as an image, image distortion in a thermal image acquired by the infrared sensor according to the comparative example.
Figure 44:
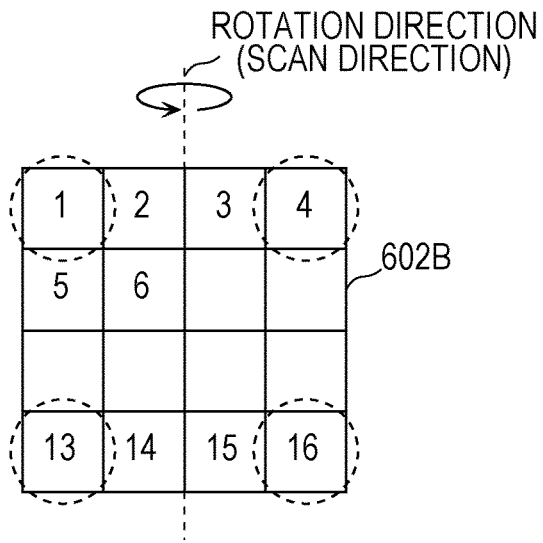
FIG. 44 is a diagram depicting an example of the optical characteristics of an infrared sensor according to the first modification of the sixth embodiment.

FIG. 43A is a diagram illustrating an example of the arrangement of the lens 206 and an infrared sensor 602 according to a comparative example. FIG. 43B is a diagram illustrating, as an image, image distortion in a thermal image acquired by the infrared sensor 602 according to the comparative example. FIG. 44 is a diagram depicting an example of the optical characteristics of an infrared sensor 602B according to the first modification of the sixth embodiment.

As illustrated in FIG. 43A, the infrared sensor 602 includes 4×4 infrared detection elements (pixels). A thermal image 602c acquired by the infrared sensor 602 is affected by distortion caused by an optical system, such as aberrations at end portions of the lens 206. In this case, the pixels at the four corners, such as the pixels 1, 4, 13, and 16 illustrated in FIG. 43B, are more likely to be affected by distortion caused by the optical system.

Accordingly, in the infrared sensor 602B illustrated in FIG. 44, as in the case of the 4×16 pixels illustrated in FIG. 41A described above, it is desirable to design the optical system and the sensor arrangement so that the extent of the PSF of at least the pixels 1, 4, 13, and 16 in the scan direction is smaller than the extent of the PSF of those in the direction perpendicular to the scan direction. That is, in this modification, in the infrared sensor 102 or the like, the first infrared detection elements for which the half-width of the point spread function in the scan direction is smaller than the half-width of the point spread function in the scan rotation axis direction may include four corner infrared detection elements among infrared detection elements arranged in two or more columns and in two or more rows.

Figure 45:
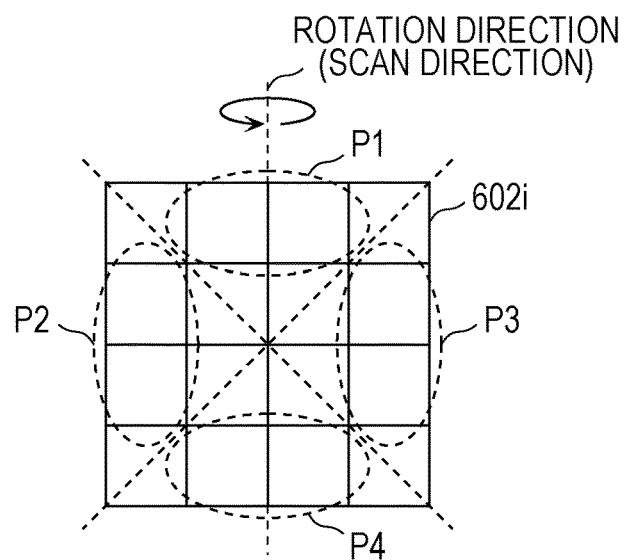
FIG. 45 is a diagram depicting the optical characteristics of pixels of the infrared sensor according to the comparative example.

FIG. 45 is a diagram depicting the optical characteristics of the pixels of the infrared sensor 602 according to the comparative example. On a thermal image 602i acquired by the infrared sensor 602, the half-width of the PSF of pixels located at the diagonal lines in the scan direction (i.e., the horizontal PSF) and the half-width of the PSF of those in the rotation axis direction (i.e., the vertical PSF) are identical. For pixels included in the end portions in the rotation axis direction, such as pixels included in areas P1 and P4, the half-width of the vertical PSF (in the rotation axis direction) is larger than the half-width of the horizontal PSF (in the scan direction). For pixels included in the end portions in the scan direction, such as pixels included in areas P2 and P3, in contrast, the half-width of the horizontal PSF (in the scan direction) is larger than the half-width of the vertical PSF (in the rotation axis direction). That is, typically, in the infrared sensor 602, the number of pixels for which the half-width of the vertical PSF (in the rotation axis direction) is larger and the number of pixels for which the half-width of the horizontal PSF (in the scan direction) is larger are identical.

In this modification, accordingly, it is desirable to include at least one pixel for which the half-width of the horizontal PSF (in the scan direction) is smaller. More specifically, the infrared sensor 102 or the like according to this modification may be configured such that the number of first infrared detection elements that are included in the infrared detection elements arranged in the two or more columns and that have a smaller half-width of a point spread function in a scan direction than a half-width of a point spread function in the direction of the scan rotation axis is larger than the number of second infrared detection elements that are included in the infrared detection elements arranged in the two or more columns and that have a larger half-width of a point spread function in the scan direction than a half-width of a point spread function in the direction of the scan rotation axis. This provides the advantage of suppressed or reduced influence of image distortion caused by an optical system during scanning.

Figure 46:
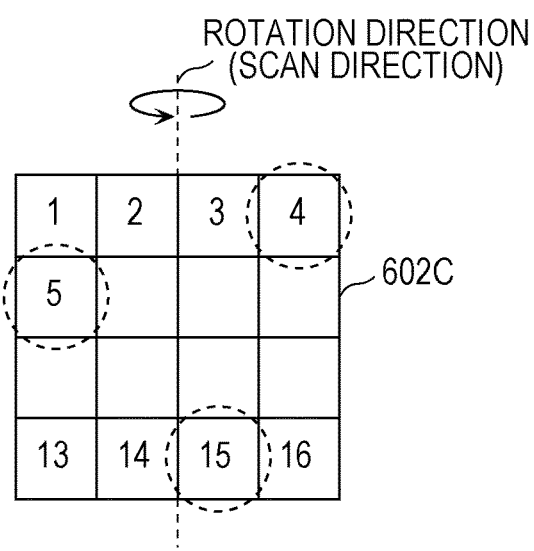
FIG. 46 is a diagram depicting the optical characteristics of the infrared sensor according to the first modification of the sixth embodiment.

It is desirable that the difference between the PSF of a pixel at the left end of a sensor and the PSF of a pixel at the right end of the sensor be smaller than the difference between the PSF of a pixel at the upper end of the sensor and the PSF of a pixel at the lower end of the sensor. FIG. 46 is a diagram depicting the optical characteristics of an infrared sensor 602C according to the first modification of the sixth embodiment. As illustrated in FIG. 46, the infrared sensor 602C may be configured such that the difference in the half-width of the horizontal PSF (in the scan direction) between the pixel 4 and the pixel 5 is smaller than the difference in the half-width of the horizontal PSF (in the scan direction) between the pixel 4 and the pixel 15. This configuration narrows the PSF in the scan direction and also reduces the difference between the PSFs of the pixels 4 and 5 in the scan direction.

More specifically, the infrared sensor 102 or the like according to this modification may be configured such that the difference in the half-width of the point spread function in the scan direction between an infrared detection element at a first position and an infrared detection element at a second position among infrared detection elements at both ends in adjacent rows among the infrared detection elements arranged in the two or more columns is smaller than the difference in the half-width of the point spread function in the scan direction between the infrared detection element at the first position and an infrared detection element at a third position among infrared detection elements in the adjacent rows or among infrared detection elements at both ends in adjacent columns among the two or more columns, the infrared detection element at the first position and the infrared detection element at the second position being consecutive in scan order, the infrared detection element at the first position and the infrared detection element at the third position not being consecutive in the scan order. This is because the configuration described above provides the advantage of suppressed or reduced influence of image distortion caused by an optical system during scanning.

Second Modification

While in the sixth embodiment described above, reference has been made to, as an example, a configuration in which the infrared detection unit 20 is a package that includes the infrared sensor 402b and the IC chip 204 and the package itself rotates, the present disclosure is not limited to this example.

Figure 47:
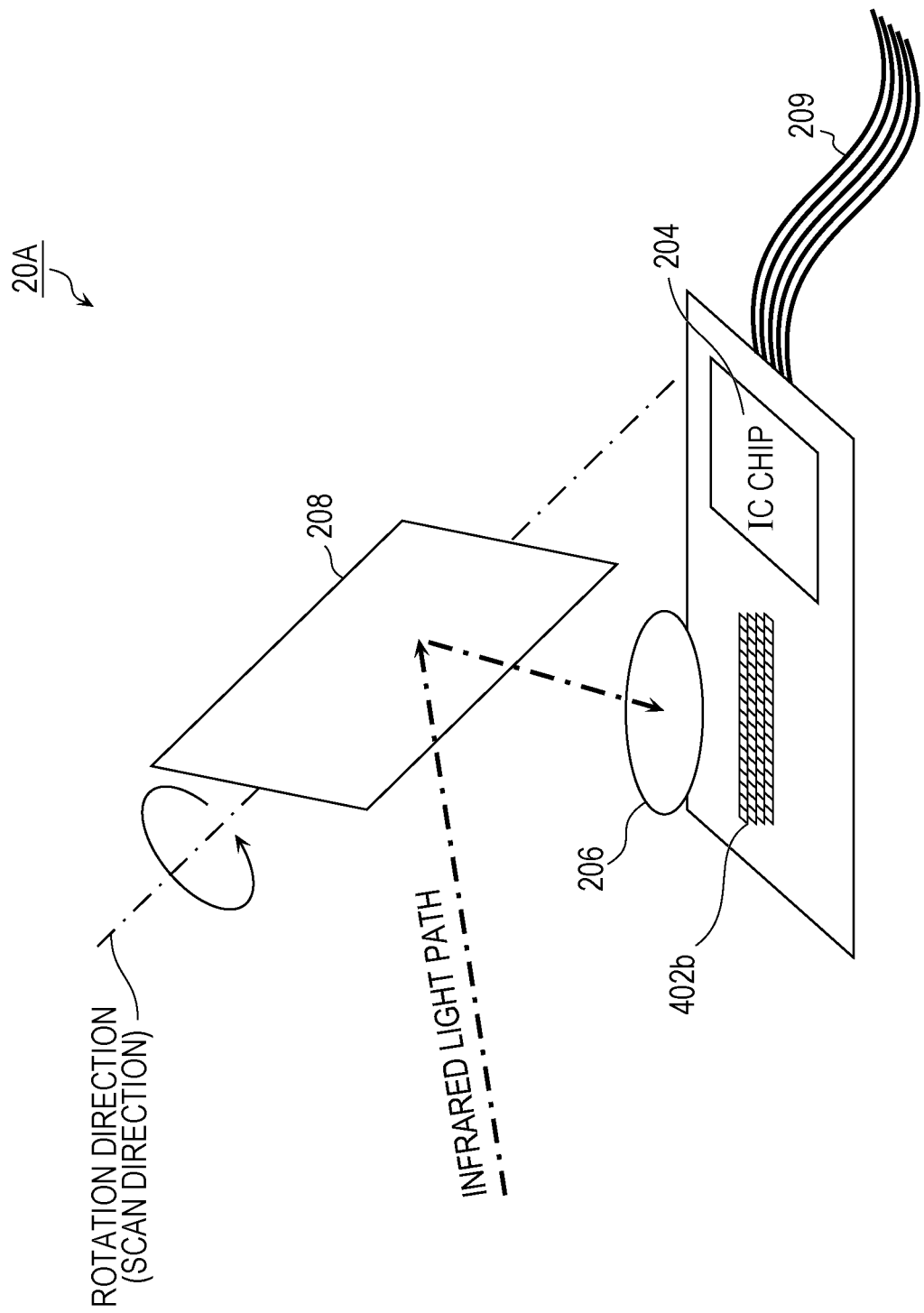
FIG. 47 is a diagram depicting an example configuration of an infrared detection unit according to a second modification of the sixth embodiment.

FIG. 47 is a diagram depicting an example configuration of an infrared detection unit 20A according to a second modification of the sixth embodiment. Elements similar to those in FIG. 34 and so on are assigned the same numerals and are not described in detail herein. The infrared detection unit 20A illustrated in FIG. 47 is different from the infrared detection unit 20 according to the sixth embodiment illustrated in FIG. 34 and so on in that the infrared detection unit 20A further includes a mirror 208 and the scan rotation axis passes through a different position.

In the infrared detection unit 20A, for example, as illustrated in FIG. 47, the infrared sensor 402b and the IC chip 204 are fixed to a package. As in the sixth embodiment, the infrared sensor 402b and the IC chip 204 are arranged substantially side-by-side with respect to the scan direction. In addition, an external connection cable 209 is disposed in such a manner that the distance to the IC chip 204 is smaller than the distance to the infrared sensor 402b. Although not illustrated in FIG. 47, external connection electrodes are disposed at positions opposite the infrared sensor 402b with the IC chip 204 therebetween.

In this modification, in a configuration in which an infrared sensor and an IC chip are arranged substantially side-by-side with respect to the scan direction, it is desirable that an external connection cable be disposed so that the distance to the IC chip is smaller than the distance to the infrared sensor.

In FIG. 47, the infrared sensor according to this modification has been described as the infrared sensor 402b having a configuration similar to that of FIG. 40B, by way of example. However, the present disclosure is not limited to this example. The infrared sensor according to this modification may be an infrared sensor having a configuration similar to any of the configurations illustrated in FIG. 34 to FIG. 35, FIG. 37 to FIG. 39B, and FIG. 41A to FIG. 41B, and an external connection cable may be disposed so that the distance to an IC chip is smaller than the distance to an infrared sensor. In this modification, alternatively, the infrared sensor 402b and the lens 206 illustrated in FIG. 47 may be replaced with any of those illustrated in FIG. 42A to FIG. 46, for example, as necessary.

In this modification, the mirror 208 scans a detection range of the infrared detection elements constituting the infrared sensor 402b. The mirror 208 may be a plane mirror, for example, or may be a mirror having a certain curvature.

Seventh Embodiment

Underlying Knowledge Forming Basis of Seventh Embodiment

In the first embodiment, reference has been made to the case where, for example, as illustrated in FIG. 3 or FIG. 4, the arrangement surface of the infrared sensor 102 on which the one or more infrared detection elements are arranged (the arrangement surface is hereinafter referred to also as a sensor chip surface) is disposed at an inclination with respect to the installation surface 41 (i.e., the scan rotation axis S1) to increase the detection range in the lower area.

However, as described above, since a thermal image output from the infrared sensor 102 according to the first embodiment contains distortion, it is necessary for the control processing unit 12 to perform a distortion correction process. This correction process requires, for example, an increase in the number of microcontrollers to be mounted in the control processing unit 12 to increase the processing capabilities. This is more costly than when the scan rotation axis S1 and the sensor chip surface are parallel to each other. Even if, as described above in the second embodiment, for example, the one or more infrared detection elements are arranged in a trapezoidal pattern to eliminate the need for a distortion correction process, the cost of the infrared sensor 102 itself may increase.

Accordingly, in a seventh embodiment, an infrared detection apparatus with an increased detection range in the lower area while an increase in cost is suppressed will be described.

Configuration of Infrared Detection Apparatus

An infrared detection apparatus according to the seventh embodiment will be described hereinafter with reference to the drawings.

Figure 48:
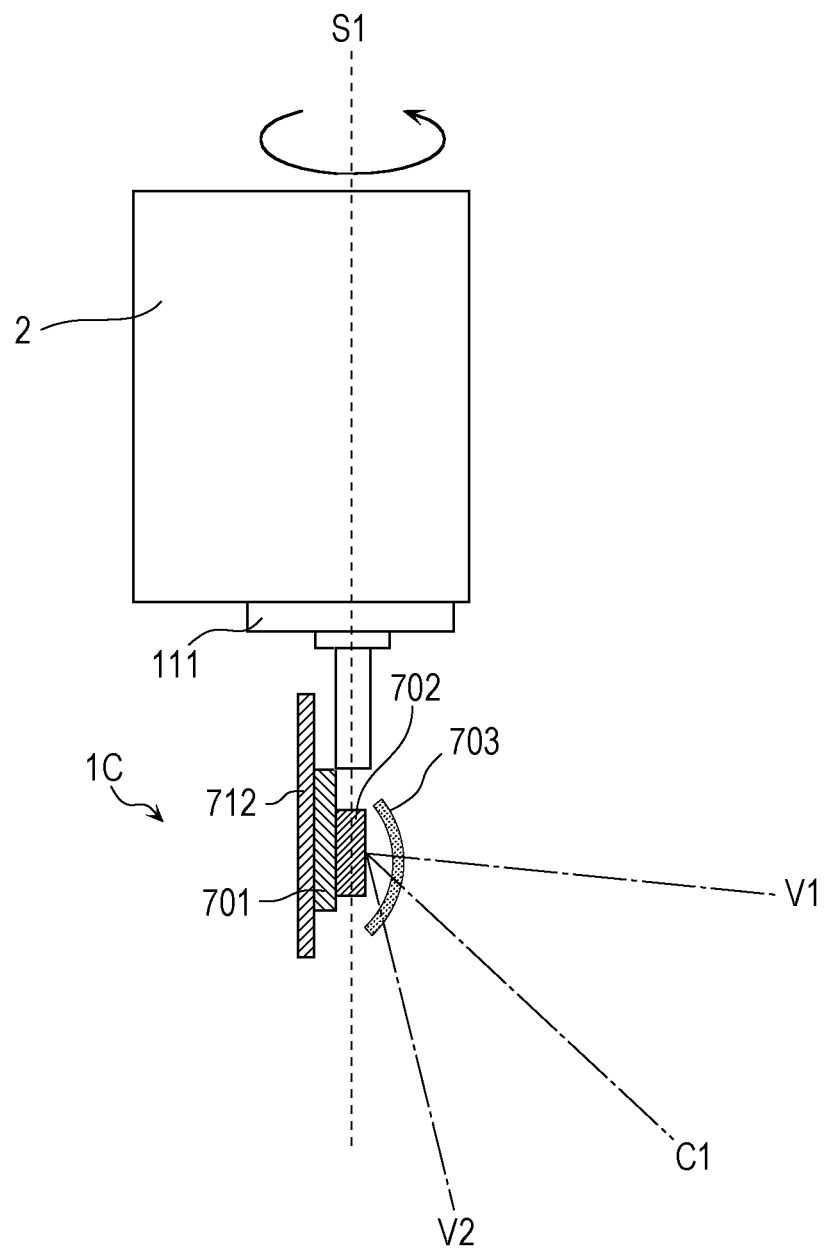
FIG. 48 is a schematic view of a physical configuration in which an infrared detection apparatus according to a seventh embodiment is mounted on a housing.
Figure 49:
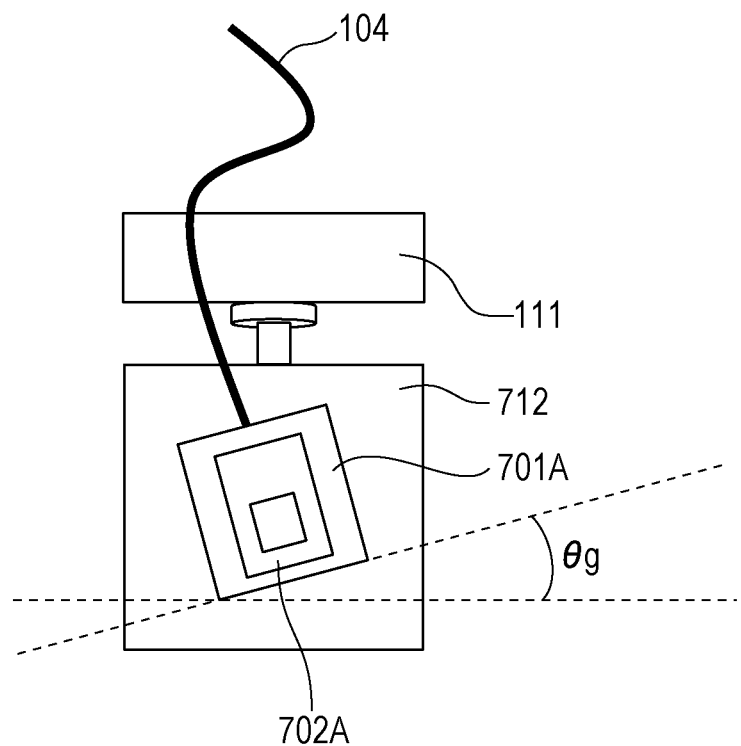
FIG. 49 is an image view illustrating an example configuration of an infrared sensor according to the seventh embodiment.
Figure 50:
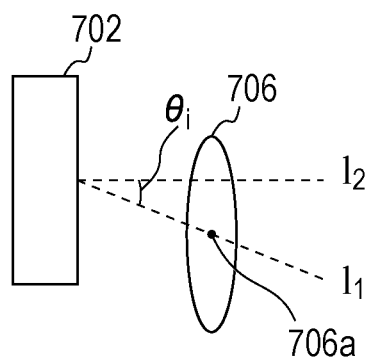
FIG. 50 is a diagram depicting a positional relationship between the infrared sensor and a lens in the seventh embodiment.

FIG. 48 is a schematic view of a physical configuration in which the infrared detection apparatus according to the seventh embodiment is mounted on a housing. FIG. 49 is an image view illustrating an example configuration of an infrared sensor according to the seventh embodiment. FIG. 50 is a diagram depicting a positional relationship between an infrared sensor 702 and a lens 706 in the seventh embodiment. Elements similar to those in FIG. 1 to FIG. 4 are assigned the same numerals and symbols and are not described in detail herein.

An infrared detection apparatus 1C illustrated in FIG. 48 is attached to, as described above with reference to FIG. 3, the housing 2 installed on the installation surface 41, which is substantially perpendicular to the bottom surface 42 of the space 4 and which is at a predetermined height from the bottom surface 42 (see FIG. 3).

The infrared detection apparatus 1C according to this embodiment illustrated in FIG. 48 is different from the infrared detection apparatus 1 according to the first embodiment in that a mounting base 712, a sensor module 701, the infrared sensor 702, a cover 703, and the lens 706 (not illustrated) are arranged parallel to the installation surface 41. The configuration of the mounting base 712, the sensor module 701, the infrared sensor 702, the cover 703, and the lens 706 is the same as that of the mounting base 112, the sensor module 101, the infrared sensor 102, the cover 103, and the lens in the first embodiment, respectively, except for the arrangement thereof, and thus is not described herein.

As described above, the infrared sensor 702 is substantially the same as the infrared sensor 102 described above in the first embodiment and so on, except that the scan rotation axis S1 and the sensor chip surface are arranged in parallel. More specifically, the infrared sensor 702 includes infrared detection elements arranged in two or more columns on a surface thereof (hereinafter referred to as the "arrangement surface"). The infrared sensor 702 is rotated around the scan rotation axis S1, which passes through part of the lens 706, to thereby scan a detection range, and outputs an output signal indicating a thermal image of the detection range. The arrangement surface on which the infrared detection elements are arranged in two or more columns is disposed so as to be parallel to the installation surface 41 (not illustrated).

The infrared sensor 702 may be an infrared sensor 702A illustrated in FIG. 49. That is, the infrared sensor 702A and a sensor module 701A may have a predetermined angle ($\theta g$ in FIG. 49) with respect to the mounting base 712. This example is substantially the same as those described in the fourth embodiment and so on and thus is not described herein.

The lens 706 allows infrared light to pass therethrough. In this embodiment, for example, as illustrated in FIG. 50, the lens 706 is arranged to be displaced from the arrangement surface of the infrared sensor 702 so that the angle defined by a line $l_1$ connecting the center of the infrared sensor 702 and the optical center 706a of the lens 706 and a line $l_2$ perpendicular to the arrangement surface of the infrared sensor 702 is a predetermined angle ($\theta_i$). The predetermined angle ($\theta_i$) may be greater than or equal to 10 degrees and less than or equal to 60 degrees.

Other configurations of the lens 706 are substantially the same as those described above in the first to third embodiments and thus are not described herein.

Advantages etc. of Seventh Embodiment

Figure 51A:
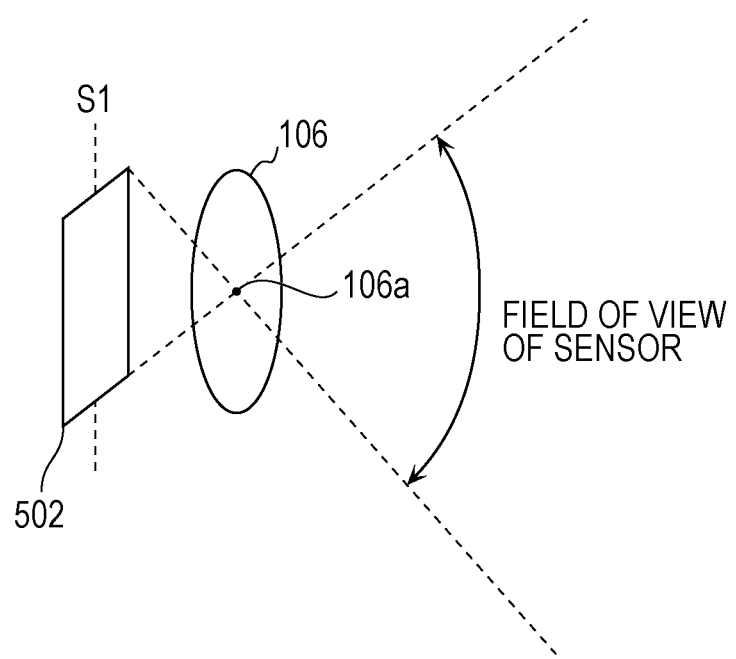
FIG. 51A is a diagram illustrating the field of view of the infrared sensor according to the comparative example of the first embodiment.
Figure 51B:
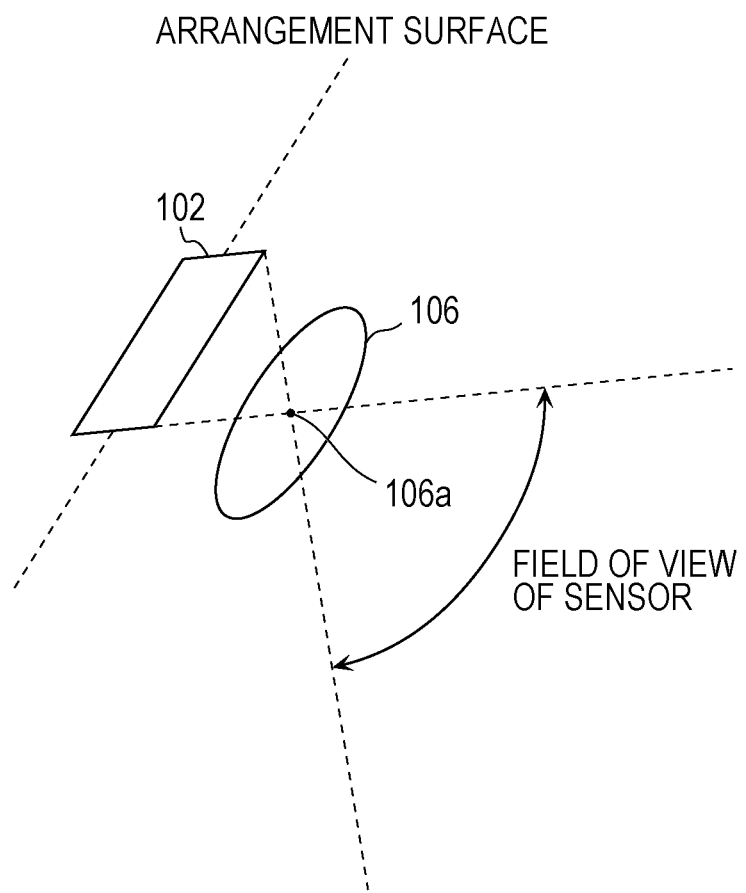
FIG. 51B is a diagram illustrating the field of view of the infrared sensor according to the first embodiment.
Figure 52:
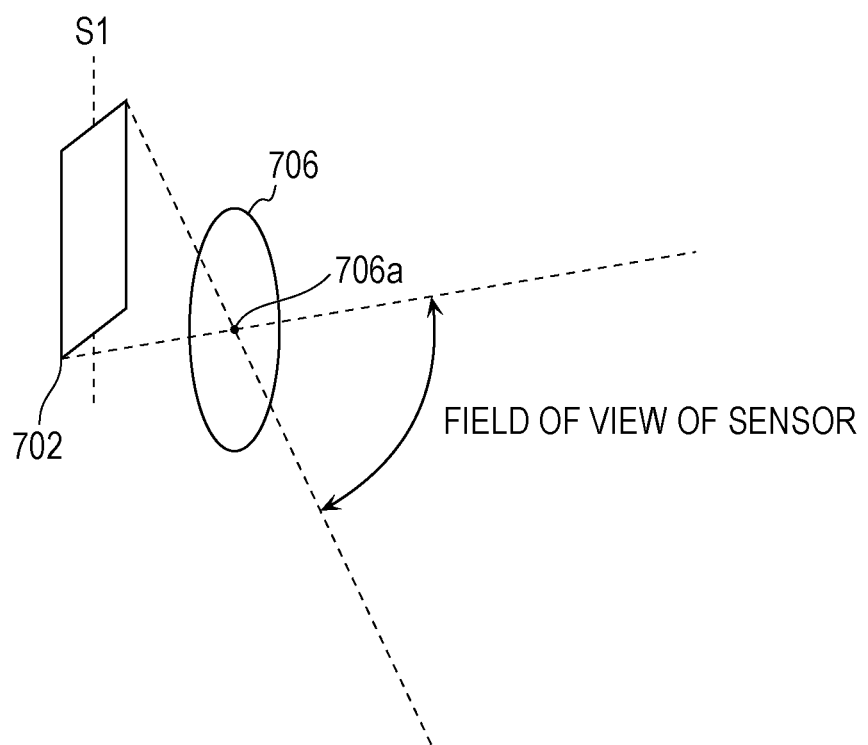
FIG. 52 is a diagram illustrating the field of view of the infrared sensor according to the seventh embodiment.

FIG. 51A is a diagram illustrating the field of view of the infrared sensor 502 according to the comparative example of the first embodiment. FIG. 51B is a diagram illustrating the field of view of the infrared sensor 102 according to the first embodiment. FIG. 52 is a diagram illustrating the field of view of the infrared sensor 702 according to the seventh embodiment. Elements similar to those in FIG. 3 to FIG. 5B and FIG. 48 to FIG. 50 are assigned the same numerals and symbols and are not described in detail herein.

In FIG. 51A, the case is illustrated in which the sensor chip surface of the infrared sensor 502 is parallel to the scan rotation axis S1 (in the vertical direction in FIG. 51A) and a line connecting the center of the infrared sensor 502 and the optical center 106a of a lens 106 and a line perpendicular to the sensor chip surface of the infrared sensor 502 substantially match. In FIG. 51B, the case is illustrated in which the sensor chip surface of the infrared sensor 102 is non-parallel to the scan rotation axis (in FIG. 51B, in the vertical direction) and a line connecting the center of the infrared sensor 102 and the optical center 106a of the lens 106 and a line perpendicular to the sensor chip surface of the infrared sensor 102 substantially match. In FIG. 52, the case is illustrated in which the sensor chip surface of the infrared sensor 702 is parallel to the scan rotation axis S1 (in FIG. 52, in the vertical direction) and the angle defined by a line connecting the center of the infrared sensor 702 and the optical center 706a of the lens 706 and a line perpendicular to the sensor chip surface of the infrared sensor 702 is a predetermined angle.

FIG. 51A, FIG. 51B, and FIG. 52 are compared. The field of view of the infrared sensor 102 according to the first embodiment illustrated in FIG. 51B is lower than the field of view of the infrared sensor 502 according to the comparative example illustrated in FIG. 51A. Similarly to the field of view of the infrared sensor 102 according to the first embodiment illustrated in FIG. 51B, the field of view of the infrared sensor 702 according to this embodiment illustrated in FIG. 52 is found to be also lower than the field of view of the infrared sensor 502 illustrated in FIG. 51A.

In the infrared detection apparatus 1C according to this embodiment, as described above, the displacement of the position of the lens 706 enables an increase in the detection range in a lower area near the position at which the infrared detection apparatus 1C is installed while keeping the scan rotation axis S1 and the sensor chip surface in parallel. It is thus possible to realize the infrared detection apparatus 1C with an increased detection range in a lower area near the position at which the infrared detection apparatus 10 is installed while an increase in cost is suppressed.

Modifications

In the seventh embodiment, reference has been made to the case where the position of the lens 706 is displaced to increase the detection range in the lower area while keeping the scan rotation axis S1 and the sensor chip surface in parallel. However, the present disclosure is not limited to this arrangement.

The displacement of the position of a lens and non-parallel arrangement of the scan rotation axis S1 and the sensor chip surface may be used in combination. This case will be described hereinafter as a modification.

Configuration of Infrared Detection Apparatus

An infrared detection apparatus according to a modification of the seventh embodiment will be described hereinafter with reference to the drawings.

Figure 53:
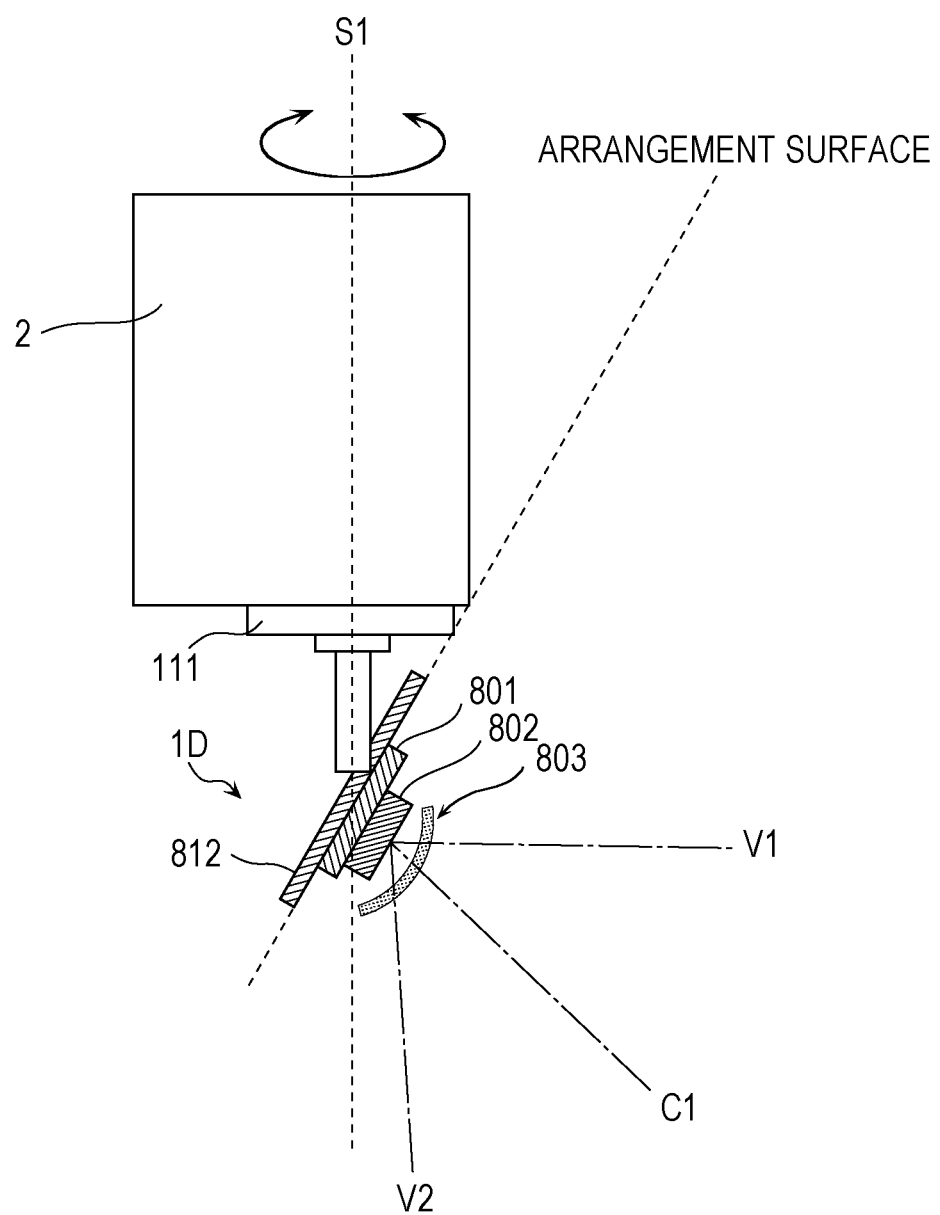
FIG. 53 is a schematic view of a physical configuration in which an infrared detection apparatus according to a modification of the seventh embodiment is mounted on a housing.

FIG. 53 is a schematic view of a physical configuration in which the infrared detection apparatus according to the modification of the seventh embodiment is mounted on a housing. Elements similar to those in FIG. 48 are assigned the same numerals and symbols and are not described in detail herein.

An infrared detection apparatus 1D according to this embodiment illustrated in FIG. 53 is different from the infrared detection apparatus 1C according to the seventh embodiment in that a mounting base 812, a sensor module 801, an infrared sensor 802, a cover 803, and a lens 806 (see FIG. 54) are arranged non-parallel to the installation surface 41. The configuration of the mounting base 812, the sensor module 801, the infrared sensor 802, the cover 803, and the lens 806 is the same as that of the mounting base 712, the sensor module 701, the infrared sensor 702, the cover 703, and the lens 706 according to the seventh embodiment, respectively, except for the arrangement thereof, and thus is not described herein.

The infrared sensor 802 is substantially the same as the infrared sensor 702 described above in the seventh embodiment, except that the scan rotation axis S1 and the sensor chip surface are arranged non-parallel. More specifically, the infrared sensor 802 includes infrared detection elements arranged in two or more columns on a surface thereof (hereinafter referred to as the "arrangement surface"). The infrared sensor 802 is rotated around the scan rotation axis S1, which passes through part of the lens 806, to thereby scan a detection range, and outputs an output signal indicating a thermal image of the detection range. The arrangement surface on which the infrared detection elements are arranged in two or more columns is disposed so as to be inclined at a first angle with respect to the installation surface 41 (not illustrated).

Similarly to the infrared sensor 702A illustrated in FIG. 49, the infrared sensor 802 may have a predetermined angle with respect to the mounting base 812.

The lens 806 allows infrared light to pass therethrough. In this embodiment, the lens 806 is arranged to be displaced from the arrangement surface of the infrared sensor 802 so that the angle defined by a line connecting the center of the infrared sensor 802 and the optical center of the lens 806 and a line perpendicular to the arrangement surface of the infrared sensor 802 is a second angle.

Other configurations of the lens 806 are substantially the same as those described above in the first to third embodiments and thus are not described herein.

The center of the field of view of the infrared detection apparatus 1D having the configuration described above is lower than the direction vertical to the installation surface 41 by an amount corresponding to a third angle that is the sum of the first angle and the second angle. For example, when the center of the field of view is to be set below the direction vertical to the installation surface 41 by 45 degrees, 45 degrees may be obtained by inclining the infrared sensor 802 at 20 degrees and inclining the position of the lens 806 at 25 degrees.

Advantages etc.

Figure 54:
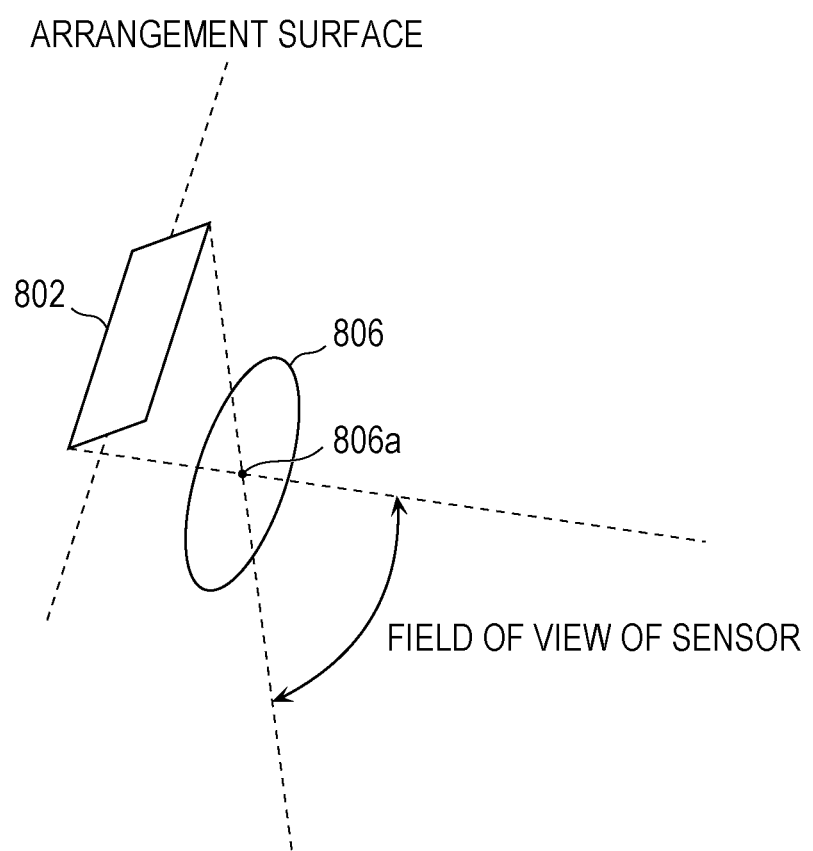
FIG. 54 is a diagram illustrating the field of view of an infrared sensor according to the modification of the seventh embodiment.

FIG. 54 is a diagram illustrating the field of view of the infrared sensor 802 according to the modification of the seventh embodiment. Elements similar to those in FIG. 53 are assigned the same numerals and are not described in detail herein.

In FIG. 54, the case is illustrated in which the sensor chip surface of the infrared sensor 802 is non-parallel to (has a first angle with respect to) the scan rotation axis (in the vertical direction in FIG. 54) and the angle defined by a line connecting the center of the infrared sensor 802 and the optical center 806a of the lens 806 and a line perpendicular to the sensor chip surface of the infrared sensor 802 is the second angle.

FIG. 51A, FIG. 52, and FIG. 54 are compared. Similarly to the field of view of the infrared sensor 702 illustrated in FIG. 52, the field of view of the infrared sensor 802 illustrated in FIG. 54 is found to be also lower than the field of view of the infrared sensor 502 illustrated in FIG. 51A.

In the infrared detection apparatus ID according to this embodiment, as described above, a combination of the displacement of the position of the lens 806 and the non-parallel arrangement of the scan rotation axis S1 and the sensor chip surface enables an increase in the detection range in a lower area near the position at which the infrared detection apparatus 1C is installed.

As described above in the seventh embodiment, while it is possible to increase the detection range in a lower area by only displacing the position of a lens, blurring of pixels occurs in a portion far from the center of the lens due to the influence of aberration. Meanwhile, as described above in the first embodiment, inclining only an infrared sensor results in an excessive increase in the complexity of signal processing or the complexity of changing the structure of the infrared sensor to arrange infrared detection elements of the infrared sensor in a trapezoidal pattern to remove distortion correction, as described above.

Accordingly, as in this modification, the use of both displacement of the position of the lens and inclination of the infrared sensor can suppress or reduce the occurrence of blurring due to aberrations and can reduce the increase in cost for the increased number of microcontrollers or the increase in the cost of an infrared sensor to arrange infrared detection elements of the infrared sensor in a trapezoidal pattern to remove distortion correction, providing an advantage in that the favorable points for both approaches can be found.

While an infrared detection apparatus or apparatuses according to one or a plurality of aspects of the present disclosure have been described with reference to some embodiments, the present disclosure is not limited to these embodiments. Various modifications conceivable by a person skilled in the art may be made to the embodiments or any combination of constituent elements in different embodiments may be used without departing from the scope of the present disclosure, and such modifications and combinations may also fall within the scope of one or a plurality of aspects of the present disclosure. For example, the following cases are also encompassed by the present disclosure.

Figure 55A:
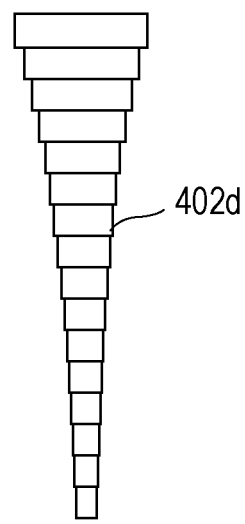
FIG. 55A illustrates an example shape of a plurality of infrared detection elements constituting an infrared sensor.
Figure 55B:
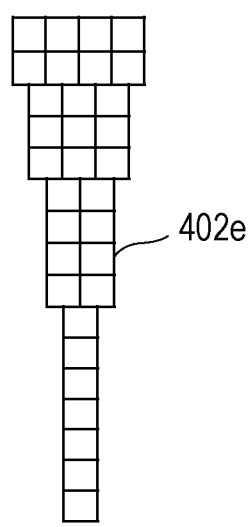
FIG. 55B illustrates an example shape of a plurality of infrared detection elements constituting an infrared sensor.

(1) FIG. 55A and FIG. 55B illustrate example shapes of a plurality of infrared detection elements constituting an infrared sensor. For example, as described above in the second embodiment with reference to FIG. 14 and so on, as illustrated in FIG. 55A, an infrared sensor according to an aspect of the present disclosure may be an infrared sensor 402d constituted by a plurality of infrared detection elements with gradually decreasing widths. An infrared sensor according to another aspect of the present disclosure may be an infrared sensor 402e illustrated in FIG. 55B. More specifically, the infrared sensor 402e includes a plurality of infrared detection elements arranged in two or more columns in an arrangement direction in which the infrared sensor 402e and the IC chip 204 (not illustrated) are arranged, and the number of two or more columns decreases in increments of the same or different numbers of rows as the distance to an end in the arrangement direction in which the infrared sensor 402e and the IC chip 204 are arranged decreases.

(2) While in the embodiments described above and so on, the angles, sizes, and so on of the infrared sensors have been described as examples, theses are not limited to the values given in the illustrated examples. Any values different from those of the angles and sizes given in the illustrated examples are also encompassed within the scope of the present disclosure so long as advantages similar to those described above are achieved.

(3) Each of the apparatuses described above may be a computer system constituted by, specifically, a microprocessor, a read-only memory (ROM), a random-access memory (RAM), a hard disk unit, a display unit, a keyboard, a mouse, and so on. The RAM or the hard disk unit stores a computer program. The microprocessor operates in accordance with the computer program to allow each apparatus to achieve its functions. The computer program is set if a plurality of command codes for providing instructions to a computer to achieve a predetermined function.

(4) Some of all of the constituent elements of each of the apparatuses described above may be implemented by a single system large scale integration (LSI) device. The system LSI device is a super-multifunctional LSI device manufactured by integrating a plurality of configuration units on a single chip and is, specifically, a computer system including a microprocessor, a ROM, a RAM, and so on. The RAM stores a computer program. The microprocessor operates in accordance with the computer program to allow the system LSI device to achieve its functions.

(5) Some of all of the constituent elements of each of the apparatuses described above may be implemented by a separate module or an IC card that is attachable to and removable from the apparatus. The IC card or the module may be a computer system constituted by a microprocessor, a ROM, a RAM, and so on. The IC card or the module may include the super-multifunctional LSI device described above. The microprocessor operates in accordance with a computer program to allow the IC card or the module to achieve its functions. The IC card or the module may be tamper-resistant.

(6) The present disclosure may also be implemented as the methods described above. The present disclosure may also be implemented as a computer program for allowing a computer to perform these methods or as a digital signal including the computer program.

In the present disclosure, the computer program or the digital signal may be recorded on computer-readable recording media such as a flexible disk, a hard disk, a CD-ROM, a magneto-optical (MO) disk, a digital versatile disk (DVD), a DVD-ROM, a DVD-RAM, a BD (Blu-ray (registered trademark Disc), and a semiconductor memory. The present disclosure may also be implemented as the digital signal recorded on these recording media.

In the present disclosure, furthermore, the computer program or the digital signal may be transmitted over a telecommunications line, a wireless or wired communication line, a network such as the Internet, data broadcasting, or the like.

The present disclosure may also be implemented as a computer system including a microprocessor and a memory. The memory may store the computer program described above, and the microprocessor may operate in accordance with the computer program.

Alternatively, the program or the digital signal may be recorded on the recording medium and transported, or the program or the digital signal may be transported over the network or the like described above so as to be implemented by a different independent computer system.

(7) The embodiments described above and the modifications described above may be used in combination.

The present disclosure is applicable to infrared detection apparatuses for acquiring a high-resolution thermal image and more particularly applicable to an infrared detection apparatus mounted on other equipment, such as air conditioning equipment, as a module and used to control the other equipment.

What is claimed is:

1. An infrared detection apparatus comprising:
a lens that allows infrared light to pass therethrough; and
an infrared sensor that includes a plurality of infrared detection elements arranged in a matrix having two or more columns, the infrared sensor being configured to be:
rotated around a scan rotation axis that passes through part of the lens to scan a temperature detection range, and
output an output signal indicating a thermal image of the temperature detection range,
wherein the infrared sensor is placed so that the matrix of the plurality of infrared detection elements is inclined at a first predetermined angle with respect to a predetermined direction,
wherein at least two of the plurality of infrared detection elements in the infrared sensor are located at positions displaced from each other, as viewed in a direction perpendicular to the scan rotation axis, and
first infrared detection elements
being included in the plurality of infrared detection elements,
being arranged in two or more columns of the matrix, and
have a smaller half-width of a point spread function in a scan direction than a half-width of a point spread function in a direction of the scan rotation axis, and
second infrared detection elements
being included in the plurality of infrared detection elements,
being arranged in the two or more columns of the matrix, and
have a larger half-width of a point spread function in the scan direction than a half-width of a point spread function in the direction of the scan rotation axis,
wherein a number of the first infrared detection elements is larger than a number of the second infrared detection elements.

2. The infrared detection apparatus according to claim 1, wherein a first diameter of the lens and a second diameter of the lens are configured such that the number of the first infrared detection elements that are included in the plurality of infrared detection elements arranged in the two or more columns of the matrix and that have a smaller half-width of a point spread function in a scan direction than a half-width of a point spread function in a direction of the scan rotation axis is larger than the number of the second infrared detection elements that are included in the plurality of infrared detection elements arranged in the two or more columns of the matrix and that have a larger half-width of a point spread function in the scan direction than a half-width of a point spread function in the direction of the scan rotation axis, and wherein the first diameter of the lens is a diameter of the lens in the direction of the scan rotation axis and the second diameter of the lens is a diameter of the lens in the scan direction, and the first diameter of the lens is larger than the second diameter of the lens.

3. The infrared detection apparatus according to claim 1, wherein the plurality of infrared detection elements are arranged in two or more rows as the matrix, and wherein a difference in the half-width of the point spread function in the scan direction between an infrared detection element at a first position and an infrared detection element at a second position among infrared detection elements at both ends in adjacent rows among the plurality of infrared detection elements arranged in the two or more columns of the matrix and in the in two or more rows of the matrix is smaller than a difference in the half-width of the point spread function in the scan direction between the infrared detection element at the first position and an infrared detection element at a third position among infrared detection elements in the adjacent rows or among infrared detection elements at both ends in adjacent columns among the two or more columns of the matrix, the infrared detection element at the first position and the infrared detection element at the second position are consecutive in a scan order, the infrared detection element at the first position and the infrared detection element at the third position are not consecutive in the scan order.

4. The infrared detection apparatus according to claim 1, wherein the lens has a shape in which end portions of the lens having substantially identical lengths in the direction of the scan rotation axis and the scan direction are cut away in the scan direction.

5. The infrared detection apparatus according to claim 1, wherein the lens comprises a cylindrical lens.

6. The infrared detection apparatus according to claim 1, further comprising:

a signal processor that performs signal processing on an output signal of the infrared sensor to compute a temperature of an object present in the temperature detection range, wherein the infrared sensor and the signal processor are arranged substantially side-by-side in a direction along the scan rotation axis around which the infrared sensor is rotated.

7. The infrared detection apparatus according to claim 1, wherein the lens is disposed to be displaced from an arrangement surface of the infrared sensor on which the plurality of infrared detection elements arranged in the two or more columns of the matrix are arranged so that an angle defined by a line connecting a center of the infrared sensor and an optical center of the lens and a line perpendicular to the arrangement surface of the infrared sensor is a second predetermined angle.

8. The infrared detection apparatus according to claim 7, wherein the second predetermined angle is greater than or equal to 10 degrees and less than or equal to 60 degrees.

9. The infrared detection apparatus according to claim 1, wherein, in the infrared sensor, one or more of the plurality of infrared detection elements detect infrared radiation in the temperature detection range, whereas others are unable to detect the infrared radiation in the temperature detection range.

10. The infrared detection apparatus according to claim 1, wherein, in the infrared sensor, the plurality of infrared detection elements are placed in the matrix with eight rows and eight columns, and the first predetermined angle is 7.125 or 9.462 degrees.

11. The infrared detection apparatus according to claim 1, wherein, in the infrared sensor, one or more of the plurality of infrared detection elements detect infrared radiation in the temperature detection range, whereas others are unable to detect the infrared radiation in the temperature detection range, wherein, the others include one or more of the plurality of infrared detection elements arranged in the first column, and one or more of the plurality of infrared detection elements arranged in the eighth column, and the first predetermined angle is 9.462 degrees.

12. An infrared detection apparatus for attachment to a housing installed in a space on an installation surface of the space, the installation surface being substantially perpendicular to a bottom surface of the space and being at a predetermined height from the bottom surface, the infrared detection apparatus comprising:

a lens that allows infrared light to pass therethrough; and an infrared sensor that includes a plurality of infrared detection elements arranged in two or more columns of a matrix, the infrared sensor being configured to be rotatable around a scan rotation axis that passes through part of the lens to scan a temperature detection range, and output an output signal indicating a thermal image of the temperature detection range, wherein the infrared sensor is placed so that the matrix of the plurality of infrared detection elements is inclined at a first predetermined angle with respect to a predetermined direction, wherein an arrangement surface, on which the plurality of infrared detection elements are arranged in the two or more columns of the matrix, is inclined at a first angle with respect to the installation surface, wherein the lens is disposed at a position displaced from the infrared sensor so that an angle defined by a line connecting a center of the plurality of infrared detection elements arranged in the two or more columns of the matrix and an optical center of the lens and a line perpendicular to the arrangement surface is a second angle, and wherein the infrared detection apparatus has a field of view having a center that is lower than a direction perpendicular to the installation surface by an amount corresponding to a third angle, the third angle equaling a sum of the first angle and the second angle, the amount corresponding to the third angle is a sum of an inclination angle of the infrared sensor and an inclination angle of the lens.

* * * * *